US 6,597,347 B1
United States Patent
Yasutake
(10) Patent No.: US 6,597,347 B1
(45) Date of Patent: Jul. 22, 2003

(54) METHODS AND APPARATUS FOR PROVIDING TOUCH-SENSITIVE INPUT IN MULTIPLE DEGREES OF FREEDOM

(75) Inventor: Taizo Yasutake, Cupertino, CA (US)

(73) Assignee: ITU Research Inc., Cupertino, CA (US)

( * ) Notice: Subject to any disclaimer, the term of this patent is extended or adjusted under 35 U.S.C. 154(b) by 0 days.

(21) Appl. No.: 09/216,663

(22) Filed: Dec. 16, 1998

Related U.S. Application Data

(63) Continuation-in-part of application No. 08/696,366, filed on Aug. 13, 1996, now abandoned, which is a continuation-in-part of application No. 08/509,797, filed on Aug. 1, 1995, now Pat. No. 5,729,249, which is a continuation of application No. 08/238,257, filed on May 3, 1994, now abandoned, which is a continuation-in-part of application No. 07/798,572, filed on Nov. 26, 1991, now Pat. No. 5,335,557.

(60) Provisional application No. 60/086,036, filed on May 19, 1998.

(51) Int. Cl.$^7$ .............................................. G08C 21/00
(52) U.S. Cl. ...................... 345/173; 345/157; 345/174; 345/177; 178/18.01
(58) Field of Search ................................ 345/173, 174, 345/177; 178/18.01

(56) References Cited

U.S. PATENT DOCUMENTS

| | | | |
|---|---|---|---|
| 3,490,059 A | | 1/1970 | Paulsen et al. |
| 4,017,858 A | | 4/1977 | Kuipers |
| 4,216,467 A | | 8/1980 | Colston |
| 4,302,011 A | | 11/1981 | Pepper, Jr. |
| 4,313,113 A | | 1/1982 | Thornburg |
| 4,394,773 A | * | 7/1983 | Ruell .......................... 382/124 |
| 4,448,083 A | | 5/1984 | Hayashi |
| 4,550,221 A | * | 10/1985 | Mabusth ...................... 178/18 |
| 4,550,617 A | | 11/1985 | Fraignier et al. |
| 4,601,206 A | | 7/1986 | Watson |

(List continued on next page.)

FOREIGN PATENT DOCUMENTS

| | | |
|---|---|---|
| GB | 2060173 | 4/1981 |
| GB | 2254911 | 10/1992 |
| JP | 0095331 | 5/1985 |
| JP | 0129635 | 7/1985 |
| JP | 1292028 | 12/1986 |

(List continued on next page.)

OTHER PUBLICATIONS

Myron W. Krueger; Artificial Reality; Perceptual Systems; 1983.

(List continued on next page.)

*Primary Examiner*—Bipin Shalwala
*Assistant Examiner*—Vincent E. Kovalick
(74) *Attorney, Agent, or Firm*—Perkins Coie LLP

(57) ABSTRACT

Disclosed is a multiple coordinate controller device having a three-dimensional body with a first surface portion and a second surface portion where the second surface portion is not coplanar with the first surface. A first transducer with a first sensing surface is coupled to the first surface portion of the body and capable of detecting both positions and a range of pressure forces at positions on the first sensing surface. The first transducer is further capable of providing a first range of z coordinates at a detected x,y coordinate in response to the range of pressure forces on said first sensing surface. A second transducer having a second sensing surface is coupled to the second surface portion of the body and capable of detecting both positions and a range of pressure forces at the positions on the second sensing surface. The second transducer is further capable of providing a second range of z coordinates of opposite polarity to the first range of z coordinates in response to the range of forces on second sensing surface.

16 Claims, 57 Drawing Sheets

U.S. PATENT DOCUMENTS

| | | |
|---|---|---|
| 4,684,801 A | 8/1987 | Carroll et al. |
| 4,704,909 A | 11/1987 | Grahn et al. |
| 4,720,805 A | 1/1988 | Vye |
| 4,763,100 A | 8/1988 | Wood |
| 4,787,051 A | 11/1988 | Olson |
| 4,798,919 A | 1/1989 | Miessler et al. |
| 4,811,608 A | 3/1989 | Hilton |
| 4,823,634 A | 4/1989 | Culver |
| 4,839,838 A | 6/1989 | LaBiche et al. |
| 4,954,817 A | 9/1990 | Levine |
| 4,983,786 A | 1/1991 | Stevens et al. |
| 4,988,981 A | 1/1991 | Zimmerman et al. |
| 5,095,303 A | 3/1992 | Clark et al. |
| 5,128,671 A | 7/1992 | Thomas, Jr. |
| 5,165,897 A | 11/1992 | Johnson |
| 5,178,012 A | 1/1993 | Culp |
| 5,185,561 A | 2/1993 | Good et al. |
| 5,262,777 A * | 11/1993 | Low et al. .................... 341/20 |
| 5,327,161 A | 7/1994 | Logan et al. |
| 5,335,557 A | 8/1994 | Yasutake |
| 5,354,162 A | 10/1994 | Burdea et al. |
| 5,376,948 A | 12/1994 | Roberts |
| 5,389,865 A | 2/1995 | Jacobus et al. |
| 5,408,407 A | 4/1995 | Lefkowitz et al. |
| 5,429,140 A | 7/1995 | Burdea et al. |
| 5,440,476 A | 8/1995 | Lefkowitz et al. |
| 5,459,382 A | 10/1995 | Jacobus et al. |
| 5,483,261 A | 1/1996 | Yasutake |
| 5,506,605 A | 4/1996 | Paley |
| 5,543,590 A | 8/1996 | Gillesple et al. |
| 5,555,894 A | 9/1996 | Doyama et al. |
| 5,565,891 A | 10/1996 | Armstrong |
| 5,717,423 A | 2/1998 | Parker |
| 5,729,249 A * | 3/1998 | Yasutake .................... 345/173 |
| 5,774,113 A | 6/1998 | Barnes |
| 6,087,599 A * | 7/2000 | Knowles .................. 178/18.04 |
| 6,091,406 A * | 7/2000 | Kambara et al. ........... 345/177 |

FOREIGN PATENT DOCUMENTS

| | | |
|---|---|---|
| SU | 1244515 | 7/1986 |
| WO | WO 92/08208 | 5/1992 |
| WO | WO 93/11526 | 6/1993 |
| WO | WO 95/20787 | 8/1995 |
| WO | WO 95/20788 | 8/1995 |

OTHER PUBLICATIONS

Ken–ichi Kameyama, Koichi Ohtomi; A Shape Modeling System with a Volume Scanning Display and Multisensory Input Device; Presence; vol. 2, No. 2, Spring 1993.

Tamotsu Murakami, Naomasa Nakajima; Direct and Intuitive Input Device for 3–D Shape Deformation; Human Factors in Computing Systems; Apr. 24–28, 1994.

* cited by examiner

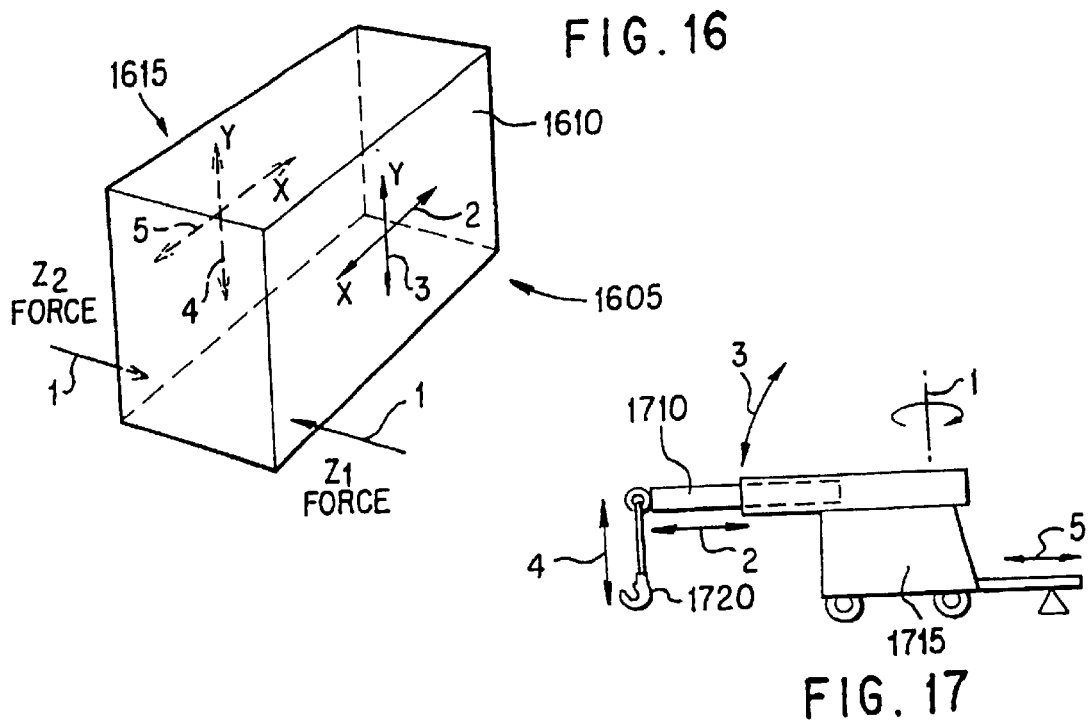
FIG. 16
FIG. 17
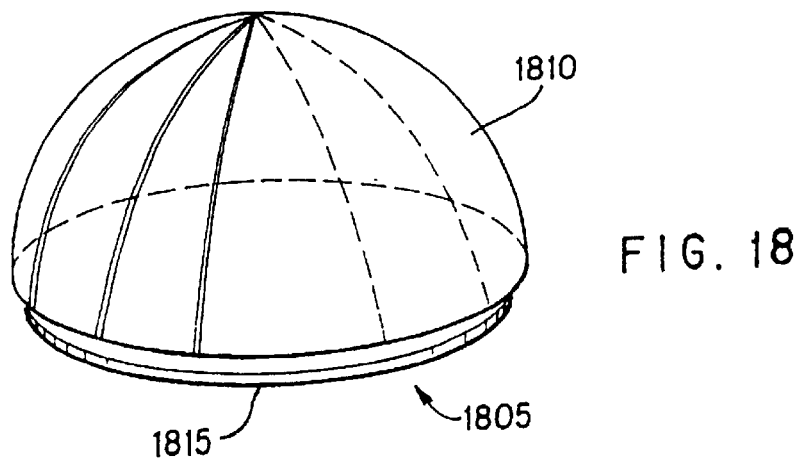
FIG. 18

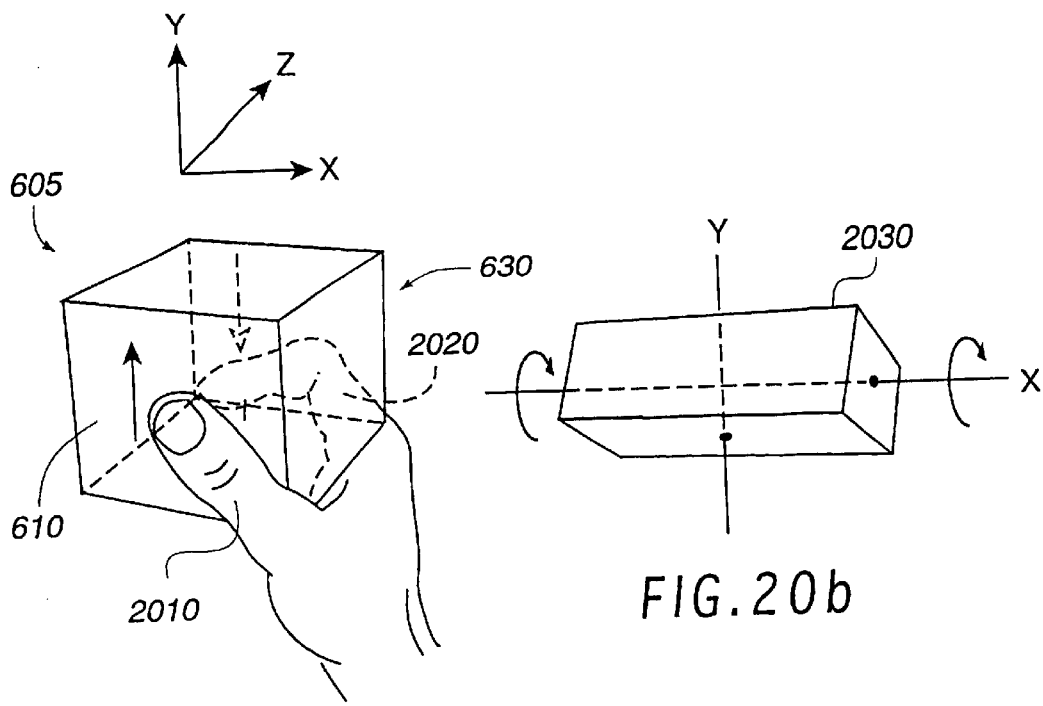
FIG.20a
FIG.20b
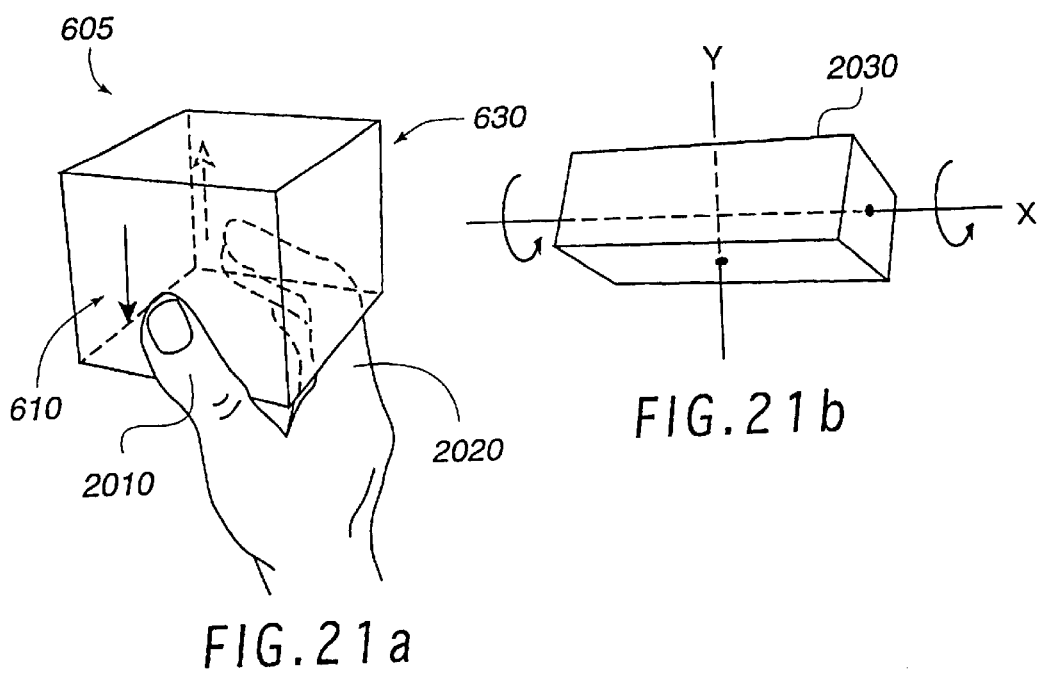
FIG.21a
FIG.21b

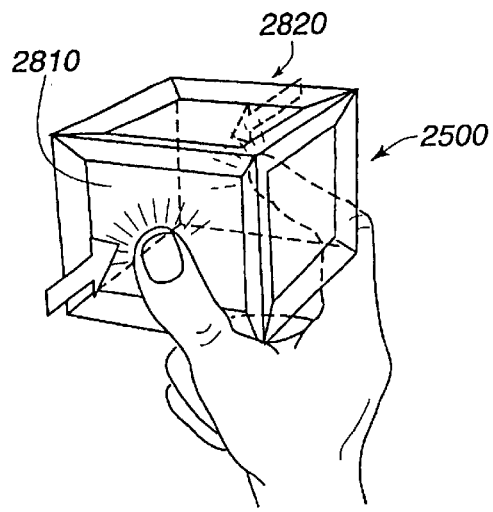
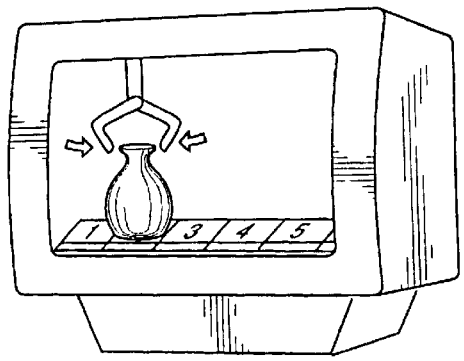
FIG.28a
FIG.28b
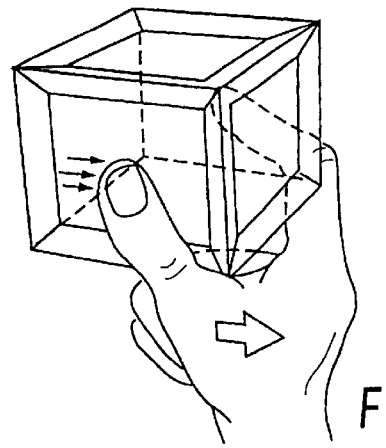
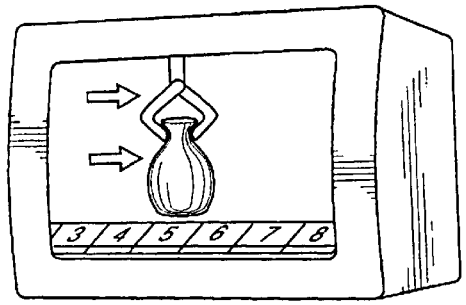
FIG.28c
FIG.28d
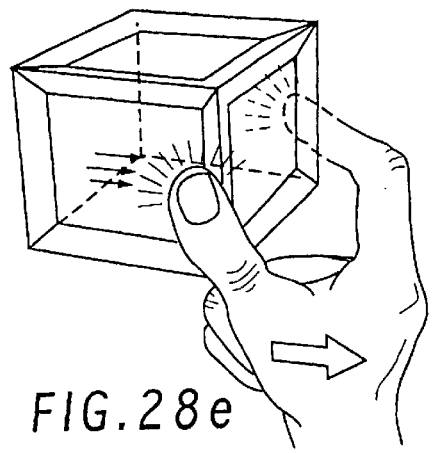
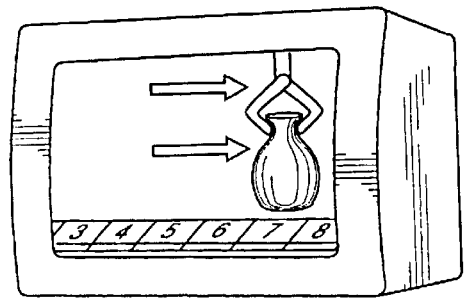
FIG.28e
FIG.28f

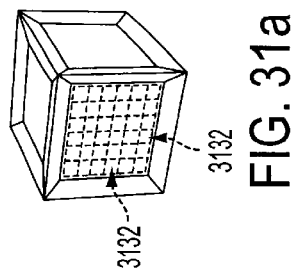
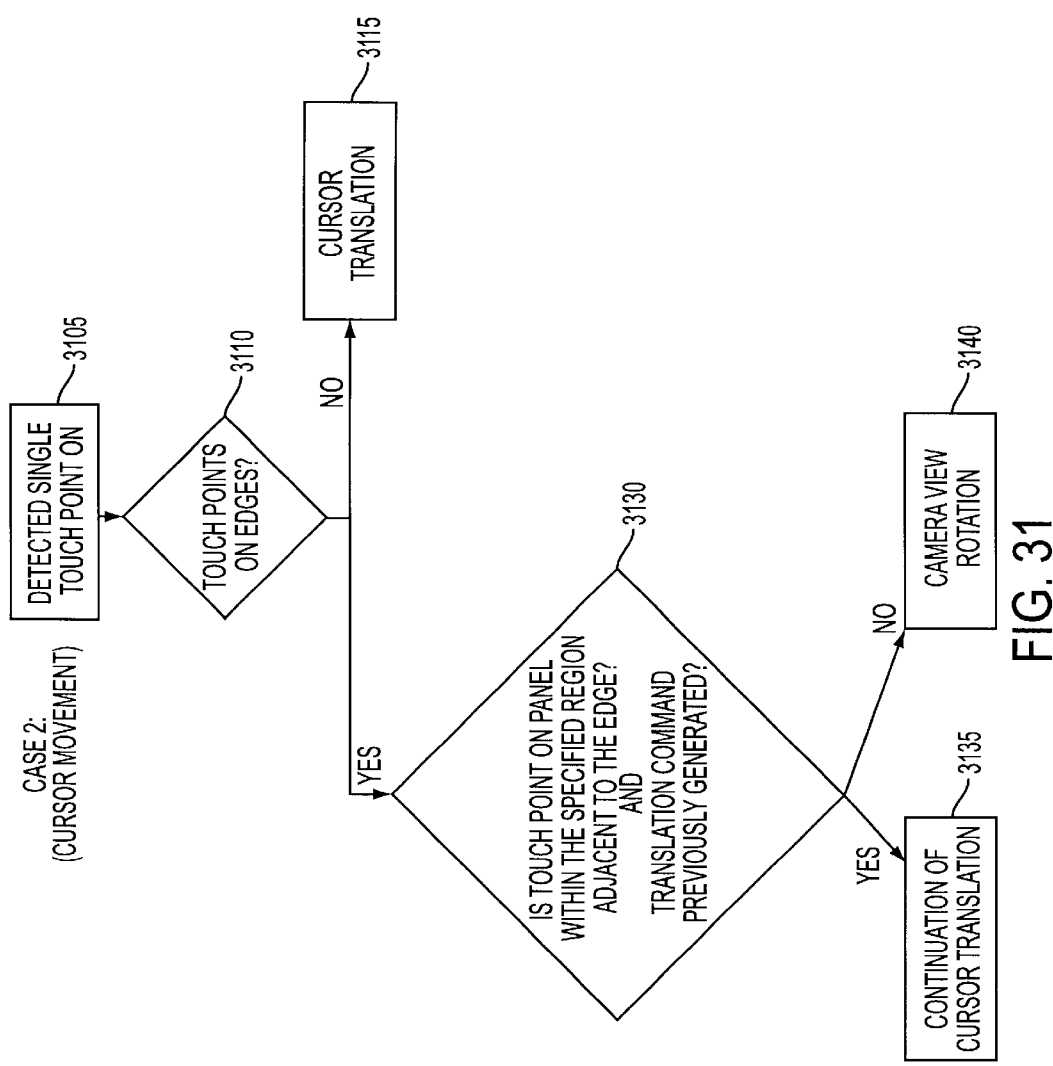
FIG. 31a
FIG. 31

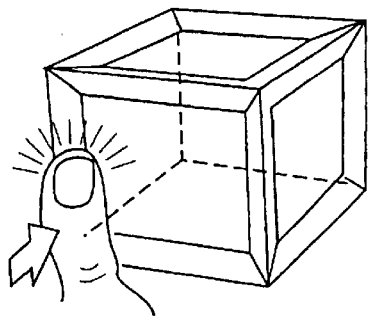
FIG.33a1
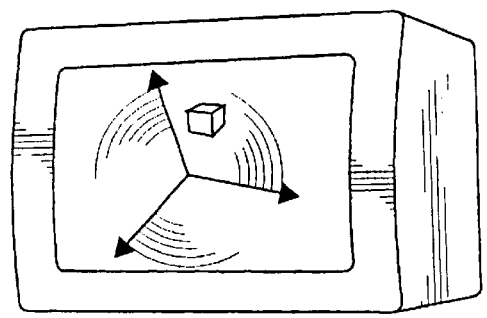
FIG.33a2
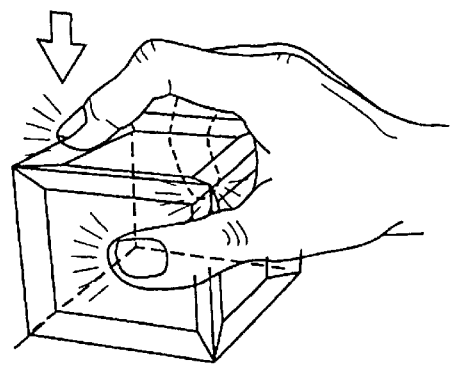
FIG.33b1
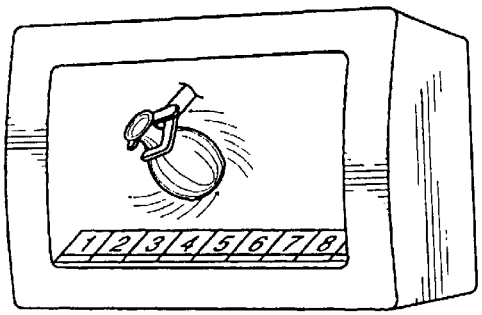
FIG.33b2
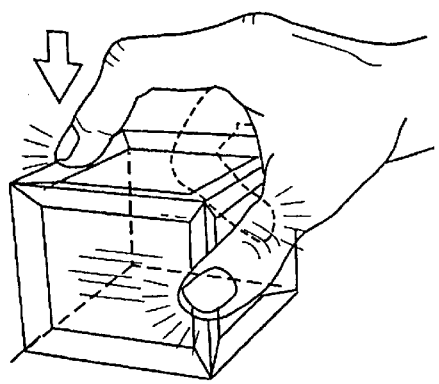
FIG.33c1
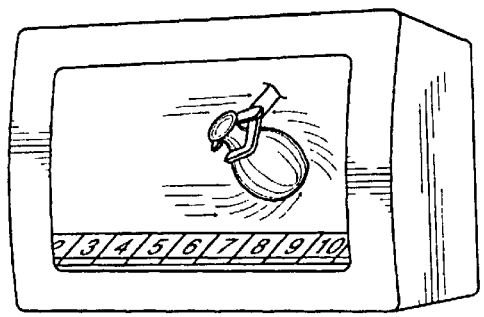
FIG.33c2

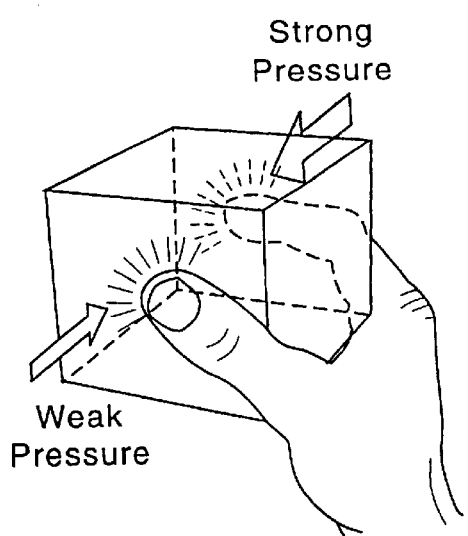
FIG.33d1
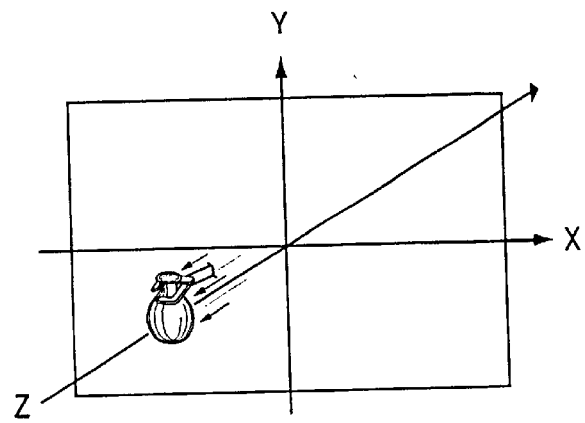
FIG.33d2
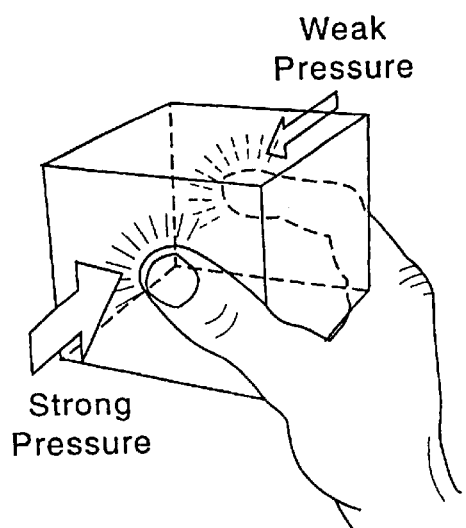
FIG.33d3
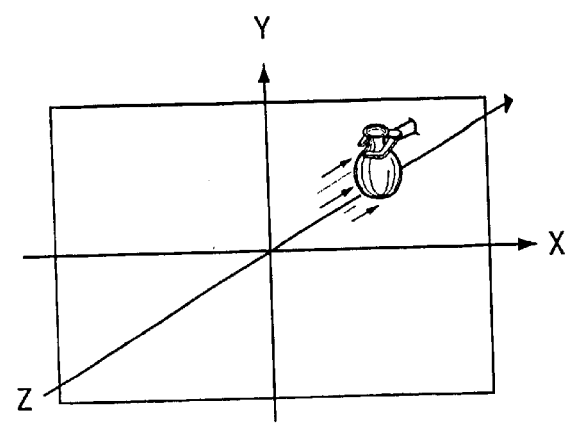
FIG.33d4

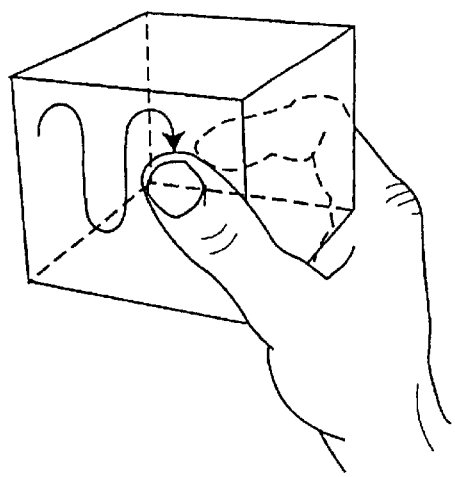
FIG.33d5
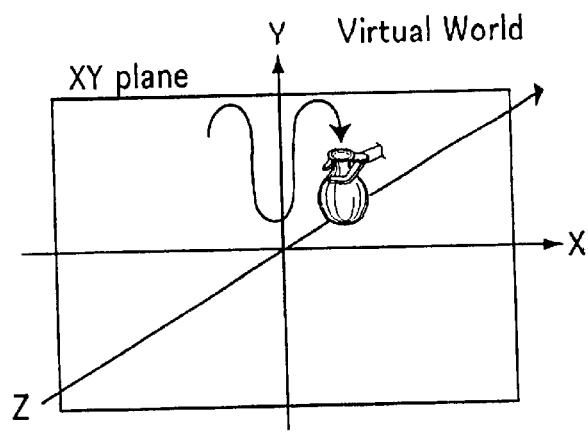
FIG.33d6
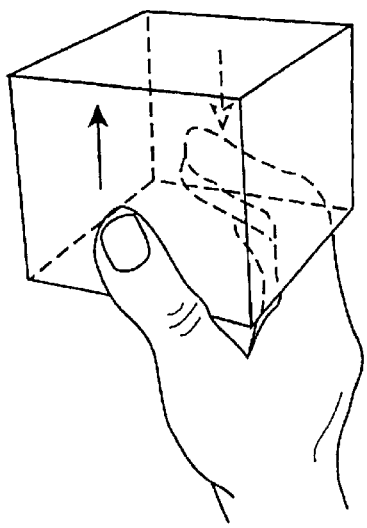
FIG.33e1
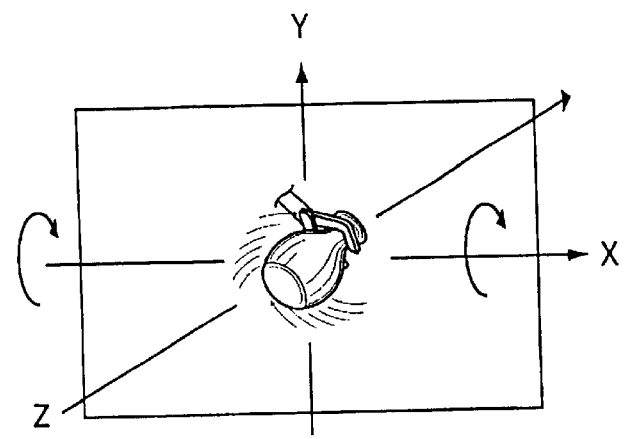
FIG.33e2

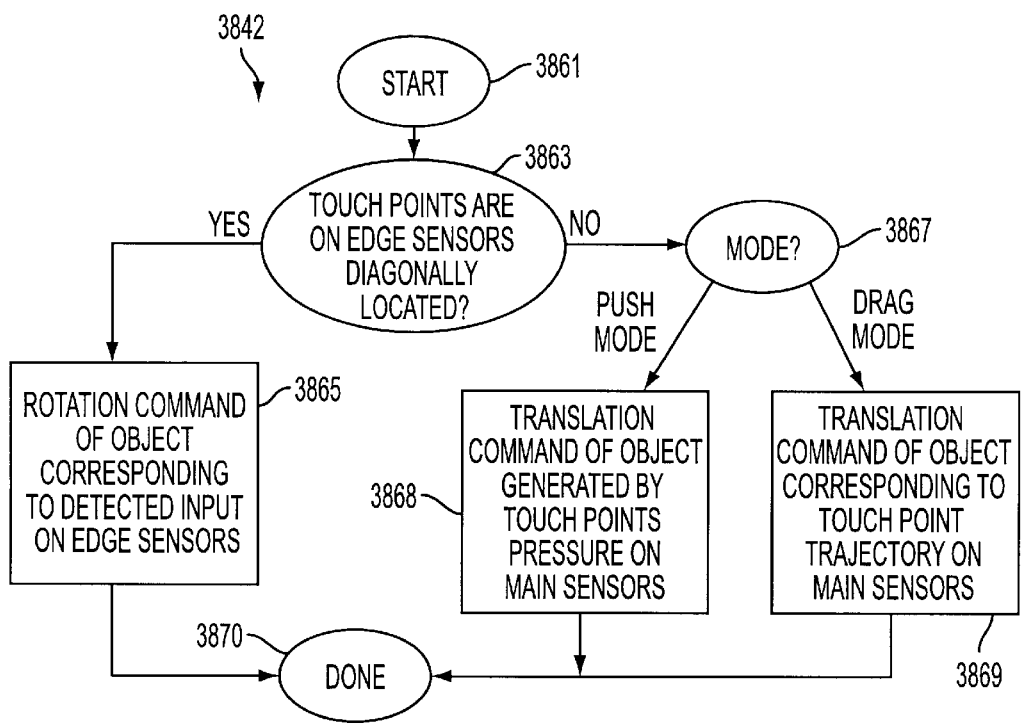
FIG. 43b
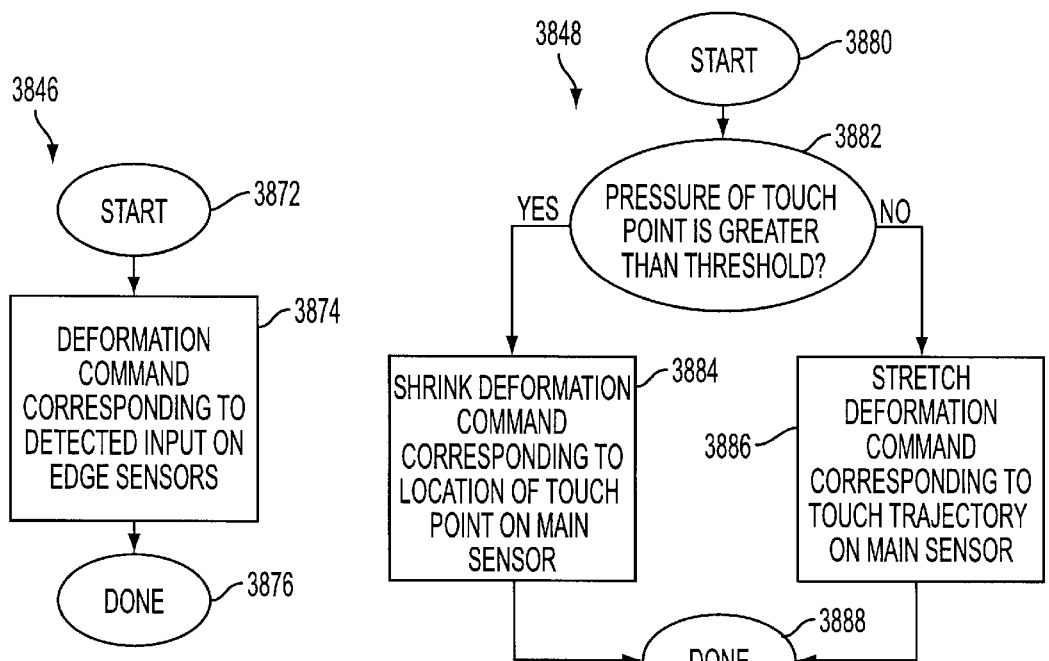
FIG. 43c
FIG. 43d

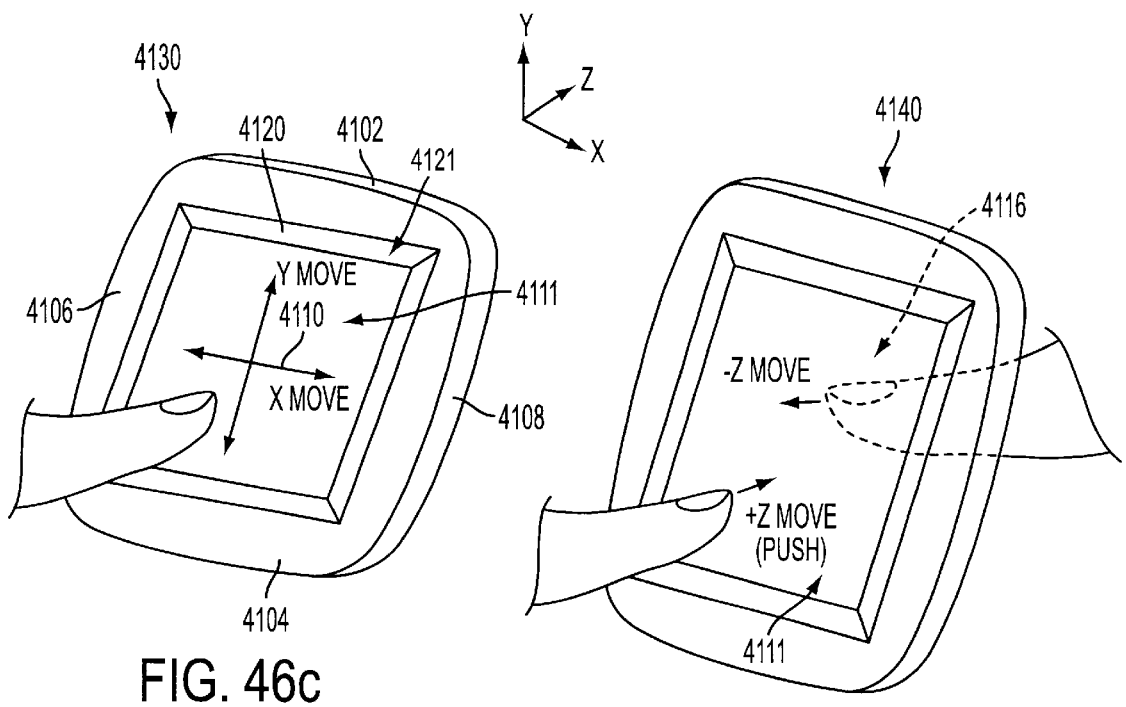
FIG. 46c
FIG. 46e
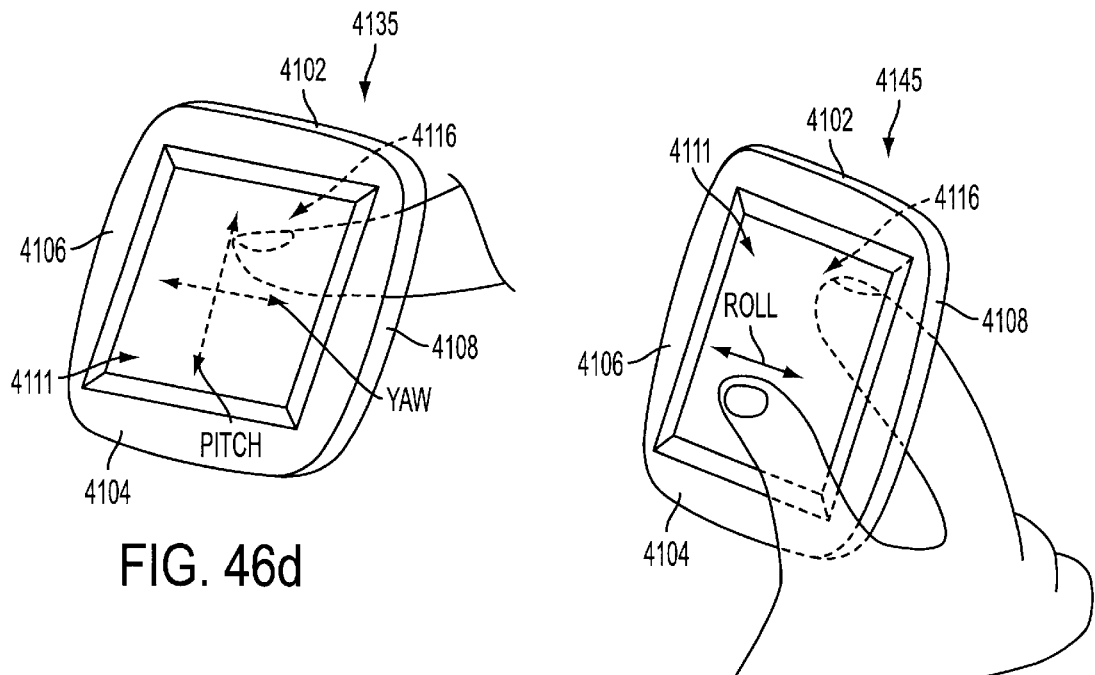
FIG. 46d
FIG. 46f

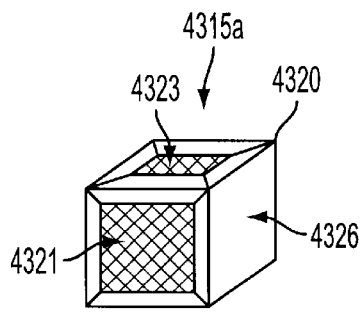
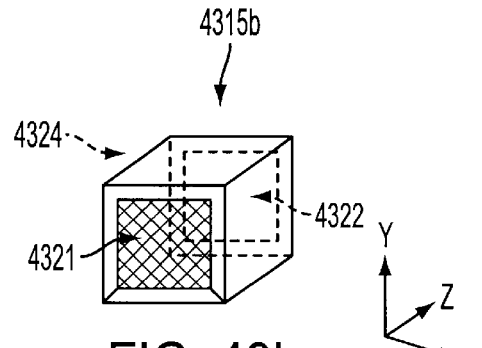
FIG. 49a  FIG. 49b
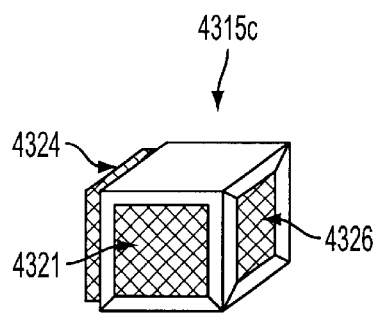
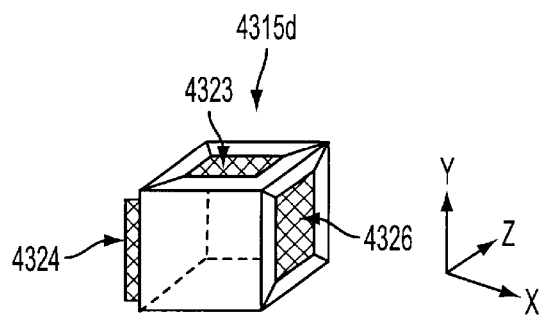
FIG. 49c  FIG. 49d
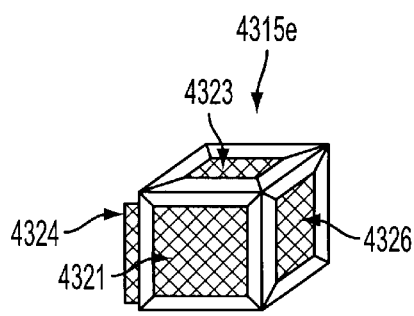
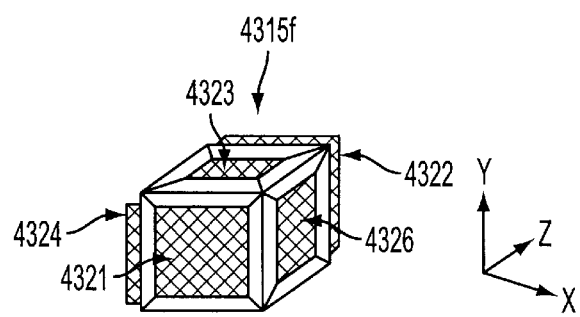
FIG. 49e  FIG. 49f

METHODS AND APPARATUS FOR PROVIDING TOUCH-SENSITIVE INPUT IN MULTIPLE DEGREES OF FREEDOM

CROSS REFERENCE TO RELATED APPLICATIONS

The present application is a continuation-in-part of U.S. patent application Ser. No. 08/696,366 filed on Aug. 13, 1996, now abandoned which is a continuation-in-part of U.S. patent application Ser. No. 08/509,797 filed on Aug. 1, 1995, now U.S. Pat. No. 5,729,249, which is a continuation of U.S. patent application Ser. No. 08/238,257 filed on May 3, 1994, now abandoned, which is a continuation-in-part of U.S. patent application Ser. No. 07/798,572 filed on Nov. 26, 1991, now U.S. Pat. No. 5,335,557, all of which are incorporated herein by reference. The present application also claims the benefit of U.S. Provisional Application No. 60/086,036, filed May 19, 1998, which is incorporated herein by reference.

BACKGROUND OF THE INVENTION

1. Field of the Invention

The present invention relates to the field of input control devices. More specifically, it relates to force-sensitive input-control devices with multiple surfaces capable of providing intuitive input in one to thirty-six degrees of freedom.

2. Description of the Related Art (a) Prior Art 3D and 6D Input Control Devices

Two-dimensional input control devices such as mice, joysticks, trackballs, light pens and tablets are commonly used for interactive computer graphics. These devices are refined, accurate and easy to use. Three-dimensional ("3D") devices allow for the positioning of cursors or objects relative to conventional X, Y and Z coordinates. Six-dimensional ("6D") devices are also capable of orienting or rotating objects. More specifically, 6D devices may provide position information as in a 3D device and further provide rotational control about each of three axes, commonly referred to as roll, pitch and yaw. However, current 3D and 6D input devices do not exhibit the refinement, accuracy or ease of use characteristic of existing 2D input devices. In fact, existing 3D/6D input devices are typically cumbersome, inaccurate, non-intuitive, tiring to use, and limited in their ability to manipulate objects.

One well known category of 3D computer controllers are the "computer gloves," such as the Power Glove controller distributed by Mattel, Inc. Similar devices include the Exos Dextrous Hand Master by Exos, Inc., and the Data Glove by VP' Research, Inc. These controllers are worn as a glove and variously include sensors for determining the position and orientation of the glove and the bend of the various fingers. Position and orientation information is provided by ranging information between multiple electromagnetic or acoustic transducers on a base unit and corresponding sensors on the glove. However, the user is required to wear a bulky and awkward glove and movement of these awkward controllers in free space is tiring. Further, these devices are typically affected by electromagnetic or acoustic interference, and they are limited in their ability to manipulate objects because of the inherent dissimilarity between the free-form movement of a glove and the more constrained movement of manipulated objects.

A second category of 3D/6D controllers are referred to as "Flying Mice." The Bird controller by Ascension Technology Corp. of Burlington, Vt. tracks position and orientation in six-dimensions using pulsed (DC) magnetic fields. However, it is affected by the presence of metals and also requires manipulating the controller in free space. The 2D/6D Mouse of Logitech Inc. is similar in function, but uses acoustic ranging similar to the Mattel device. The 3SPACE sensor from Polhemus, described in U.S. Pat. No. 4,017,858, issued to Jack Kuipers Apr. 12, 1977, uses electromagnetic coupling between three transmitter antennas and three receiver antennas. Three transmitter antenna coils are orthogonally arranged as are three receiver antennas, and the nine transmitter/receiver combinations provide three dimensional position and orientation information. However, all "flying mouse" devices require the undesirable and tiring movement of the user's entire arm to manipulate the controller in free space. Further, these devices are either tethered by a cord or sensitive to either electromagnetic or acoustic noise.

A device similar to the flying mice is taught in U.S Pat. No. 4,839,838. This device is a 6D controller using 6 independent accelerometers in an "inertial mouse." However, the device must still be moved in space, and the use of accelerometers rather than ranging devices limits the accuracy. Another inertial mouse system is taught in U.S. Pat. No. 4,787,051 issued to Lynn T. Olson.

A third category of 3D/6D controllers includes 3D/6D joysticks and trackballs. Spaceball of Spatial Systems, Inc. is a rigid sphere containing strain gauges or optical sensors to measure the forces and torques applied to a motionless ball. The user pushes, pulls or twists the ball to generate 3D translation and orientation control signals. Spaceball is described in detail in U.S. Pat. No. 4,811,608 issued to John A. Hilton Mar. 14, 1989. Similarly, the DIMENSION 6/Geoball controller distributed by CiS Graphics Inc. incorporates a 6-axis optical torque sensor housed in a spherical enclosure. The device measures translational forces and rotational torques. However, these devices are subject to a number of disadvantages. For example, it is difficult to provide for precise positioning, as there is no provision for the use of a stylus. Further, these devices are primarily controlled with hand muscles, rather than with the more precise finger muscles. Further still, these devices provide for only relative control and have no provision for providing an absolute origins or an absolute positions. They are therefor not suitable for providing closure in digitized 3D inputs. Finally, they are limited in their ability to provide an intuitive feel for 3D manipulation of a controlled object not specified in the Cartesian coordinate system. For example, they are not readily adaptable to spherical or cylindrical coordinate systems.

(b) Prior Art Force-sensitive Transducers

Force-sensitive transducers are characterized in that they do not require a significant amount of motion in order to provide a control input. These devices have appeared in a number of configurations, some of which are capable of sensing not only the presence or non-presence of the touch of a user's finger or stylus, but also the ability to quantitatively measure the amount of force applied. One such a device is available from Tekscan, Inc. of Boston, Mass. This device includes several force-sensitive pads in a grid-based matrix that can detect the force and position of multiple fingers at one time. Another force-sensitive device is available from Intelligent Computer Music Systems, Inc. of Albany, N.Y. under the TouchSurface trademark. The TouchSurface device can continuously follow the movement and pressure of a fingertip or stylus on its surface by responding to the position (X and Y) at which the surface is touched and to the force (Z) with which it is touched. Further, if two positions are touched simultaneously in the TouchSurface device, an average position of the two positions is provided. However, these devices are currently limited in manipulating objects beyond 2.5 dimensions, i.e. X-position, Y-position, and positive Z-direction, and are not available in any intuitive controllers.

Force-sensitive transducers have been used in two-dimensional applications in place of spring-loaded joysticks. For example, U.S. Pat. No. 4,719,538 issued to John D. Cox teaches using force-responsive capacitive-transducers in a joystick-type device. However, these devices do not typically provide for 3D/6D inputs. An augmented 2D controller using force-sensitive devices is taught in U.S. Pat. No. 4,896,543 issued to Larry S. Gullman. Gullman describes a three-axis force measurement stylus used as a computer input device wherein the forces sensed by the stylus are used for recognizing ciphers, selecting colors, or establishing line widths and line densities. However, this device does not provide inputs for roll, yaw or pitch, and does not provide any input for a negative Z input (i.e. there is no input once the stylus is lifted). Thus, it is limited in its ability to provide 3D positioning information, as this would require an undesirable bias of some sort.

(c) Prior Art 3D/6D Field Controllers

3D/6D controllers are found in many field applications, such as controllers for heavy equipment. These devices must be rugged, accurate and immune from the affects of noise. Accordingly, many input control devices used for interactive computer graphics are not suitable for use in field applications. As a result, heavy equipment controllers typically consist of a baffling array of heavy-but-reliable levers which have little if any intuitive relationship to the function being performed. For example, a typical heavy crane includes separate lever controls for boom rotation (swing), boom telescope (extension), boom lift and hook hoist. This poor user interface requires the operator to select and select and pull one of a number of levers corresponding to the boom rotation control to cause the boom to rotate to the left. Such non-intuitive controls makes training difficult and time-consuming and increases the likelihood of accidents.

Accordingly, it is desirable to provide a 3D/6D controller that is easy to use, inexpensive, accurate, intuitive, not sensitive to electromagnetic or acoustic interference, and flexible in its ability to manipulate objects. Specifically, a substantial need exists for a graphical input device capable of providing for the precision manipulation of position and spatial orientation of an object. It is desirable that the device accept intuitive and simple input actions such as finger motion to manipulate position and orientation and does not require manipulation of a controller in free space or otherwise cause fatigue. It is desirable that the device provide the dual-functionality of both absolute and relative inputs, that is, inputs similar to a data tablet or touch panel that provide for absolute origins and positions, and inputs similar to mice and trackballs that report changes from former positions and orientations. It is desirable that the device recognize multiple points for versatile positioning and spatial orientation of one or more objects and allow the use of multiple finger touch to point or move a controlled object in a precise manner.

SUMMARY OF THE INVENTION

An input controller of the present invention incorporates multiple force/touch sensitive input elements and provides intuitive input in up to 36 degrees-of-freedom, including position and rotation, in either a Cartesian, cylindrical or spherical coordinate system. Input can be provided in the provided degrees of freedom without requiring movement of the controller, so that the controller is suitable for controlling both cursors or other computer objects in an interactive computer system and for controlling equipment such as heavy cranes and fork lift trucks.

More specifically, the preferred embodiment of the present invention provides a substantially cube-shaped input controller which includes a sensor on each of the six faces of the controller. The sensors are sensitive to the touch of a user's finger or other pointing object. In various embodiments, a controlled object may be translated by either a "pushing" or "dragging" metaphor on various faces of the controller. A controlled object may be rotated by either a "pushing," "twisting," or "gesture" metaphor on various faces of the controller. In certain embodiments, the same sensor is used for both position and rotational inputs, and the two are differentiated by the magnitude of the force applied to the sensor. Preferably, each sensor includes a main sensor located near the center portion of each face of the controller, and a number of edge sensors surrounding the main sensor and located proximate to the edges of each face of the controller.

According to one embodiment, each face of the controller can be used to provide input in six degrees of freedom to each control an object. If every face of the controller is used, a total of thirty-six degrees of freedom may be utilized. This allows the simultaneous control of multiple objects. In one embodiment, a computer generated object displayed on a computer screen includes a virtual hand. The entire hand and individual fingers of the hand may be simultaneously moved in several degrees of freedom by the user when providing input on multiple faces of the controller at the same time. In other embodiments, sets of faces can each control a separate object. For example, two opposing faces on the controller can command the translation and rotation of one object, while two different opposing faces can command the translation and rotation of a second object.

In a different embodiment, the controller of the present invention can be used to provide input to an application program implemented by a computer system, such as a computer aided design (CAD) program. A front face on the controller can be used to control a cursor in the program, and left and right faces can provide commands equivalent to left and right buttons on a mouse or other pointing device typically used with the program. An object displayed by the CAD program can be manipulated by using two touch points simultaneously. An object can be deformed, such as twisted, shrunk, or stretched, by providing input on the edge sensors of the controller. Two points of an object can be simultaneously deformed using separate faces of the controller.

In another embodiment, "pseudo force feedback" is provided to the user when the user controls a computer-generated object in a virtual environment. When a user-controlled computer object, such as a virtual hand, engages another object in the virtual environment, such as an obstacle, the user-controlled object is not allowed to move further in the direction of the obstacle object. The user thus feels the surface of the controller as if it were the surface of the obstacle, and receives visual feedback confirming this pseudo-sensation. In another embodiment, active tactile feedback can be provided to the user with the use of tactile sensation generators, such as vibratory diaphragms, placed on the controller or on peripheral surfaces to the controller.

The present invention provides an intuitive, inexpensive, and accurate controller for providing input in 3 or more degrees of freedom. The controller is flexible in its ability to manipulate objects and provide a relatively large number of degrees of freedom for a user, such that multiple objects can be manipulated simultaneously by a user. This allows realistic control of objects such as virtual hands in a simulated environment. In addition, the controller is not manipulated in free space and thus does not cause hand fatigue. The multiple dimensions of input can be generated without requiring movement of the controller, which provides a controller suitable for controlling both cursors and displayed objects in an interactive computer system. Further, the controller is insensitive to acoustic or electromagnetic noise and is thus suitable for controlling equipment such as heavy cranes and forklift trucks.

These and other advantages of the present invention will become apparent to those skilled in the art upon a reading of the following specification of the invention and a study of the several figures of the drawing.

BRIEF DESCRIPTION OF THE DRAWINGS

FIG. 9b is an illustration of sensing yaw with reference to the controller of FIG. 9a;

FIG. 9c is an illustration of sensing roll with reference to the controller of FIG. 9a;

FIG. 9d is an illustration of sensing pitch with reference to the controller of FIG. 9a;

FIG. 16 illustrates a wedge controller adapted for use in controlling a mobile crane;

FIG. 17 illustrates a mobile crane;

FIG. 18 illustrates a controller for use in a spherical coordinate system;

FIGS. 20a and 20b illustrate an alternative technique for generating rotation commands using the controller of FIG. 6;

FIGS. 21a, 21b, 22, 23 and 24 illustrate techniques for generating rotation using the controller of FIG. 6;

FIGS. 28a–28f illustrate the protocol for grasp-move gestures in conjunction with the controller of FIG. 25;

FIG. 31 is a flow diagram illustrating the interpretation of touch points on a controller when there is a detection of a single touch point on a matrix-sensor;

FIG. 31a illustrates a specified region on the controller of the present invention;

FIGS. 33a1, 33a2, 33b1, 33b2, 33c1, 33c2, 33d1, 33d2, 33d3, 33d4, 33d5, 33d6, 33e1, and 33e2 illustrate the interpretation of various gestures;

FIG. 43b is a flow diagram illustrating the step of FIG. 43 of moving the object using the controller;

FIG. 43c is a flow diagram illustrating the step of FIG. 43 of twisting the object using the controller;

FIG. 43d is a flow diagram illustrating the step of FIG. 43 of shrinking or stretching the object using the controller;

FIG. 46b is a side view of the controller from the right edge taken along line 46b—46b of FIG. 46a;

FIG. 46c illustrates a method of operating the controller of FIG. 46a to produce an x,y translation signal in the Cartesian coordinate system;

FIG. 46d illustrates a method of operating the controller of FIG. 46a to produce a yaw and pitch rotation signal;

FIG. 46e illustrates a method of operating the controller of FIG. 46a to produce a series of z coordinates in the Cartesian coordinate system;

FIG. 46f illustrates a method of operating the controller of FIG. 46a to produce a roll rotation signal;

FIG. 47b is a top view of the controller of FIG. 47a;

FIGS. 49a–f illustrate several different embodiments of a number of controllers 4315a–f in accordance with the present invention;

DETAILED DESCRIPTION OF THE PREFERRED EMBODIMENTS

Figure 1:
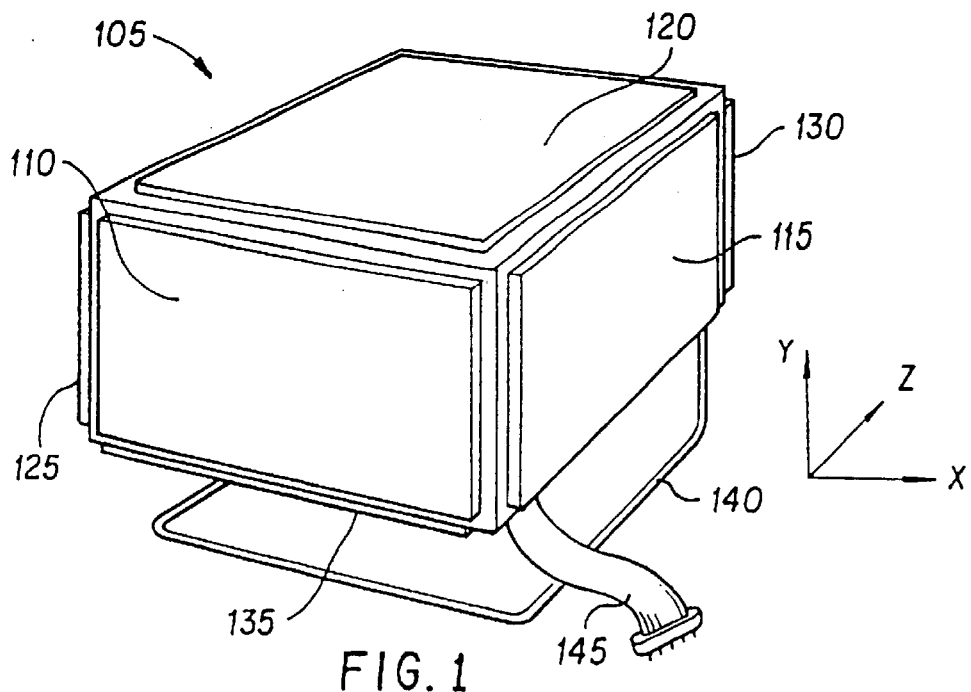
FIG. 1 is an illustration of a 3D controller having six force/touch sensitive sensors.

FIG. 1 is an illustration of a force/touch sensitive 3D controller in accordance with a first embodiment of the present invention. A controller 105 is shaped substantially in the form of a cube having six faces or sides, i.e. controller 105 can be provided as a cube shape or other similar shapes, such as a rectilinear object or cube having rounded edges or the like. Alternatively, controller 105 can have other shapes. A first force-sensitive sensor pad 110 is positioned on the front face of controller 105. A second force-sensitive sensor pad 115 is positioned on the right side of controller 105. A third force-sensitive sensor pad 120 is positioned on the top side of controller 105. A fourth force-sensitive sensor pad 125 is positioned on the left side of controller 105. A fifth force-sensitive sensor pad 130 is positioned on the back side of controller 105. A sixth force-sensitive sensor pad 135 is positioned on the bottom side of controller 105. A frame 140 is attached to the edge of controller 105 between the bottom and back surfaces, allowing access to all six surfaces of controller 105. Control harness 145 is coupled to the six force-sensitive sensor pads 110, 115, 120, 125, 130, and 135 and provides signals in response to the application of pressure to the pads. The signals are preferably input to a computer system or object controlled by the controller 105. The computer system, for example, can display a computer-generated object that can be manipulated in simulated space by the controller 105. Alternatively, a real object, such as a crane, can be manipulated by the controller 105. These embodiments are described in greater detail below.

Controller 105 is operated by pressing on any of the six force-sensitive pads. This pressure is preferably applied with one or more of the user's fingers. Alternatively, other objects can be used to apply pressure, such as a stylus or other article. The sensor pads can detect even a small amount of pressure so that the user need only touch the pads. In the described embodiment, the planar faces and the sensor pads of the controller 105 are rigid and do not substantially deform under the pressure from the user. Thus, accurate x, y, and z-axis commands, referenced to the faces of the controller, can be provided at any point touched on the sensor pads.

The user interface is intuitive since a real or computer generated object will move as if it is responding to the pressure (i.e., force) on controller 105. For example, pressing down on force-sensitive pad 120, positioned on the top of controller 105, will cause a controlled object to move downward (−Y). Similarly, pressing up on force-sensitive pad 135, positioned on the bottom of controller 105, will cause the object to move upward (+Y). Pressing the controller towards the user, by pressing on force-sensitive pad 130, positioned on the back of controller 105, will cause the object to move towards the user (−Z). Pressing the controller away from the user, by pressing on force-sensitive pad 110, positioned on the front of controller 105, will cause the object to move away from the user (+Z). Pressing the controller to the left, by pressing on force-sensitive pad 115 on the right side of controller 105, will cause the object to move to the left (−X). Similarly, pressing the controller to the right, by pressing on force-sensitive pad 125, positioned on the left side of controller 105, will cause the object to move to the right (+X).

One advantage of the controller 105 is that it exhibits a zero neutral force, i.e., the controller does not require a force on any sensors or mechanical members to maintain a neutral position. The user merely stops applying pressure to the sensors, and the controller is in a neutral state that does not input movement signals to the computer 220.

Figure 2:
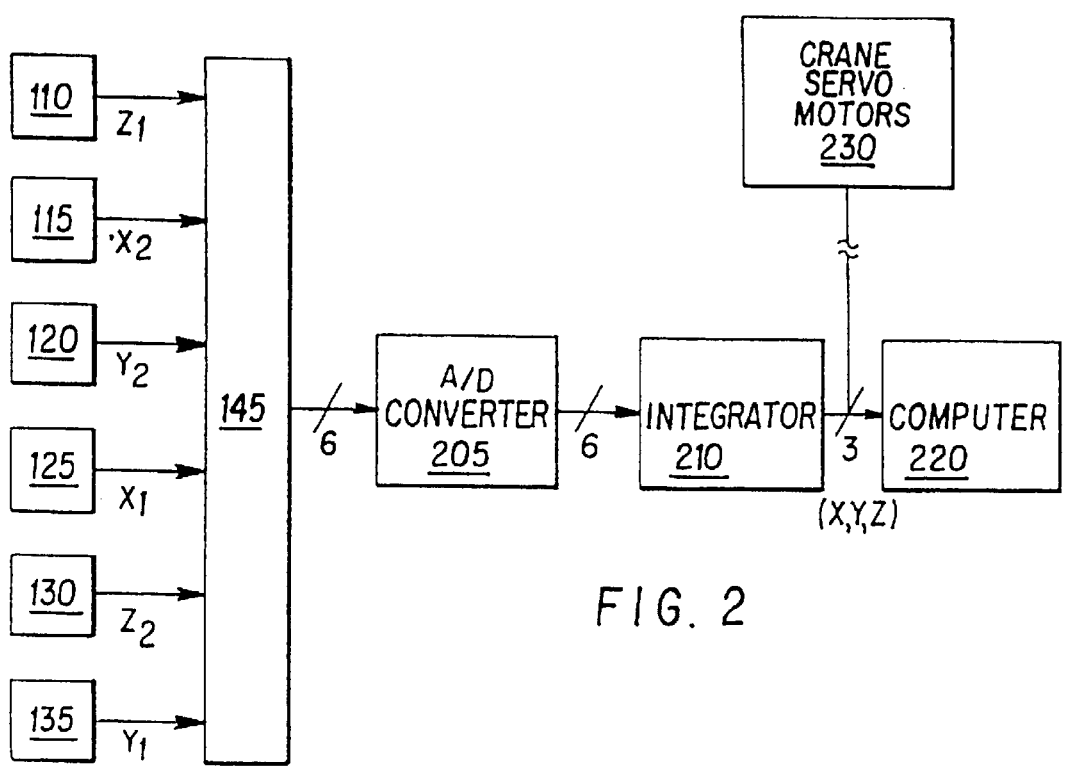
FIG. 2 is a block diagram of the control electronics of the 3D controller of FIG. 1.

FIG. 2 illustrates a block diagram of the controller electronics used to provide 3D position information in conjunction with the controller of FIG. 1. Force sensitive pads 110, 115, 120, 125, 130, and 135 are coupled to control harness 145, which couples all six force-sensitive pads to A/D converter 205. A/D converter 205 converts the analog signals from each of the force-sensitive pads into digital signals. The six digitized signals are coupled to integrator 210. Integrator 210 integrates the difference of the signals from the left and right force-sensitive pads 125 and 115 to provide an X position signal $(X=\int(X_{125}-X_{115})dt)$; integrates the difference of the signals from the top and bottom force-sensitive pads 120 and 135 to provide a Y position signal $(Y=\int(Y_{135}-Y_{120})dt)$; and integrates the difference of the signals from the front and back force-sensitive pads 110 and 130 to provide a Z position signal $(Z=\int(Z_{110}-Z_{130})dt)$. The three position signals X, Y and Z are then coupled to a computer 220 to control the position of a cursor or object displayed on a display device coupled to the computer 220. Alternatively, the position signals can be used for servo controls for heavy equipment, such as crane servo motors 230.

In the preferred first embodiment controller 105 is sensitive to the presence of a touch input and A/D converter 205 provides a binary signal output to integrator 210 for each force-sensitive pad. This provides a controller that provides a single "speed", that is, activation of a force-sensitive pad will result in the cursor, object or equipment moving in the desired direction at a certain speed. Alternatively, force-sensitive pads 110, 115, 120, 125, 130 and 135 can be of the type that provide analog outputs responsive to the magnitude of the applied force, A/D converter 205 can be of the type that provides a multi-bit digital signal, and integrator 210 can be of the type that integrates multi-bit values. The use of a multi-bit signals allows for multiple "speeds," that is, the speed of the cursor or object movement in a given direction will be responsive to the magnitude of the force applied to the corresponding force-sensitive pads.

Figure 3:
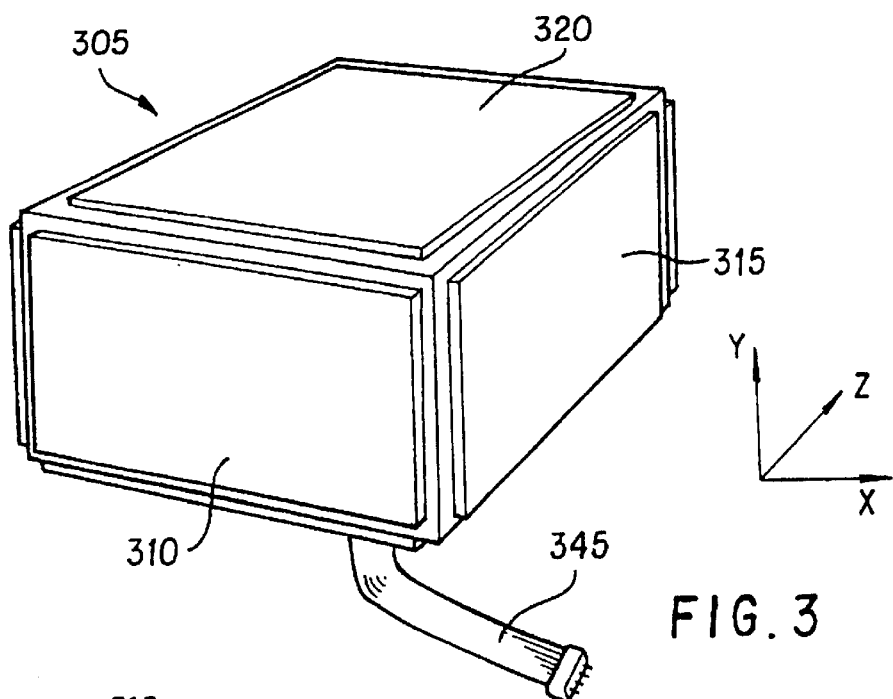
FIG. 3 is an illustration of a 6D controller having three X-Y-position and force/touch sensitive sensors.
Figure 4A:
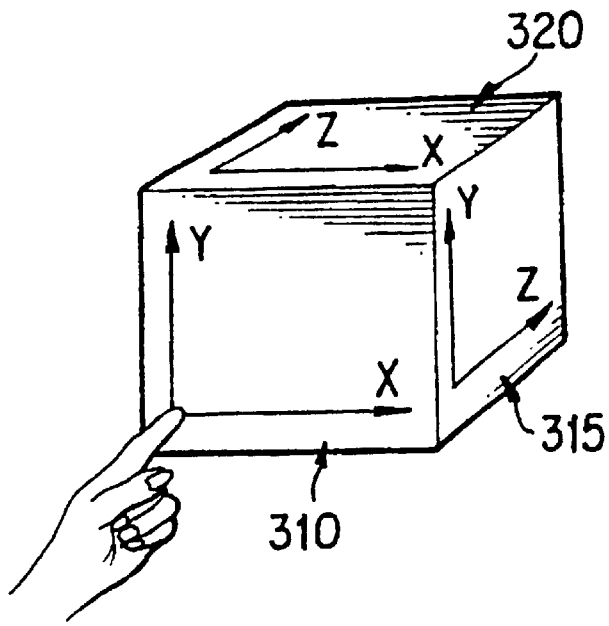
FIG. 4a illustrates the user interface of the controller of FIG. 3 with regards to position information.

FIG. 3 is an illustration of a force/touch sensitive 6D controller in accordance with a second embodiment of the present invention. Controller 305 is also shaped in the form of a cube, however this controller uses three force-sensitive matrix sensors. A first force-sensitive matrix sensor 310 is positioned on the front of controller 305. Sensor 310 provides two analog signals in response to the position of an applied force, which provides X and Y position information as illustrated in FIG. 4a. Sensor 310 also provides a third signal in response to the magnitude of the force applied to sensor 310. A second force-sensitive matrix sensor 315 is positioned on the right side of controller 305. Sensor 315 provides two analog signals in response to the position of the force applied to sensor 315, which will be interpreted by control electronics to provide Y and Z information as illustrated in FIG. 4a. Sensor 315 also provides a third signal responsive to the magnitude of the force applied to sensor 315. A third force-sensitive matrix sensor 320 is positioned on the top side of controller 305. Sensor 320 provides two analog signals in response to the position of the force applied to sensor 320, which will be interpreted by the control electronics to provide Z and X information as illustrated in FIG. 4a.

In operation, sensors 310, 315 and 320 provide redundant X, Y and Z position control of a cursor, object or equipment. That is, Y-position information can be entered on either sensor 310 or 315, X-position information can be entered on either sensor 310 or 320, and Z-position information can be entered on either sensor 315 or 320. The two X inputs are summed to provide the final X position information. Y and Z information is obtained in the same manner. Thus a change in position on a sensor is interpreted as a change of position of the real or computer-generated object, with a fixed or programmable gain.

Figure 4B:
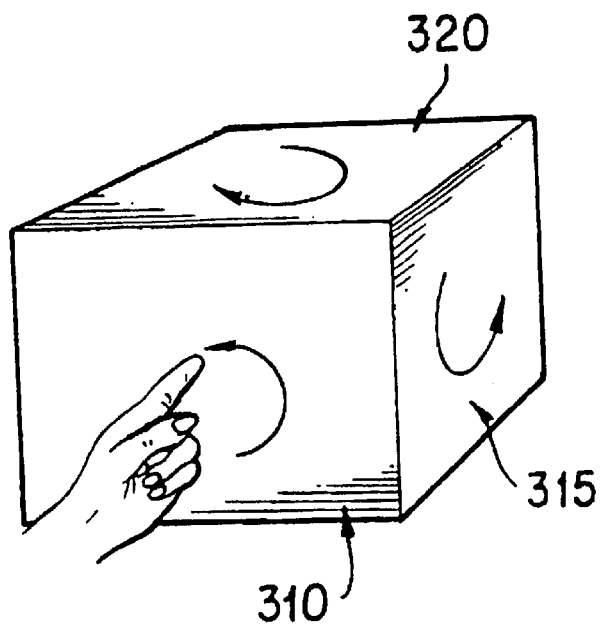
FIG. 4b illustrates the user interface of the controller of FIG. 3 with regards to rotational information.

For applications requiring six degree-of-freedom input, such as manipulating the orientation of an object or equipment, sensors 310, 315 and 320 also provide the pitch, yaw and roll control. Specifically, the third signal provided by each sensor is used to differentiate "light" from "strong" pressures on each sensors. Threshold detector 535, illustrated in FIG. 5, receives the third signal from each sensor and couples the related two analog signals to either position interpreter 540 or to orientation interpreter 545 in response to the third signal being "light" or "strong" respectively. Specifically, when a pressure exceeding a pre-defined threshold is detected, it is interpreted as a "strong" pressure, i.e., an orientation "gesture", and the two analog signals from the affected sensor are used to provide orientation information. Referring to FIG. 4b, when a strong pressure is detected on sensor 310, the two analog signals from sensor 310 are used to provide pitch information about the Z-axis, as indicated by the arrow on sensor 310. Similarly, when a strong pressure is detected on sensor 315, the two analog signals from sensor 315 are used to provide roll information about the X-axis. Finally, when a strong pressure is detected on sensor 320, the two analog signals from sensor 320 are used to provide pitch information about the Y-axis. In alternate embodiments, other types of input can be provided on sensors 310, 315, and 320 to command rotation of the controlled object. For example, trajectory gestures can be input, such as the circle gesture described in FIG. 35*d*, to generate a sequence of positive/negative angle changes and cause the controlled object to rotate. Similarly, a winding, snake-like gesture would cause the controlled object to rotate in alternating directions about an axis.

Figure 5:
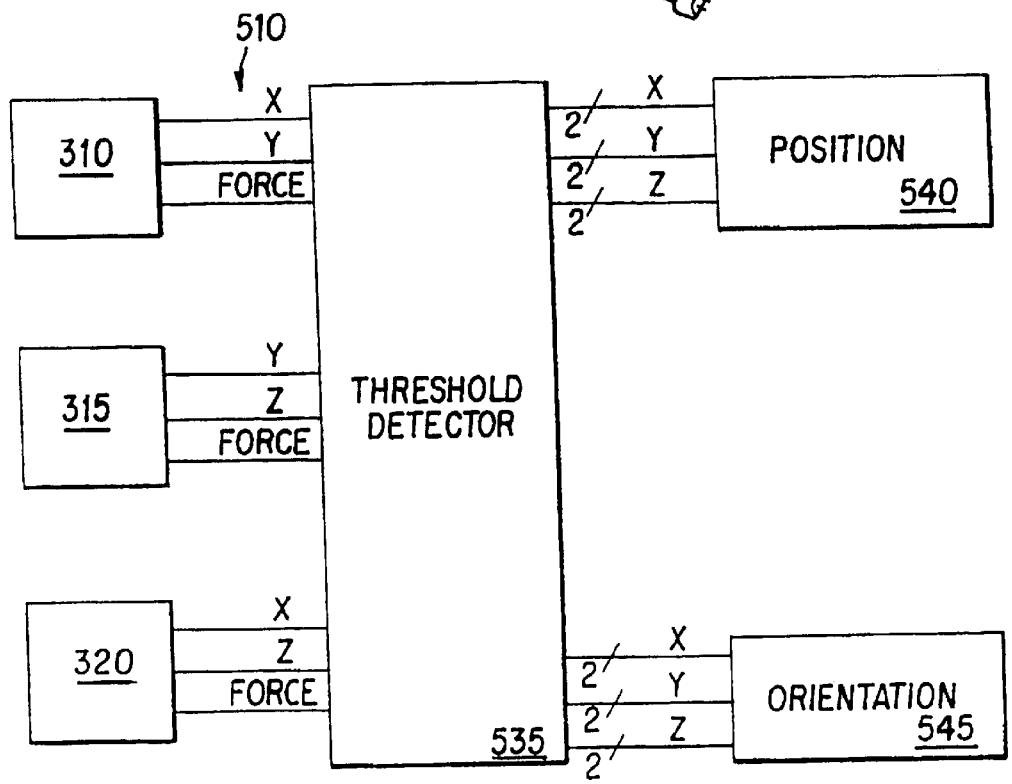
FIG. 5 is a block diagram of the control electronics of the 6D controller of FIG. 3.

FIG. 5 is a block diagram of the control electronics of the 6D controller of FIG. 3. Force-sensitive matrix sensors 310, 315, and 320 are coupled to control harness 510, which couples all three force-sensitive matrix sensors to threshold detector 535. A threshold detector 535 directs sensor information to either position interpreter 540 or orientation interpreter 545 in response to the magnitude of the force signal. Position interpreter 540 can operate in either of two modes. In an absolute mode, the position of the X-signal is directly translated to the X-position of the cursor or object. If two inputs are present the inputs can be either averaged or the second ignored. In a relative mode, position interpreter 540 responds only to changes in X-values. Again, if two inputs are present they can either be averaged or the second input ignored. The Y and Z information is obtained in a similar manner.

Orientation interpreter 545 interprets rotational "gestures" as rotational control signals. More specifically, when a user applies pressure above the threshold pressure as detected by threshold detector 535, the analog information from the affected sensor is coupled to orientation interpreter 545 and interpreted as an orientation or rotation about the axis perpendicular to that sensor. The angular position of the pressure point is calculated with reference to the center point of the sensor. In a relative operating mode any angular changes are interpreted as rotations. The rotation can be modified by a programmable gain if desired. Orientation interpreter can also operate in an absolute mode. In an absolute mode, the orientation is determined from the two signals from each sensor by determining the angular position of the input relative to the center point of the sensor.

Figure 6:
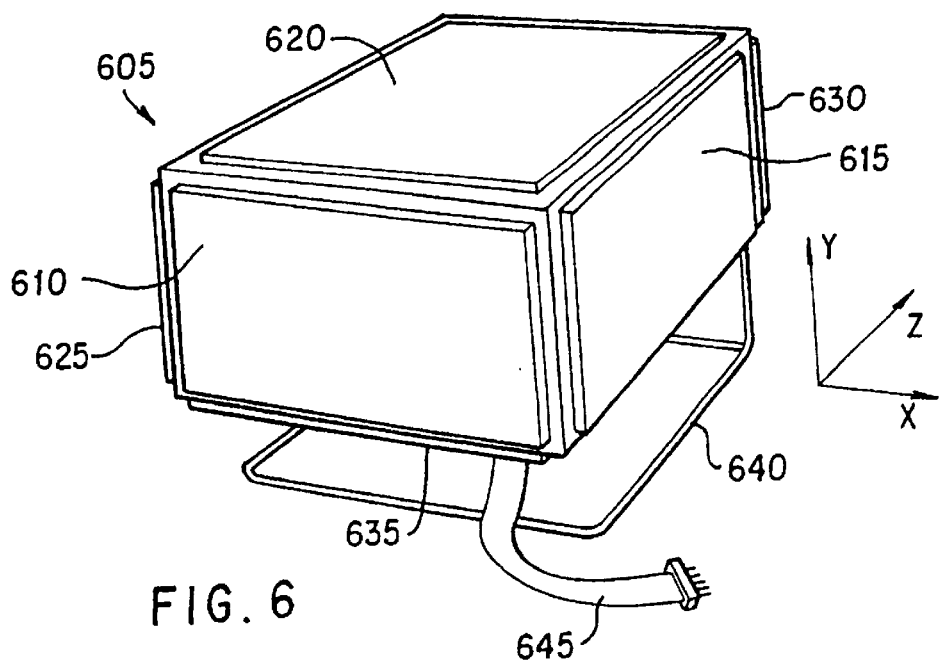
FIG. 6 illustrates a 6D controller having six X-Y-position and force/touch sensitive sensors.

FIG. 6 illustrates a third embodiment of a 6D controller 605. Controller 605 is shaped substantially in the form of a cube. A first force-sensitive matrix sensor 610 is positioned on the front of controller 605. A second force-sensitive matrix sensor 615 is positioned on the right side of controller 605. A third force-sensitive matrix sensor 620 is positioned on the top side of controller 605. A fourth force-sensitive matrix sensor 625 is positioned on the left side of controller 605. A fifth force-sensitive matrix sensor 630 is positioned on the back side of controller 605. A sixth force-sensitive matrix sensor 635 is positioned on the bottom side of controller 605. A frame 640 is attached to the edge of controller 605 between the bottom and back surfaces, allowing the user to access to all six surfaces of controller 605. Control harness 645 is coupled to force-sensitive matrix sensor 610, 615, 620, 625, 630, and 635 and provides signals indicative of the magnitude and the position of the force applied to each sensor.

The X, Y and Z position data and the orientation data is derived in the same way as described with reference to controller 305 illustrated in FIGS. 3 and 4. The additional sensors provide multiple redundant entry capabilities. Specifically, yaw information about the Z-axis can be provided by either sensor 610 or sensor 630. Roll information about the X-axis can be provided by either sensor 615 or sensor 625. Pitch information about the Y-axis can be provided by either sensor 620 or sensor 635. Similarly, X-position information can be provided by sensors 610, 620, 630 and 635. Y-position data can be provided by sensors 610, 615, 630 and 625. Z-position data can be provided by sensors 620, 615, 635, and 625. As before, multiple inputs can be resolved either by averages or by ignoring secondary inputs. More specifically, priority can be given to specific sensors or priority can be given with regards to the relative time of the inputs. Further, inputs can be interpreted on either absolute or relative modes.

Alternatively, rotation commands can be generated by another technique using the 6-sided controller of FIG. 6. Specifically, a rotation command is generated by simultaneously dragging a finger on one panel in a first direction, and dragging another finger on the opposite panel in the opposite direction. For example, as illustrated in FIG. 20*a*, the user's thumb 2010 is dragged vertically upward in a +Y direction on panel 610. Simultaneously, the user's forefinger 2020 is dragged vertically downward in a −Y direction on panel 630. This is interpreted as a positive rotation about the X-axis, as illustrated in FIG. 20*b*, where a displayed (or controlled) object 2030 is rotated about the X-axis as illustrated. More specifically, the position and change-of-position information is detected separately for each of the six panels. When touch points are detected simultaneously on opposite panels, the change-of-position information is compared for the opposite panels. If the change-of-position information indicates that the touch points are moving in substantially opposite directions, a rotation command is generated. Rotation nominally corresponds to the rotation about the affected axis such that a single complete rotation of the touch points about the controller 605 would result in a single revolution of the image. Alternatively, magnifications could be used such that the image would be rotated by an amount proportional to the rotation of the touch points.

Figure 22:
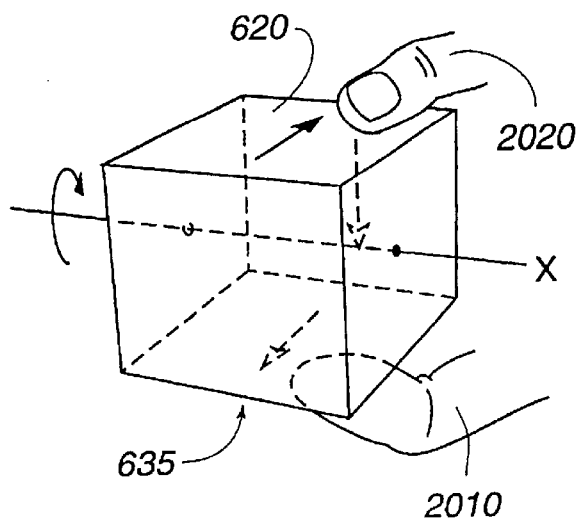
Figure 23:
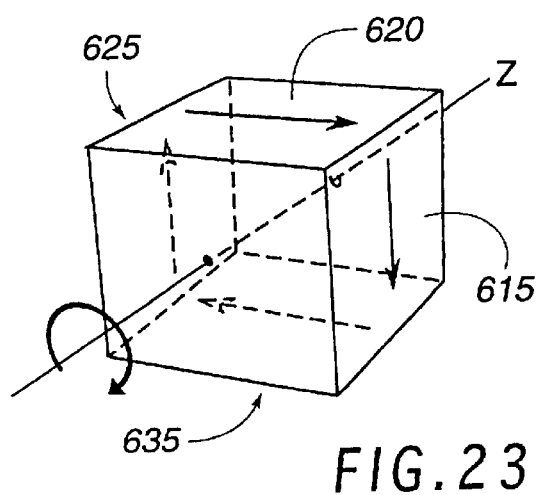
Figure 24:
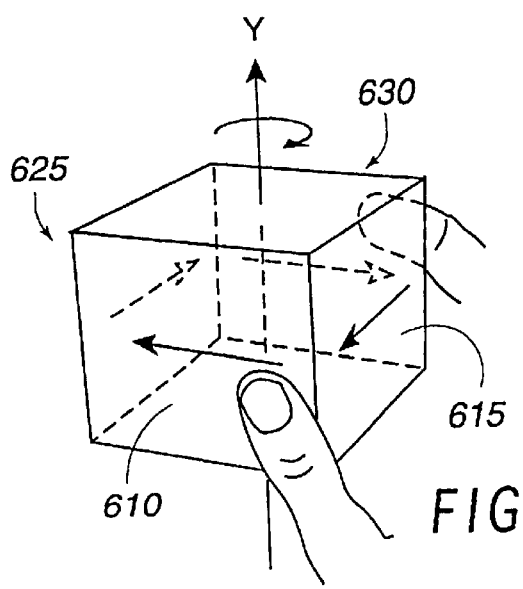

FIG. 21*a* illustrates the gesture corresponding to a negative rotation about the X-axis and FIG. 21*b* illustrates the corresponding movement of display (or controlled) object 2030. Similarly, rotation commands may be provided about the X-axis by gesturing on panels 620 and 635 parallel to the Z-axis, as illustrated in FIG. 22. Similarly again, rotation commands may be provided about the Z-axis by gesturing parallel to the X- and Y-axes on panels 615, 620, 625 and 635 as illustrated in FIG. 23, and about the Y-axis by gesturing parallel to the X- and Z-axes on panels 610, 625, 630 and 615 as illustrated in FIG. 24. The interpretation of the gestures is described more fully below in the section titled Gesture Interpretation.

Figure 7:
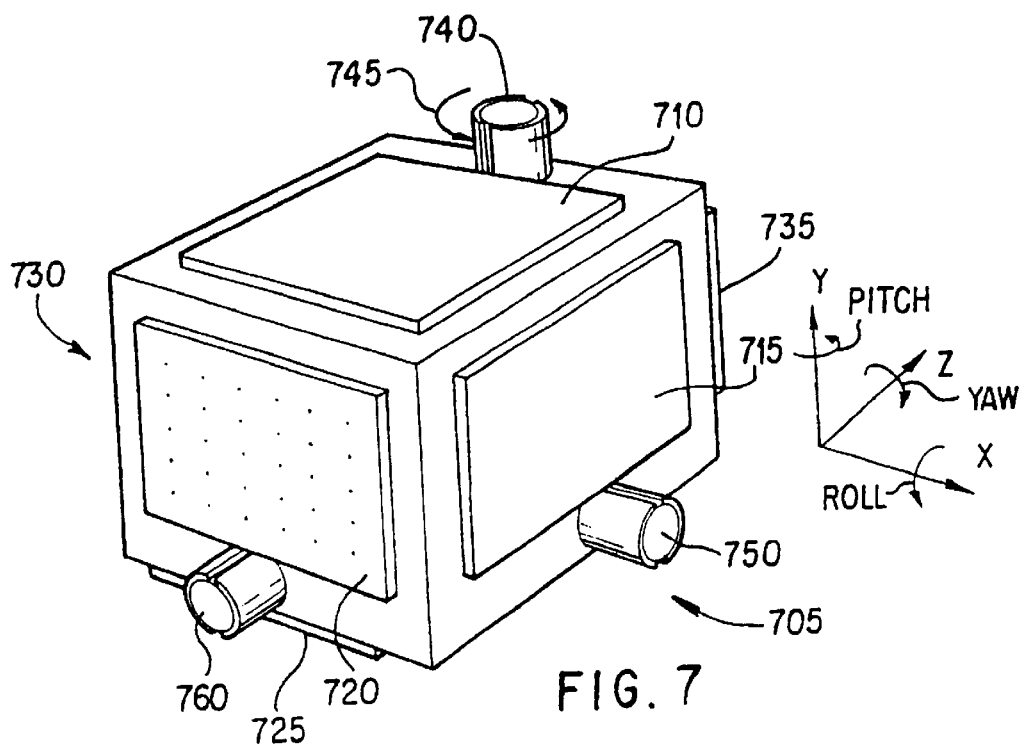
FIG. 7 illustrates a 6D controller having six X-Y-position and force/touch sensitive sensors and three knobs.

A fourth embodiment of a 6D controller 705 is illustrated in FIG. 7. A controller 705 is shaped in the form of a cube with three attached knobs. Six force-sensitive matrix sensors 710, 715, 720, 725, 730 and 735 are positioned on controller 705 in the same manner as explained in detail with regards to controller 605 illustrated in FIG. 6. However, these force-sensitive matrix sensors are used only to generate position commands in the X, Y, and Z directions.

Knobs 740, 750 and 760 provide the orientation information for roll, yaw and pitch. Specifically, knob 740 provides pitch information about the Y-axis, knob 750 provides roll information about the X-axis, and knob 760 provides yaw information about the Z-axis.

As illustrated with regards to knob 740, each knob includes at least one sensor pad that can detect one dimensional information about the circumference of the knob. Preferably, each sensor can average two inputs. Movement of one or two pressure points on a sensor is interpreted as rotation about the axis of that sensor. Thus each knob generates orientation information about one axis in response to twisting of a thumb and finger about that knob. Specifically, sensor 745 on knob 740 provides one-dimensional position information about the circumference of knob 740. In the case of two inputs applied to a sensor, the average position of the two inputs is interpreted in a relative mode, and a programmable gain is provided. More specifically, the rotational command (the change in rotation) is calculated as follows:

$$\theta = G*360°*dl/L$$

Where θ is the rotational command; G is the programmable gain; dl is the change in the average position of the fingers; and L is the circumference of the knob.

For example, twisting the thumb and finger one centimeter on knob 740 is interpreted as 90° of rotation about the Y-axis. Alternatively, the gain can be increased or decreased as desired.

Figure 8:
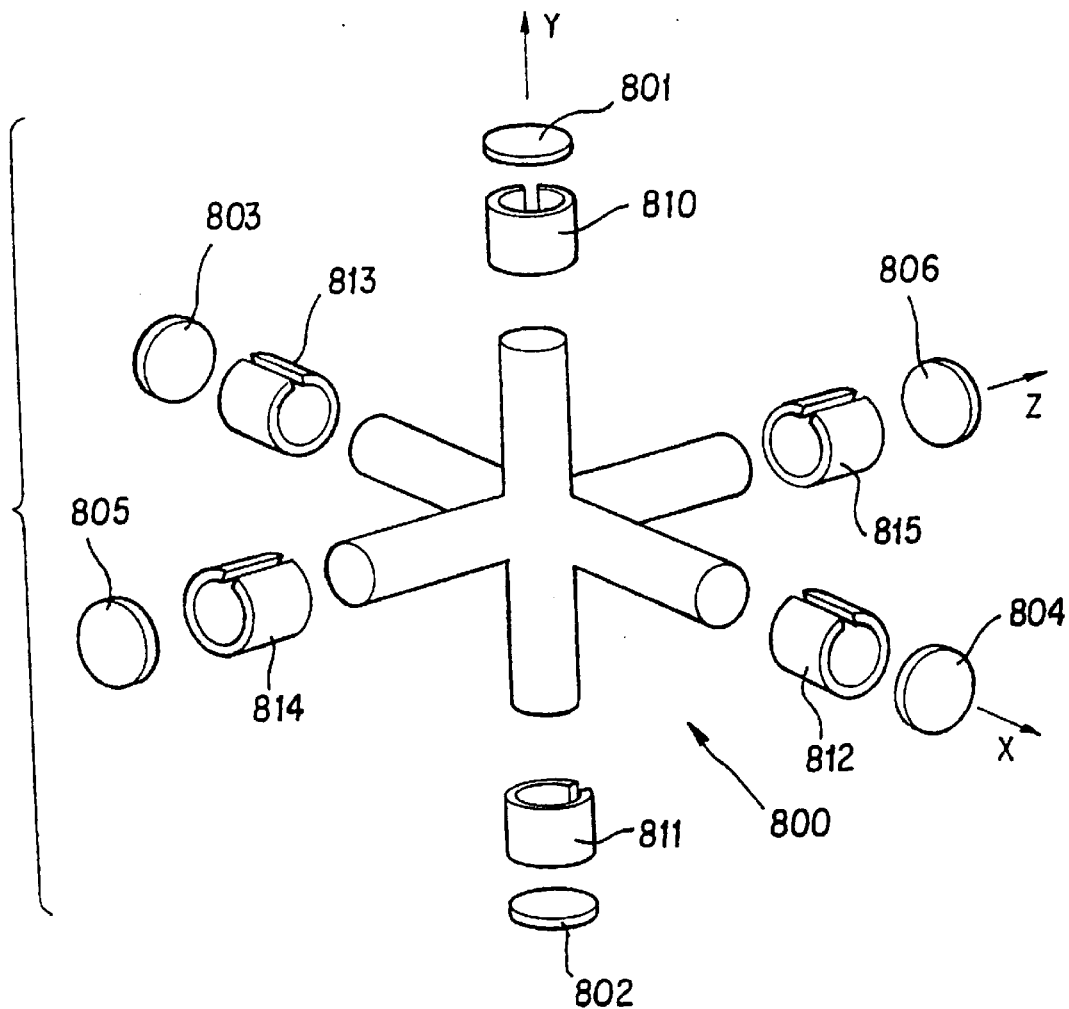
FIG. 8 is an expanded view of a "twist-mode" touch cylinder controller.

FIG. 8 is an expanded view of a touch cylinder 800 in accordance with another embodiment of the present invention. Touch cylinder 800 provides X, Y, and Z position information in response to forces applied to force-sensitive sensors 801, 802, 803, 804, 805, 806 positioned on the ends of six interconnected cylinders comprising touch cylinder 800. These six sensors are coupled and operate in the same manner as the six force-sensitive pad of controller 105 described with reference to FIG. 1. Touch cylinder 800 provides orientation information in response to signals from sensors 810, 811, 812, 813, 814 and 815. These sensors operate in the same manner as three knobs 740, 750 and 760 of controller 705 described with reference to FIG. 7 with the multiple inputs for each axis summed.

Another embodiment of a touch cylinder 900 is illustrated in FIGS. 9a–9d. Again, touch cylinder 900 is constructed of six cylinders, each aligned along a Cartesian coordinate, and connected together at the origin of the Cartesian coordinate system. Each cylinder has force-sensitive sensors on its end for position information as in touch cylinder 800. However, touch cylinder 900 derives rotational information in a different manner. Specifically, the circumference of each cylinder is covered with a force-sensitive sensor that is divided into at least four sections. For example, the cylinder aligned in the +X direction includes sections 901, 902, 903, and 904. Each section covers 90° along the circumference of the cylinder. Similarly, the other five cylinders are also covered by force-sensitive sensors each with four sections. As illustrated, the centers of each of the sections lie on a plane of the Cartesian coordinate system defined by the six cylinders.

Figure 9A:
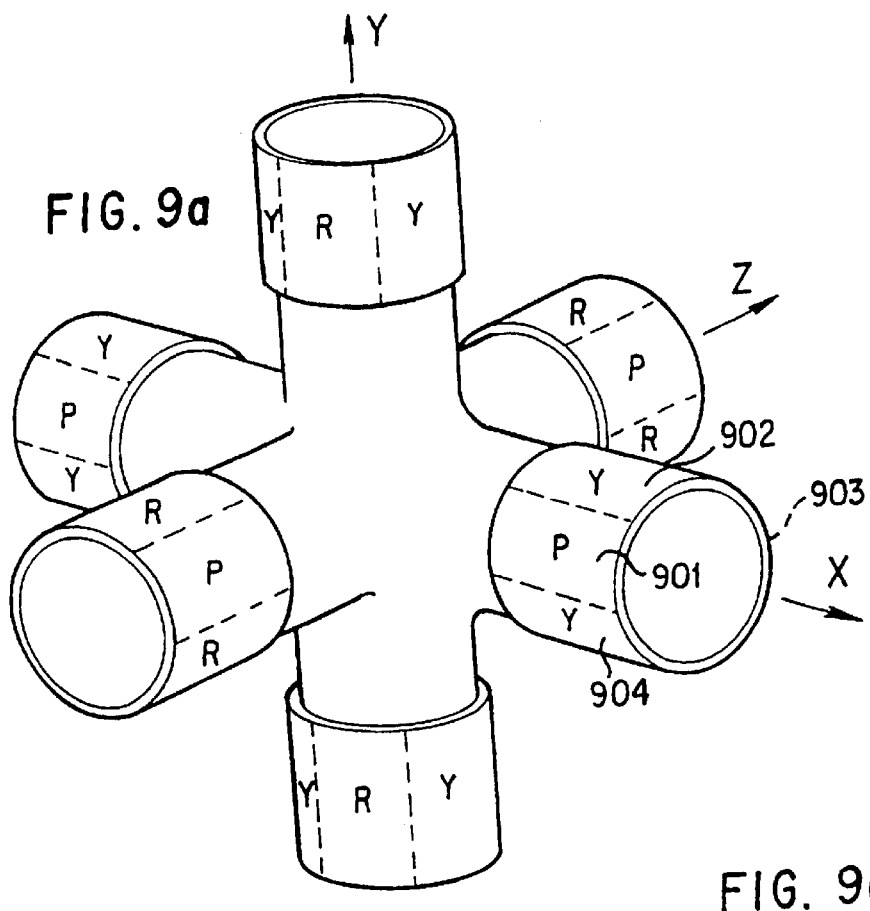
FIG. 9a is an illustration of a "push-mode" touch cylinder controller.
Figures 9B, 9C, 9D:
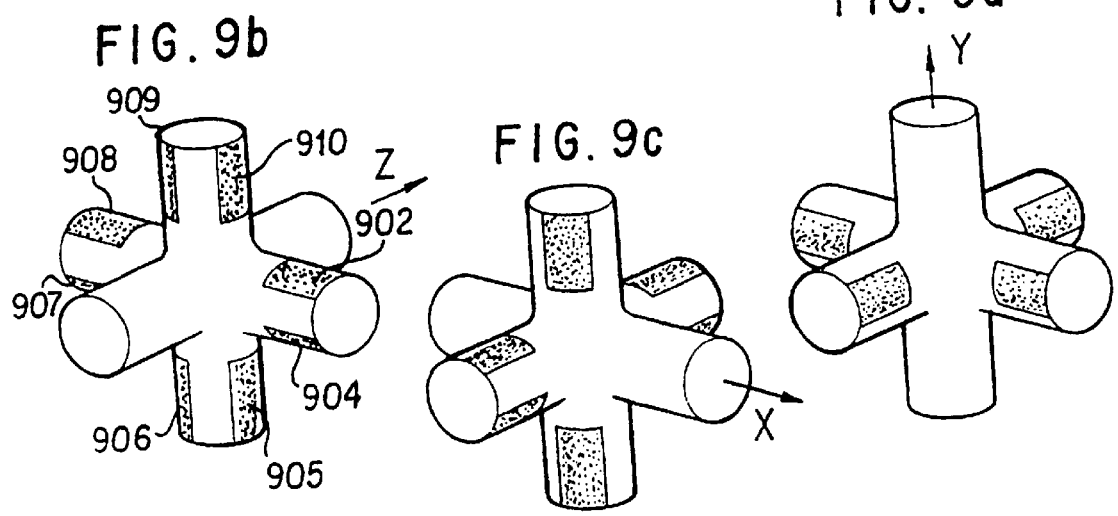

Operation of touch cylinder 900 is described with reference to a "push" mode. Specifically, rotational information is provided by "pushing" sensors positioned on the sides of the cylinders to rotate the object about one of the axes other than the one on the cylinder of the enabled sensor as if it had been "pushed" in the same direction as the controller. This is more easily explained by illustration. Referring to FIG. 9b, a rotational yaw input about the Z-axis is provided by pressing any of sensors 902, 904, 905, 906, 907, 908, 909 or 910. Sensors 904, 906, 908, and 910 provide a positive (counterclockwise) yaw signal, sensors 902, 905, 907 and 909 provide negative (clockwise) yaw signals. These signals can be combined as described above, and the signals can be either "on/off" or have multiple levels. Roll and pitch information is provided in a similar manner, as illustrated in simplified diagrams 9c and 9d.

Figure 10A:
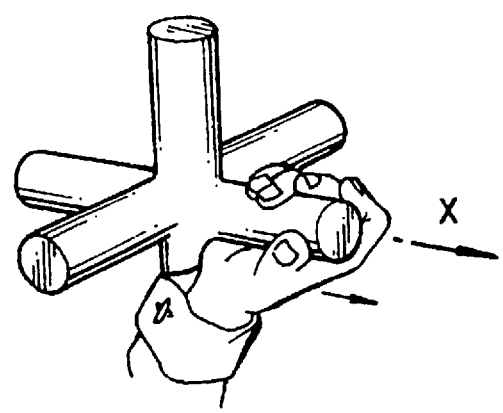
FIGS. 10a, 10b, and 10c are illustrations of sensing X-position, Y-position and Z-position respectively in a "drag-mode"
Figure 10B:
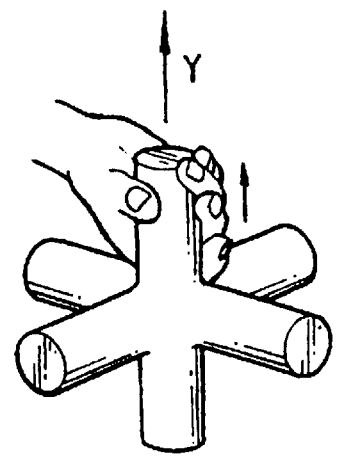
Figure 10C:
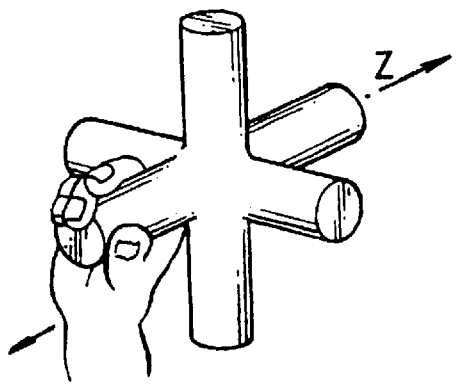

A third embodiment of a touch cylinder 1000 is illustrated in FIGS. 10a–10c. Unlike touch cylinders 800 and 900, touch cylinder 1000 has no sensors on the ends of the six cylinders. Six sensors on the cylinders provide orientation information in the same manner as the sensors 810–815 in touch cylinder 800. However, the sensor pads of touch cylinder 1000 are two-dimensional and provide information responsive to the position of pressure along the cylinders as well as in response to the position of the pressure around the circumference of each cylinder. As illustrated in FIG. 10a, movement of the thumb and forefinger along the X-axis cylinder in the X-direction is detected by sensor 1010. The X-position information from the two inputs (thumb and forefinger) is averaged and used to provide a relative position input to the cursor or controlled object. Y-position information is provided in a similar manner as illustrated in FIG. 10b. Z-position information is provided as illustrated in FIG. 10c.

Figure 11:
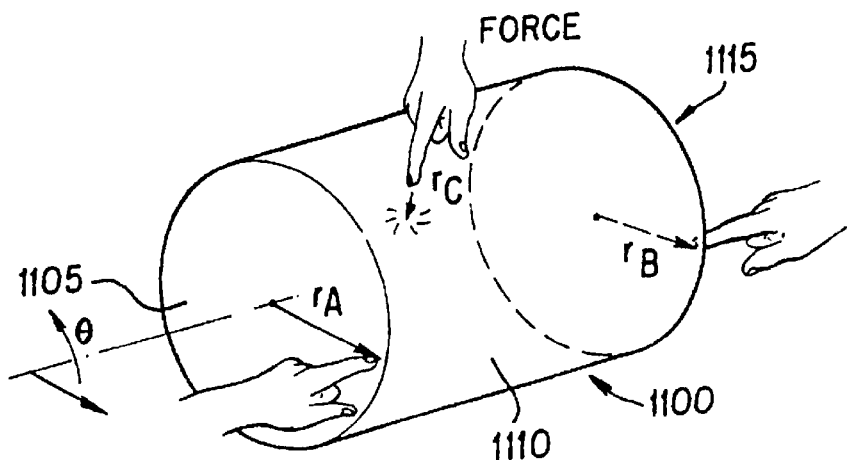
FIG. 11 illustrates a pipe-crawler controller.
Figure 12:
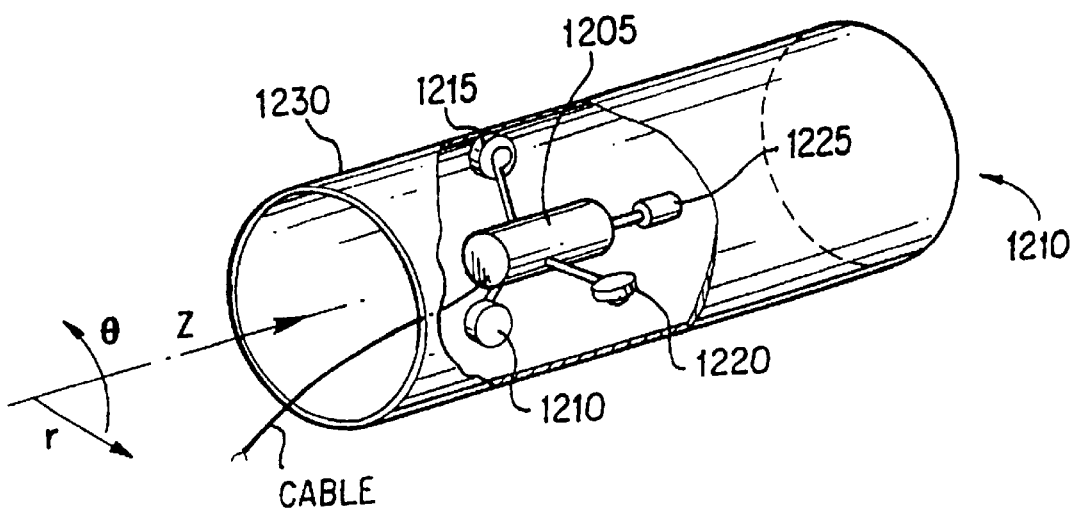
FIG. 12 illustrates a pipe-crawler robot.

FIG. 11 illustrates a pipe-crawler controller 1100 in accordance with the present invention designed for applications in a cylindrical coordinate system. One example of such a use is for controlling a pipe-crawling robot within a pipe in an industrial plant. Such a pipe-crawling robot is illustrated in FIG. 12, where a robot 1205 is supported by three legs 1210, 1215, and 1220 carries a camera or ultrasound detector 1225 for inspecting interior surfaces of a pipe 1230. Pipe-crawler controller 1100 consists of three force-sensitive sensors 1105, 1110, and 1115, each of which can detect position information is two dimensions and force. Z-position data along the cylinder is provided in response to the position of pressure along the Z-axis on sensor 1110. Theta information can be obtained from the theta position information from sensor 1110. Radial (r) information is provided by the r position of pressure applied to sensors 1105 and 1115.

Alternatively, Z-position can be responsive to the force of signals applied to sensors 1105 and 1115 in a manner similar to controller 105. Theta information can be obtained in a manner similar to that used for rotation information in controller 305. Radial information can be obtained from the force of the pressure applied to sensor 1110.

Figure 13:
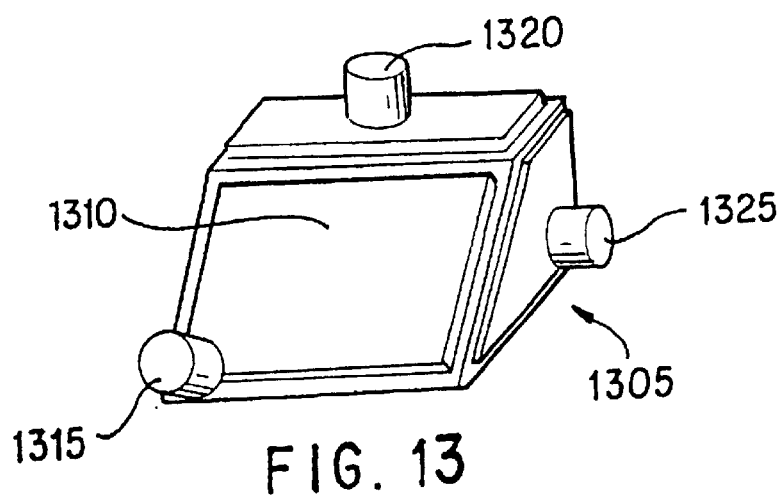
FIG. 13 illustrates a shape variation of controller 705 adapted for easy uses of a stylus.

FIG. 13 illustrates a controller 1305 having a sloped front surface adapted to be more compatible with the use of a stylus. Specifically, controller 1305 includes an inclined front sensor 1310. Position information is obtained in a manner similar to that of controller 305. The control inputs are not adjusted for the slope of the sensor, and movement of a pressure point on sensor 1310 will be interpreted identically as movement on sensor 310 of controller 305. Rotation information is provided by knobs 1315, 1320 and 1325 in a manner similar to the operation of the knobs of controller 705.

Figure 14:
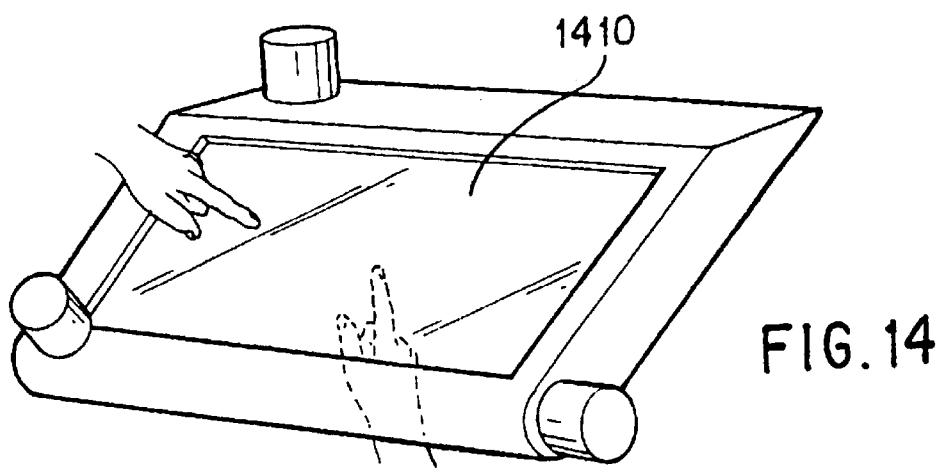
FIG. 14 illustrates a shape variation of controller 705 adapted for use with CAD/CAM digitizers.

FIG. 14 illustrates a shape variation of controller 705 with an expanded sensor 1410. This variation is adapted specifically for with in CAD/CAM digitizers.

Figure 15:
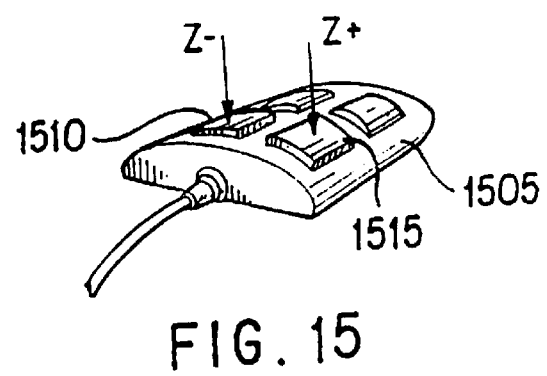
FIG. 15 illustrates the combination of two force-sensitive sensors on a mouse.

FIG. 15 illustrates the combination of two force-sensitive sensors on a mouse 1505. Mouse 1505 operates in a conventional manner to provide X-position and Y-position control signals. Force-sensitive sensor 1510 provides a signal for providing −Z information. Similarly, force-sensitive sensor 1515 provides a signal for providing +Z information.

FIG. 16 illustrates a wedge controller 1605 adapted for use in controlling a crane such as mobile crane 1705 illustrated in FIG. 17. Sensor pad 1610 provides information in the X and Y directions and a third signal in response to the force of the applied pressure. The third signal is used provide a signal to rotate the boom 1705 in a counterclockwise direction, as if pressure was applied to the right side of the boom, "pushing" it counterclockwise. X-position information from sensor 1610 controls the extension of boom end 1710. Y-position information from sensor 1610 controls the elevation of boom 1705 and boom end 1710. Sensor pad 1615 also provides information in the X and Y directions and a third signal in response to the force of the applied pressure. The third signal is used provide a signal to rotate boom 1705 in a clockwise direction, as if pressure was applied to the left side of the boom, "pushing" it clockwise. X-position information from sensor 1615 controls the movement of outrigger 1715 of the mobile crane. Y-position information from sensor 1615 controls hook cable 1720. For better understanding, the correspondence between control inputs ends the operation of mobile crane 1705 is also illustrated with reference to numerals 1–5, with the numerals on controller 1605 referring to the X, Y or force of one of the two sensors, and the corresponding numeral illustrating the corresponding motion controlled with reference to mobile crane 1705.

FIG. 18 illustrates a controller 1805 adapted for use in a spherical coordinate system. Controller 1805 is in the shape of a hemisphere with a hemispherical surface 1810 and a flat bottom surface 1815. Radial information is provided in response to activation of a sensor-sensitive pad on surface 1815. Theta and phi information is provided in response to position information from a force-sensitive pad on surface 1810.

Figure 19:
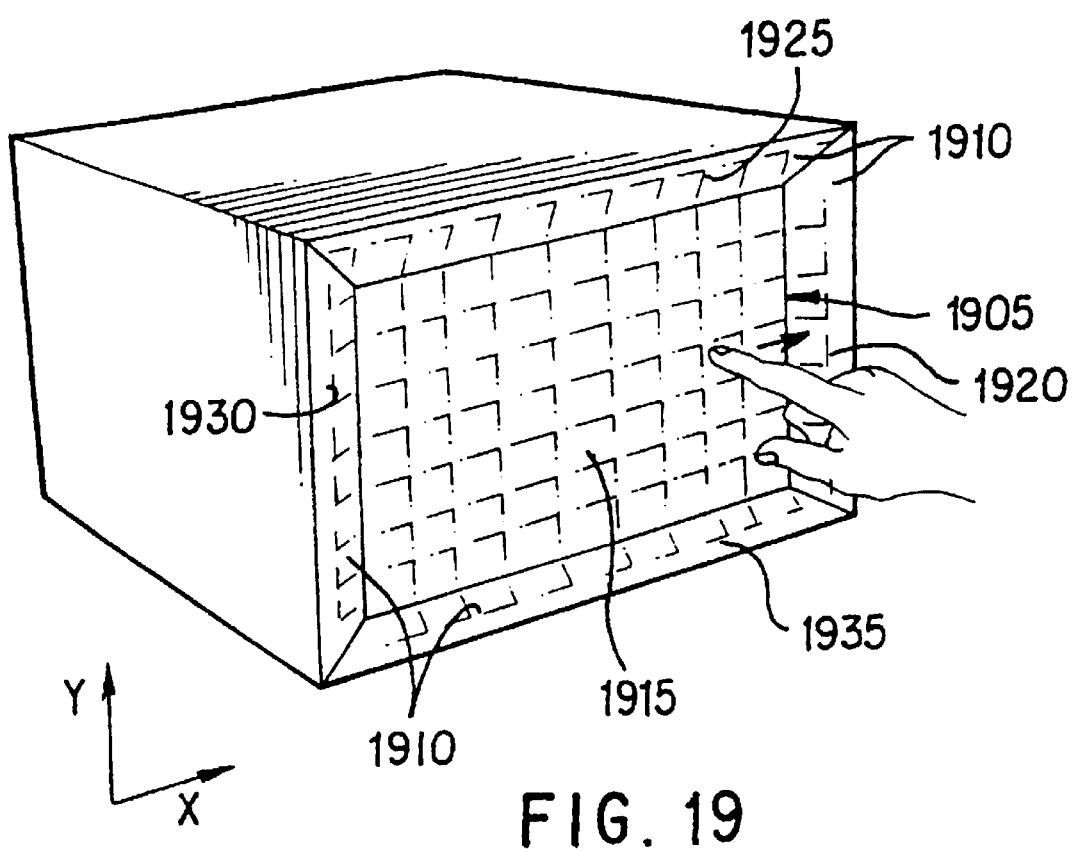
FIG. 19 illustrates a two-mode controller adapted for use in controlling an object or cursor in 2 dimensions.

FIG. 19 illustrates a controller adapted for use in controlling an object or cursor in 2 dimensions. A force-sensitive matrix sensor 1905 provides two signals, one X, and one Y, in response to the position of a force applied to the sensor. Further, sensor 1905 includes a raised area 1910 on its four edges which is preferably tactilely distinguished from flat surface 1915 of sensor 1905 by the inclination of area 1910 relative to surface 1915. In the preferred embodiment, area 1910 includes an area at each of the four edges of surface 1915. The edges are inclined and raised relative to flat surface 1915. Flat surface 1915 is also referred to herein as a "main sensor area" while the edge portions can be referred to as "edge sensors", even though there need only be a single matrix sensor used for both main and edge sensors (covering a whole face of the controller). Alternatively, separate sensors can be provided for the flat surface 1915 and the raised edges 1910, as described with reference to FIG. 25a.

The raised edges of the controller provide an area of the sensor tactilely distinguished from flat surface 1915 which operates in a different mode. When computer system 220 reads input signals from coordinates of the edge sensor areas, it can distinguish this input as a different command from input entered on the main sensor areas. For exarnple, in a relative mode for X and Y-position a change in position on sensor area 1915 is interpreted as a proportional change in cursor or object position on a display device of the computer 220. Once the operator's finger reaches edge sensor 1910 a steady force (without substantial movement) on edge sensor 1910 is interpreted as a continuation of the cursor movement. Cursor movement can be continued at either the most recent velocity along an axis, or at a preset speed, as long as a force is detected on the portion of edge sensor 1910 on that axis, such as portion 1920 with regards to movement in the positive X-direction. Alternatively, the speed of the cursor movement along an axis could be proportional to the amount of force applied to edge sensor 1910 on that axis. Thus, area 1920 would provide control of +X cursor speed, area 1925 would provide control of +Y cursor speed, area 1930 would provide control of –X cursor speed, and 1935 would provide control of –Y cursor speed. In any case, the operator is provided with the advantages of two alternative operating modes and the ability to combine the two modes in order to continue object movements in a desired direction after reaching the edge of main sensor area 1915.

When a user presses an edge sensor area without previously entering translation input on the adjacent main sensor, then the edge sensor input can be interpreted as a separate command and not as a continuation command. For example, an object or cursor can be rotated using the edge sensors, as described in greater detail below. In an alternative embodiment, only the edge sensors are used, and the main sensor area does not provide input when touched.

Figure 25A:
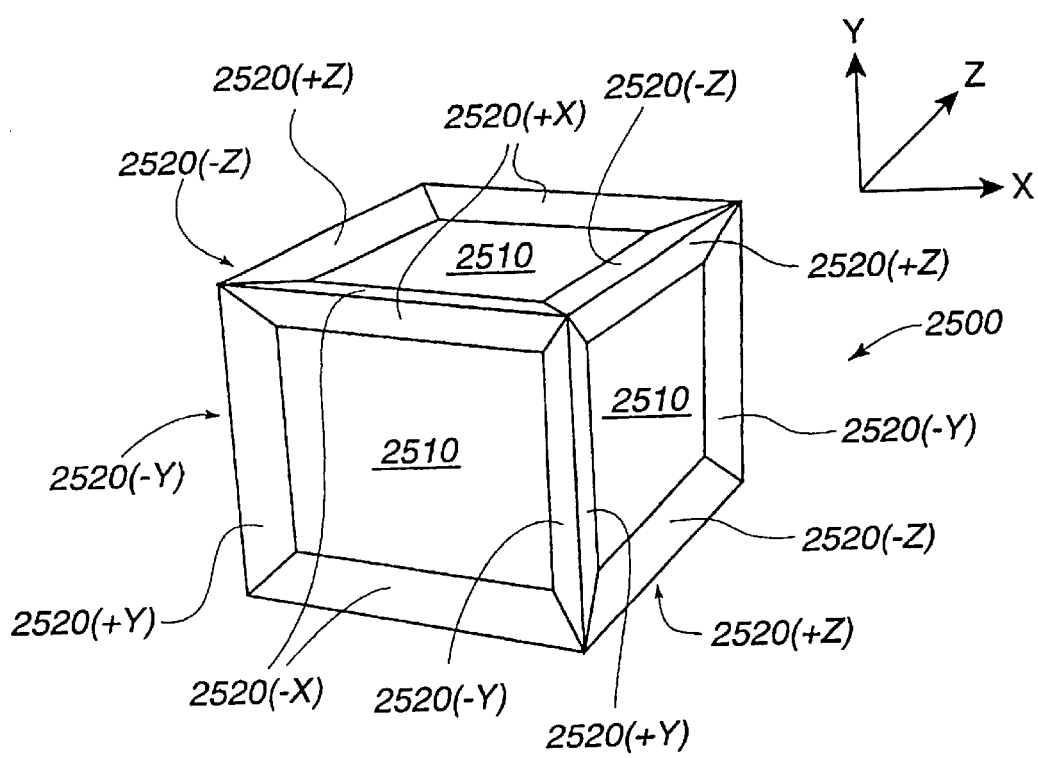
FIG. 25a illustrates a controller including 6 force-sensitive matrix sensors and 24 edge sensors.

FIG. 25a illustrates a controller 2500 that is similar to the controller illustrated in FIG. 19, except that it includes 6 force-sensitive matrix ("main") sensors 2510 and 24 edge sensors 2520. As illustrated in FIG. 25a, there are four edge sensors 2520 surrounding and immediately adjacent to each of the force-sensitive main sensors 2510. Three of the six matrix sensors 2510 and twelve of the twenty-four associated edge sensors 2520 are illustrated in FIG. 25a. The three main sensors 2510 and the twelve associated edge sensors 2520 hidden in the perspective view are identical in construction and layout to those illustrated. The edge sensors provide separate input signals to the computer system 220 similarly to the main sensors so that user input on the edge sensors can be distinguished from input on the main sensors.

Four edge sensors 2520 surround and are immediately adjacent to each of the main sensors 2510 so that a user's finger may move continuously from a main sensor 2510 to an edge sensor 2520. Each of the edge sensors 2520 is inclined and raised relative to the adjacent main sensor to tactilely distinguish it from the associated main sensor 2510. Alternatively, edge sensors 2520 could be otherwise tactilely distinguished, such as by the use a texture different from that used on the adjacent main sensor 2510. One function of the edge sensors 2520 is to provide a continuation command as described above with regard to the operation of FIG. 19. In addition, edge sensors 2520 may be used to provide rotation commands. Specifically, the eight edge sensors 2520(x) parallel to the X-axis may be used to provided rotation commands about the X-axis. As illustrated in FIG. 25a, four of these edge sensors (2520x) provide a negative rotation command. Four of these edge sensors (2520+x) provide a positive rotation command. In a similar manner, the eight edge sensors 2520z parallel to the Z axis are used to provided rotation commands about the Z axis. Similarly again, the eight edge sensors 2520y parallel to the Y-axis are used to provided rotation commands about the Y-axis.

Figure 25B:
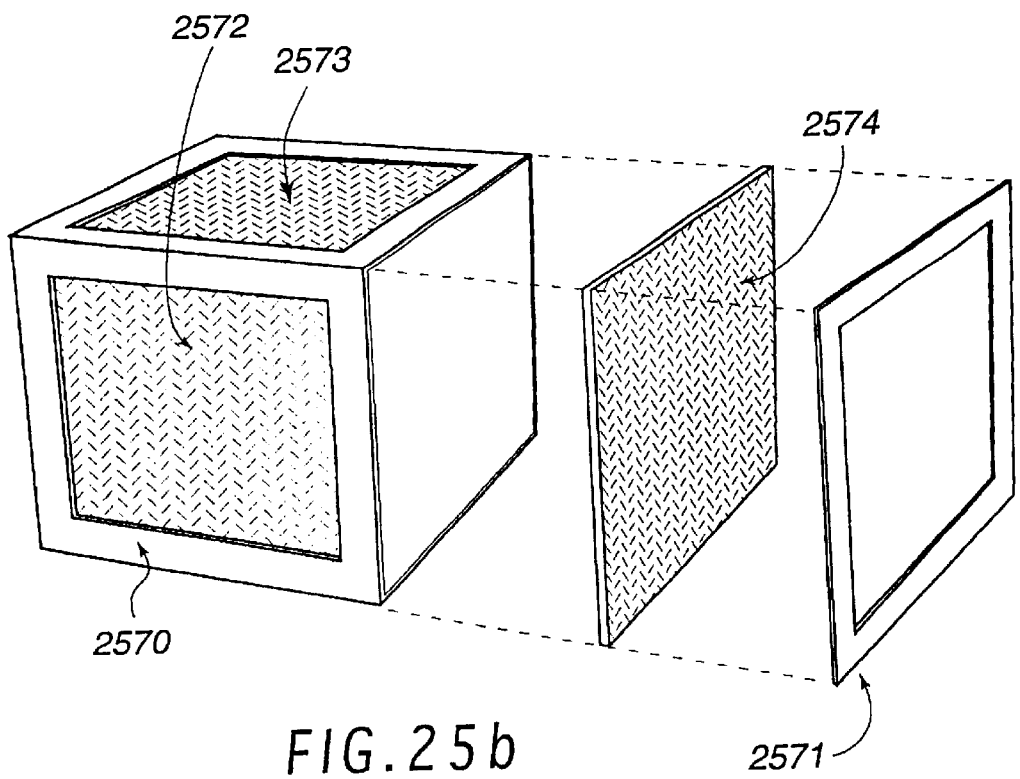
FIG. 25b illustrates an alternative controller including 6 force-sensitive matrix sensors and 24 edge sensors.

FIG. 25b illustrates an alternative embodiment of controller 2500. FIG. 25b has thin film overlays, such as 2570 and 2571, which provide a texture different from that of the main sensor pads, such as 2572, 2573, and 2574. For example, the thin film overlay could be made of a sheet of polycarbonate to provide a smooth hard surface. Alternatively, thick neoprene or silicon rubber could be used to provide a soft texture. Thus, a single matrix sensor is provided on each face of the controller, but the edge sensors are distinguished from the main sensors using the overlays 2570 and 2571.

Figures 26A, 26B:
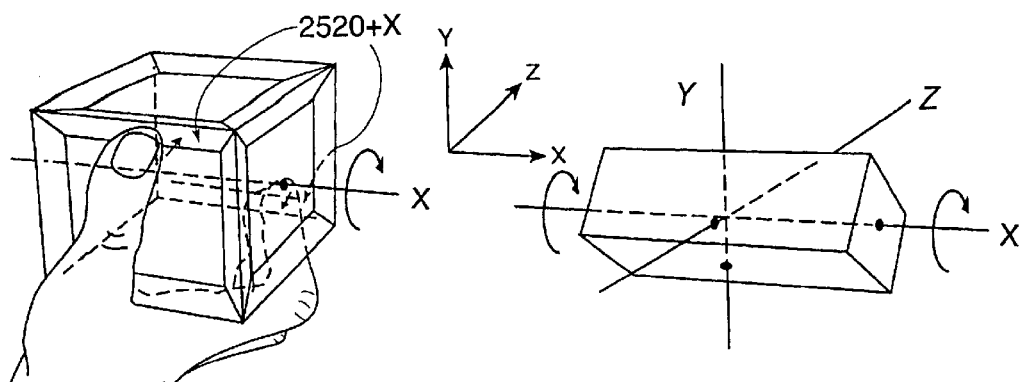
FIGS. 26a–26f illustrate the protocol for rotation command generation using the controller of FIG. 25.

The protocol for rotation command generation is illustrated in FIGS. 26a–f. Specifically, a rotation command is generated in response to the user touching one or more of the edge sensors 2520. FIG. 26a illustrates a user touching two of the edge sensors 2520(+x) which are located diagonally from each other on opposing faces of the controller 2500. This results in the generation of a positive X-axis rotation command, which causes the rotation of, for example, a computer-generated object 2522 as illustrated in FIG. 26b.

Figures 26C, 26D:
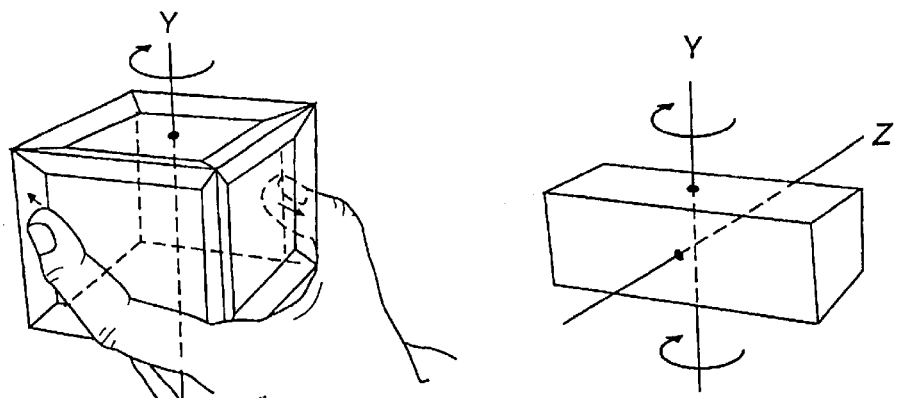
Figures 26E, 26F:
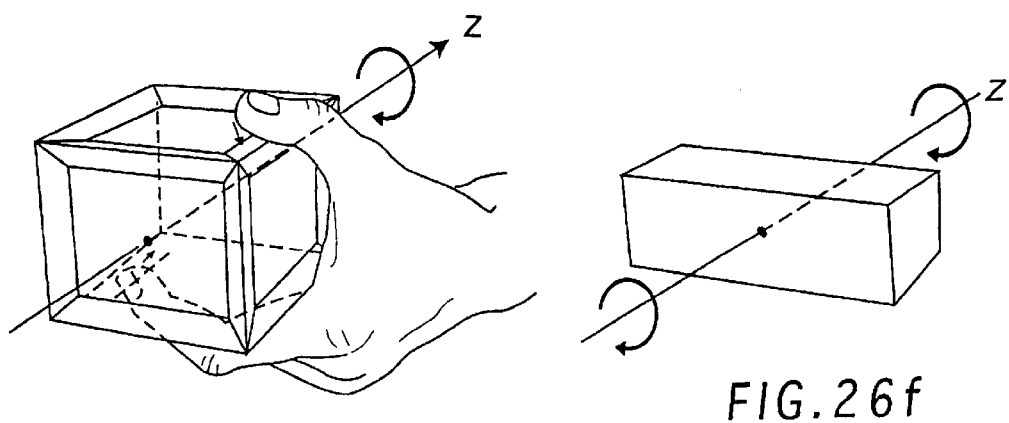

Similarly, FIG. 26c illustrates generation of a positive Y-axis rotation command from the touching of diagonally-opposite edge sensors, resulting in the rotation of the computer-generated object 2522 as illustrated in FIG. 26d. Similarly again, FIG. 26e illustrates generation of a positive Z-axis rotation command, resulting in the rotation of object 2522 as illustrated in FIG. 26f. Both positive and negative rotations are provided in response to the detection of touch on the appropriate sensor edges 2520. Further, the magnitude of the force applied to the sensors is preferably proportional to the amplitude of the rotation signal, such that a more powerful force on the edge sensors 2520 is interpreted as a more rapid rotation.

Rotation commands are distinguished from translation commands by determining if a touch on a main sensor 2510 at a position immediately adjacent to an edge sensor 2520 occurred immediately prior to or simultaneously with the initiation of the touch of an edge sensor 2520. If touch points are detected on an edge sensor 2520 and on a main sensor 2510, and the touch points are continuous in time and position, the user's intention is interpreted as a continuation of translation command. If touch points are detected on edge sensors 2520 only, without a prior and adjacent detection on the adjacent main sensor, then the magnitude of force signal on the edge will be interpreted as a rotational command. It is preferable that a certain amount of "hysteresis" is provided in the command interpretation, such that if a user partially touches a main sensor 2510 while applying a rotation gesture, it is not interpreted as a continuation of a translation command. This is easily accomplished, as a continuation of a translation command cannot occur unless a translation command had been previously provided, and that previous translation command is smoothly continued by the candidate continuation command. This is described more fully below in the section titled Gesture Interpretation.

The rotation and continuous-translation input modes are very intuitive. The rotation mode is especially intuitive because the user's push action (one finger) or "twisting gesture" (pushing two diagonally opposite edge sensors by two fingers) of edges causes a controlled object to rotate in the pushing/twisting direction.

Rotation commands about an arbitrary axis may also be generated using controller 2500' similar to the controller 2500 illustrated in FIG. 25a. Specifically, in this alternative embodiment, edge sensors 2520 are replaced with edge sensors 2520' capable of providing a signal responsive to the position at which they are touched. For example, edge sensors 2520 along the X-axis provide a signal corresponding to the position along the X-axis at which a touch occurs. Similarly, the edge sensors 2520' along the Y- (and Z-) axis provides a signal corresponding to the position along the Y- (and Z-) axis. Such position detection on the edge sensors can provide a greater degree of control for user over the movement and manipulation of an object.

Figure 27:
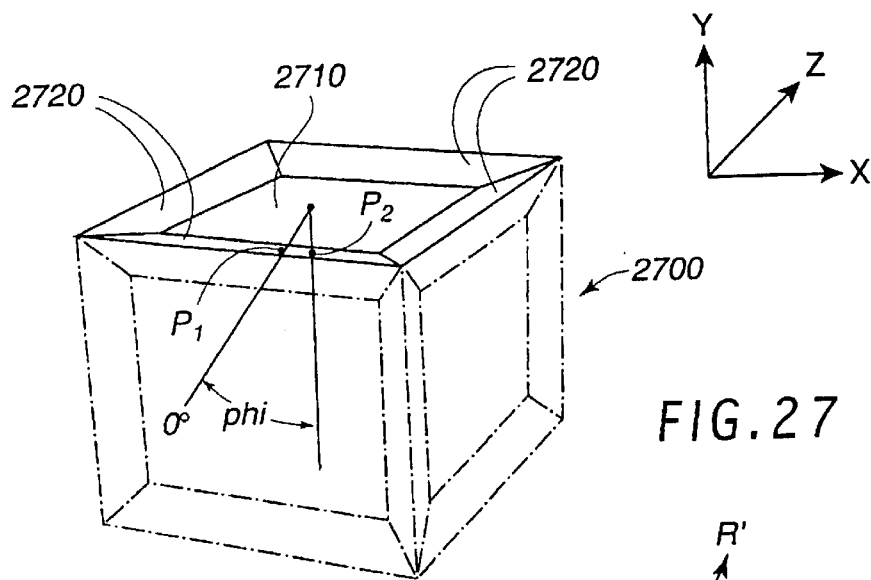
FIG. 27 illustrates a matrix sensor and four edge sensors used to detect rotation about an arbitrary axis in the X-Z plane.

FIG. 27 is an illustration of the main sensor 2710 on top of controller 2700 in the X-Z plane and the 4 edge sensors 2720 immediately adjacent to the main sensor 2710. If a touch is detected at the position "P1" indicated by "0 degrees" on edge sensor 2720, a rotation command is generated corresponding to a rotation about the X-axis. However, a touch detected at an arbitrary position "P2" on edge sensor 2720 is interpreted as a rotation about the X' axis, where the X' axis is shifted by the same angle "phi" which corresponds to the angular displacement of point P2 from the 0 degree reference position P1. Thus, a single touch point is converted to a rotation about an arbitrary axis in the X-Z plane. Similar interpretation of touches on the edge sensors 2720 immediately adjacent to the matrix sensors 2710 in the Y-Z and X-Y planes provide rotation commands about arbitrary Y' axes in the X-Y plane and arbitrary Z' axes in the Y-Z plane respectively.

FIG. 28a illustrates the use of a grasp/move gesture in conjunction with controller 2500 of FIG. 25. As illustrated, a user simultaneously touches main sensors 2810 and 2820 located on opposite sides of controller 2500 by applying pressure to the sensors 2810 and 2820. The two opposing signals are interpreted as a "grasp" command for a displayed (or controlled) object in the Y-Z plane, as illustrated in FIG. 28b. In this grasp/move mode, the force signal could be used as "remain-in-position" command (integral value of force signal is used as command), where the controlled object remains in its current position when user input is discontinued, or as "spring return" type command (magnitude of force signal for each time step is used as command), where the object moves in the direction of an origin position when user input is discontinued. As shown on the computer screen 2830, the grasping limbs 2840 of claw 2835 close upon the object 2845 as the user applies pressure as shown in FIG. 28a. After grasping the object 2845, the user may generate a translation command by dragging the touch points on panels 2810 and 2820, as illustrated in FIG. 28c. This gesture is interpreted as a simultaneous translation of claw 2835 while maintaining the previous grasp command, as illustrated in FIG. 28d. When the touch points of the user's fingers reach the edge of the main sensors 2810 and 2820 and move onto edge sensors 2850 and 2855, the user may continue to move the claw 2835 because the detection of the user's fingers by the edge sensors is interpreted as the continuation of translation command, as illustrated in FIGS. 28e and 28f. Similarly, pressure on the other panels provide commands for the X-Y and Y-Z planes.

Figure 29A:
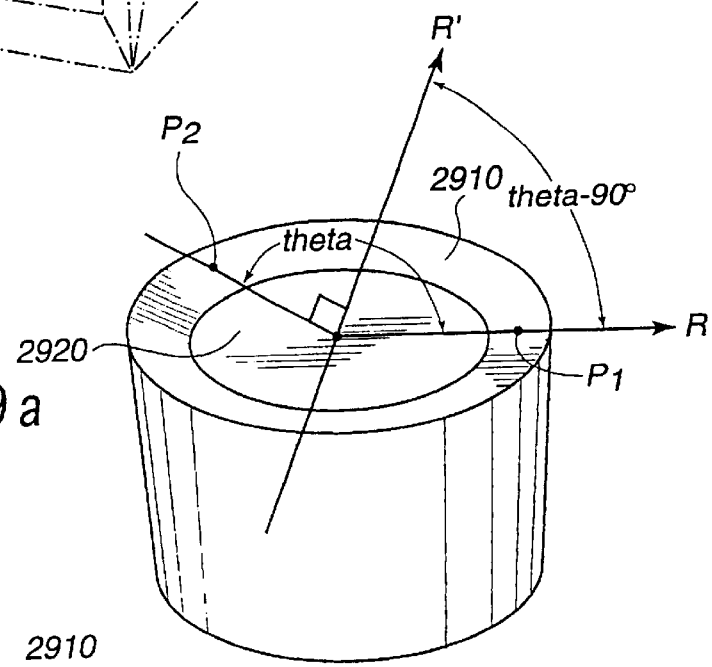
FIGS. 29a and 29b illustrate an alternative cylinder controller.
Figure 29B:
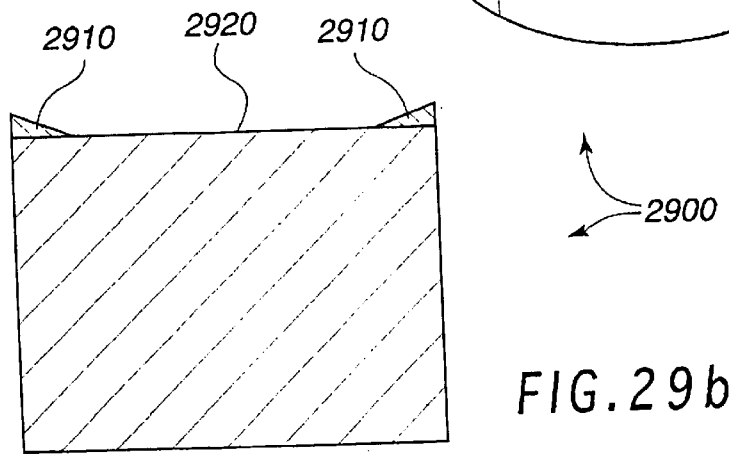

An alternative embodiment of the cylinder of FIG. 11 is illustrated in FIGS. 29a and 29b. As illustrated, cylinder 2900 includes a edge sensor 2910 raised and inclined relative to the flat main sensor 2920. Rotation and translation continuation commands are generated in the same manner as have been described with reference to controller 2500. For example, when a user pushes edge sensor 2910 at point P2, located at an angle is theta relative to a reference position P1, the displayed (or controlled) controlled is rotated about axis R', where the axis R' is in the plane of on the top surface 2920 of cylinder 3000 and shifted theta-90 degrees from reference axis R, where theta is the angle defined by the points P1 and P2 as illustrated.

Gesture Interpretation

Gestures applied to the controllers, such as controllers 2500 and 2500', may be interpreted in a number of different ways by a computer interface and used to control the movement of display objects on an interactive computer display or used to control the movement of a physical piece of equipment, such as an industrial crane. The interpretation of gestures can be broken down into 3 cases.

Figure 30:
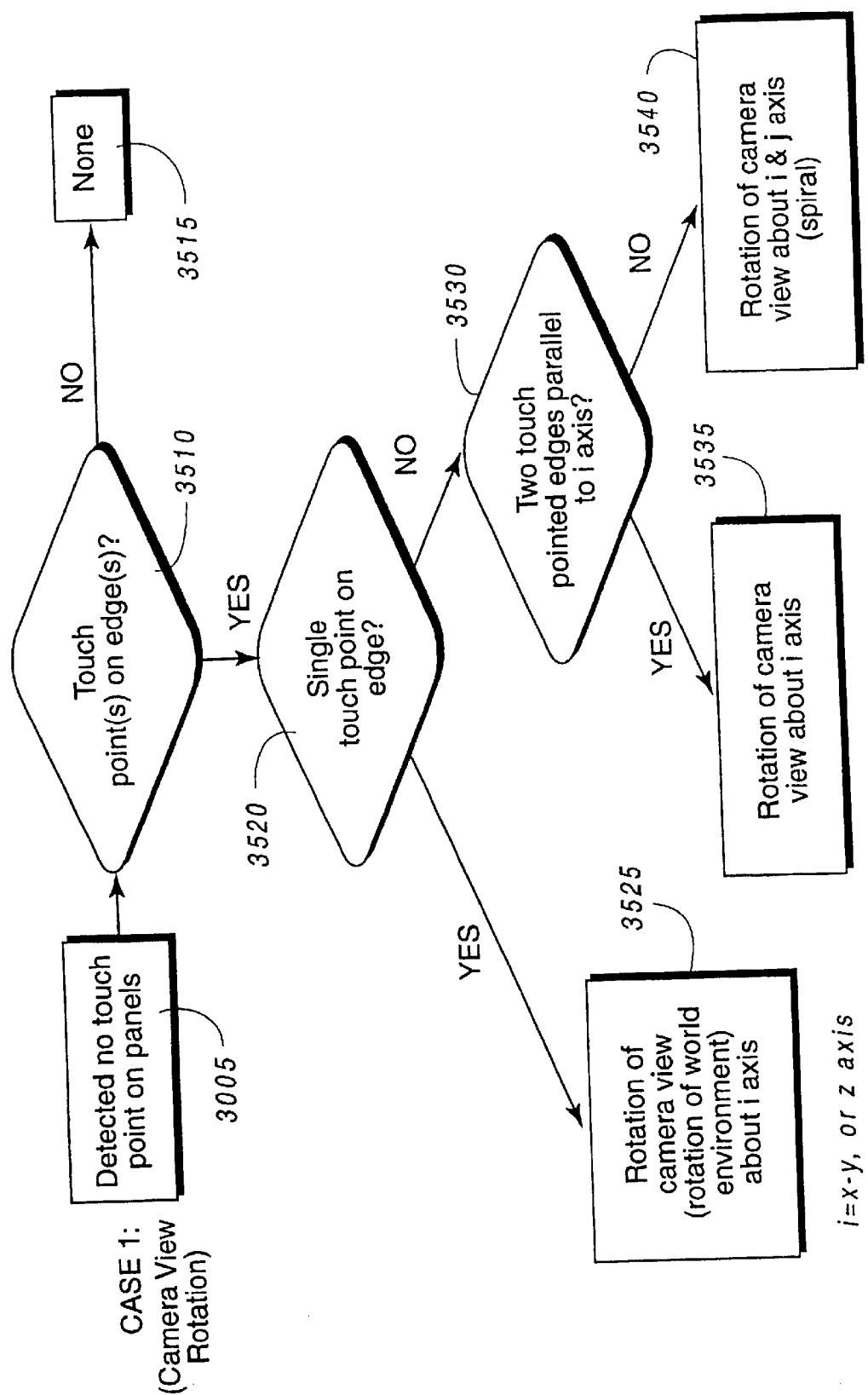
FIG. 30 is a flow diagram illustrating the interpretation of touch points on a controller when there is no detection of touches on the matrix-sensors.

In case 1, there is no detection of pressure or touch on main sensors 2510, but there is detection of pressure on edge sensors 2520. This case is interpreted as rotation of the camera view, as illustrated in the flow chart of FIG. 30. Referring to FIG. 30, step 3005 is the entry point for the logic executed when no touch points are detected on main sensors 2510. In step 3010, a test is conducted to determine if there are any touch points on edge sensors 2520. If no, the logic is exited in step 3015. If yes, step 3020 tests whether there are single touch points on edge sensors 2520. If yes, the camera view is rotated in step 3025 about the "i-axis", which is either the x, y, or z-axis, depending on the edge sensor touched. The camera view is the view of the virtual environment as, for example, displayed on a computer screen or the like. The rotation of the camera view with a single edge sensor touch point is illustrated in FIGS. 33a1 and 33a2. If no single touch points are detected, a test is conducted in step 3030 to determine if two touch points occur on parallel edge sensors, as shown in the example of FIGS. 26a, 26c, and 26e. If yes, the camera view is rotated about the appropriate axis in step 3035. If no, the camera view is simultaneously rotated about the two axes indicated by the touched edge sensors in step 3040.

In case 2, there is a detection of a single touch or pressure point on main sensors 2510. This case is interpreted as a cursor manipulation or camera view rotation as illustrated in the flow chart of FIG. 31. Referring to FIG. 31, step 3105 is the entry point for the logic executed when a single touch point is detected on main sensors 2510. In step 3110 a test is made to determine whether there are any touch points on any of the edge sensors 2520. If no, the touch point is interpreted as a cursor translation in step 3115, i.e., a cursor or object is moved in the direction of the touch point as determined by the trajectory of the touch point on the main sensor or by the direction of the single touch point (depending on the embodiment). If there are touch points on any of the edge sensors, a test is made in step 3130 to determine whether the touch point on a main sensor 2510 is within a specified region adjacent to the edge sensor 2520 on which a touch was detected, and whether a translation command has been just previously generated. This region 3132 of the main sensor 2510 is shown in FIG. 31a. If yes, the gesture is interpreted as a continuation of the cursor or object translation in step 3135. If no, the gesture is interpreted as a camera view rotation in step 3140, similar to the camera rotation implemented in FIG. 30.

Figure 32:
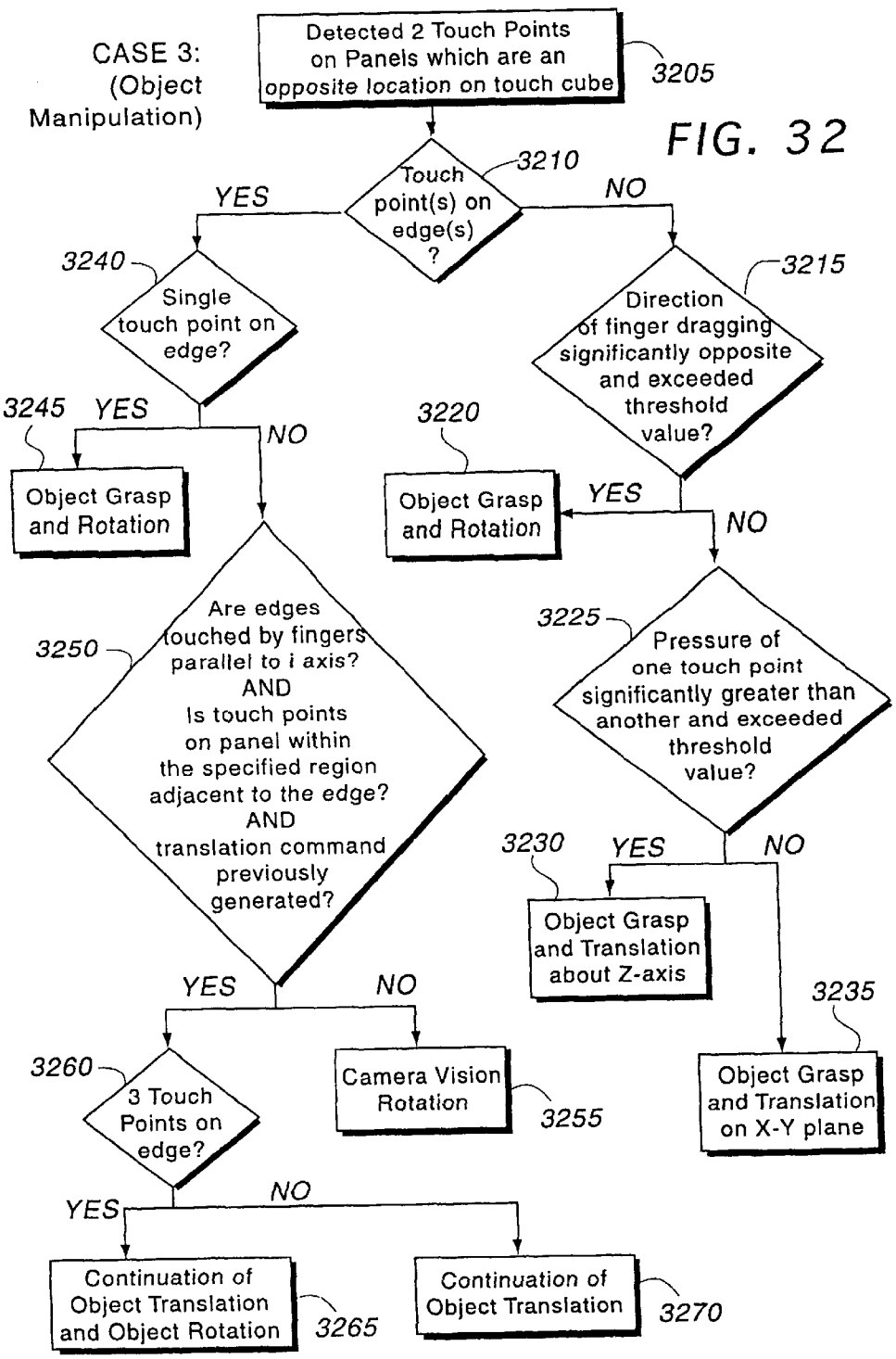
FIG. 32 is a flow diagram illustrating the interpretation of touch points on a controller when there is a detection of multiple touch point on matrix-sensors.

In case 3, there is a detection of multiple touch points on main sensors 2510. This case is interpreted as an object manipulation as illustrated in the flow chart of FIG. 32. Referring to FIG. 32, step 3205 is the entry point for the logic executed when multiple touch points are detected on main sensors 2510. In step 3210, a test is made to determine if any touch points are detected on edge sensors 2520. If no, a test is made in step 3215 to determine if the finger dragging is occurring is significantly opposite directions and the touch pressure exceeds a threshold value. If yes, the gesture is interpreted as object grasp and rotation in step 3220. (This gesture and its interpretation are illustrated in FIGS. 33e1 and 33e2.) If no, a test is made in step 3225 to determine if pressure on one touch point is significantly greater than another and exceeds the threshold value. If yes, the gesture is interpreted as an object grasp and translation along the appropriate axis in step 3230. For example, as illustrated in FIGS. 33d1 and 33d2, the pressure on back sensor 3227 is stronger than the pressure on front sensor 3228, so that the object and claw move along the Z axis in a negative direction. In FIGS. 33d3 and 33d4, the pressure on front sensor 3228 is stronger than the pressure on back sensor 3227, so that the object and claw move along the Z axis in a positive direction. If the pressure of one touch point is not greater than the other, the gesture is interpreted as an object grasp and translation on the X-Y plane in step 3235, as illustrated in FIGS. 33d5 and 33d6.

Returning to step 3210, if touch points are detected on edge sensors 2520, a test is made in step 3240 to determine if there is only one touch point on edge sensor 2520. If yes, the gesture is interpreted as an object grasp and rotation in step 3245, as illustrated in FIGS. 33b1 and 33b2. If no, a test is made in step 3250 to determine if the edges touched are parallel and if the touch points on the main sensor panel 2510 are within a specified region adjacent to the edge and whether there was a translation command just previously generated (similar to step 3130 of FIG. 31). If these tests are not all met, the gesture is interpreted as a camera view rotation in step 3255. If the conditions of step 3250 are met, a test is made in step 3260 to determine if three touch points occur on edge sensors 2520. If yes, the gesture is interpreted as a continuation of object translation and object rotation in step 3265, as illustrated in FIGS. 33c1 and 33c2. If no, the gesture is interpreted as a continuation of object translation in step 3270.

The controllers described in FIGS. 1–10, 13 and 14 are adapted for use in the Cartesian coordinate system. In general, they can be categorized by the modes used for position and rotation control. Specifically, a "push mode" for position control is used in the embodiments described with reference to FIGS. 1, 8, and 9a. In contrast, a "drag mode" for position is used in the embodiments described with reference to FIGS. 3, 6, 7, and 10a–c. With regards to rotation, three general modes are used. "Gesture" mode for rotation is used in the embodiments described with reference to FIGS. 3 and 6. "Push mode" or "torque mode" for rotation is used in the embodiments described with reference to FIGS. 9a–d. Finally a "twist mode" for rotation is used in the embodiments described with reference to FIGS. 7 and 8. These modes can be combined in a number of ways as taught by the various embodiments. Further, different modes can be adapted to the cylindrical and spherical controllers taught with reference to FIGS. 11, 12, 16 and 18.

Figure 34:
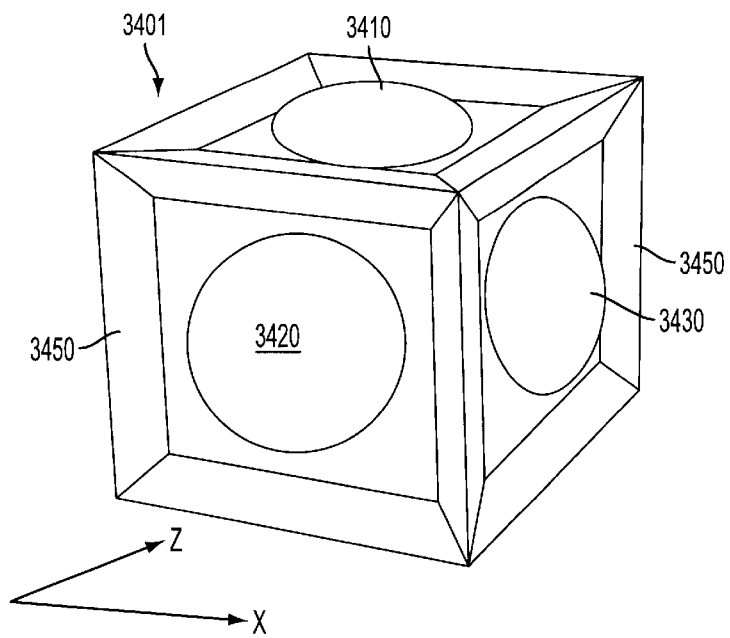
FIG. 34 is a perspective view of a controller incorporating trackballs to control the positional movements and edge sensors to control the rotational movements of an object.
Figure 34A:
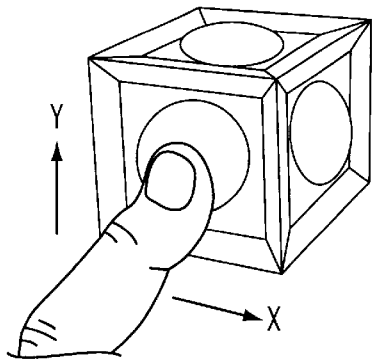
FIGS. 34a and 34b illustrate the generation of translation commands using the controller of FIG. 34.
Figure 34B:
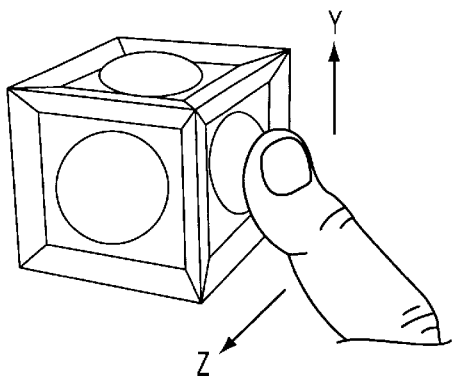

FIG. 34 illustrates an alternative design of a controller incorporating multiple trackballs and force sensitive edge sensors. This embodiment supports the "drag mode" of translation commands by the use of trackballs 3410, 3420, and 3430. Specifically, trackball 3420 on the front "X-Y" surface of cube 3401 is used to generate translation commands in the X-Y plane, as shown in FIG. 34a. Trackball 3430 located on the "Y-Z" surface of controller 3401 is used to generate translation commands in the Y-Z plane, as shown in FIG. 34b. Finally, trackball 3410 on the "X-Y" surface of controller 3401 is used to generate translation commands in the X-Z plane. Rotation commands are generated as before, as in FIGS. 26a–f and 33b1, by the use of force sensitive edge sensors 3450. As previously described, this can be implemented in either the "push" or "twist" mode.

FIGS. 35a–35d illustrate alternative functionality of the present invention. Controller 3500 can be used to provide up to 36 degrees of freedom according to the current embodiment. FIGS. 35a–35d demonstrate how a single face of controller 3500 can be utilized to provide six degrees of freedom.

Figure 35D:
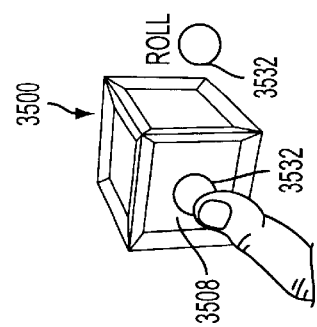
FIGS. 35a–35d illustrate the use of a single face of the controller of the present invention to input commands in six degrees of freedom.
Figure 35C:
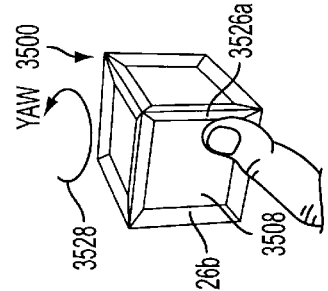
Figure 35B:
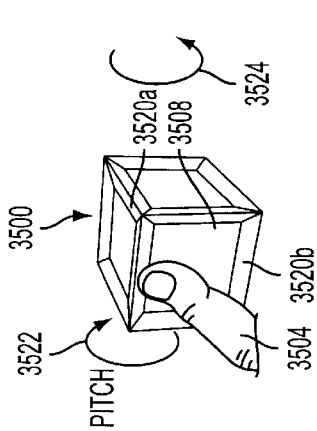
Figure 35A:
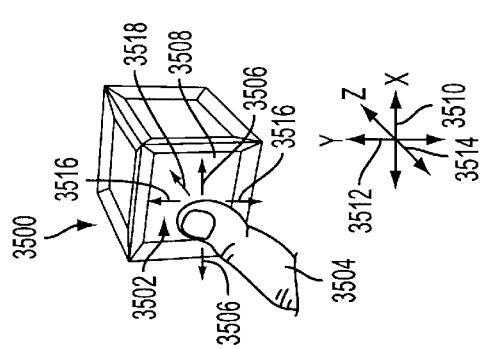

FIG. 35a illustrates a user's finger performing translation input on the main sensor 3508 of face 3502 of controller 3500 to provide input in three degrees of freedom along the x-, y-, and z-axes. Finger 3504 (or another suitable pointer) can be moved in either direction along the x-axis 3510 as shown by arrows 3506 when touching main sensor 3508 to provide translation input in that degree of freedom. For example, the user might control a computer generated object to move left as the user's finger is moving left along the sensor 3508. Likewise, the user's finger 3504 can be moved in either direction along the y-axis 3512 along main sensor 3508 as shown by arrows 3516 to provide input in the y degree of freedom.

The user's finger 3504 can be pushed against the main sensor 3508 in the direction of the z-axis shown by arrow 3518 to provide input in the z degree of freedom. A threshold pressure, greater than the pressure needed for movement in the x- and y-degrees of freedom, preferably commands the z-axis input, as described in greater detail below in FIG. 35e. As shown in FIG. 35a, the z-axis input is unidirectional, i.e., only movement in one direction along the z-axis can be input by the user when using just one face 3502 of the controller 3500. However, various implementations can assist the user in providing bi-directional movement along the z-axis, if desired, while using only one face 3502. For example, a "spring return" type command can be provided, as described above with reference to FIG. 28b, where the position of the controlled object on the Z-axis (relative to an origin) is directly proportional to the amount of pressure applied to the main sensor. When pressure is removed, the object returns to the origin position. Or, a "remain-in position" command can be provided as described above, where the controlled object moves along the Z-axis while the main sensor is touched, and the object stops at its current position when pressure is removed (optionally, the velocity of the object can be proportional to the amount of force on the main sensor). To provide bi-directional Z-axis movement, a special command input by the user on the controller, such as a finger tap or other gesture on the main sensor (or edge sensors), can toggle the desired direction along the z-axis. For example, the default can be +Z movement, and the user can tap the main sensor to subsequently command −Z movement. Alternatively, a separate peripheral device such as a button on controller 3500 or a device separate from cube 3500 can toggle the z-axis direction. Of course, if other faces of the controller 3500 are not being used for separate, independent input, then those faces can be used to provide the bi-directional z-axis movement, as described in the embodiments above.

FIG. 35b illustrates a user's finger 3504 providing input for a rotary degree of freedom on face 3502 of controller 3500. In FIG. 35b, the user provides pitch input, i.e., rotational input about the x-axis 3510, by pressing either one of the edge sensors 3520a or 3520b with a finger 3504. If edge sensor 3520a is pressed, then pitch input in the direction shown by arrow 3522 is provided, and if edge sensor 3520b is pressed, then pitch input in the direction shown by arrow 3524 is provided. If the user is moving finger 3504 on main sensor 3508 to provide translational input as in FIG. 35a, and continues the motion so that finger 3504 is pressing edge sensor 3520a or 3520b, then the translational input can be continued as described above, rather than providing rotational input (while the user continually presses the edge sensor). If the user presses edge sensor 3520a or 3520b discretely and without continuing previous translation movement on main sensor 3508, then the pitch rotary input is provided. If the user presses two or more edge sensors simultaneously, then a combined rotary command will be input; for example, a simultaneous yaw and pitch rotation of the controlled object is commanded. Some types of sensors, however, do not have the ability to discriminate between multiple touch points; these types of sensors may average the analog position and force data between the multiple points. If such is the case, then the user should avoid providing more than one touch point at once to avoid undesired averaged input commands.

FIG. 35c illustrates a user's finger 3504 providing input for a rotary degree of freedom about the y-axis 3512, i.e., yaw input about the y-axis, which is similarly implemented to the pitch input of FIG. 35b. The user presses either one of edge sensors 3526a or 3526b. If edge sensor 3526a is pressed, then yaw input in the direction shown by arrow 3528 is provided, and if edge sensor 3526b is pressed, then yaw input in the direction shown by arrow 3530 is provided.

FIG. 35d illustrates a user's finger 3504 providing input for a rotary degree of freedom about the z-axis 3514, i.e., roll input. The user traces his or her finger 3504 in an approximately circular gesture while touching main sensor 3508. The direction of the gesture indicates the direction of the input about the z-axis. For example, arrow 3532 indicates clockwise input about the z-axis. The user could provide counterclockwise input by inputting a gesture in the direction opposite to arrow 3532. The receiving computer 220 detects the angular change in the user's finger gesture and rotates the object a corresponding amount. Preferably, the receiving computer 220 detects a threshold pressure of the user's finger on main sensor 3508 before determining that a circular gesture is being input rather than translational commands, as described below with reference to FIG. 35e.

The six degrees of freedom provided by a single face 3502 of controller 3500 can be multiplied by the number of active faces on the cube to achieve the total number of degrees of freedom in which the user may simultaneously provide input to a computer system or controlled device, e.g., when all six faces are used, there are 36 degrees of freedom. By using multiple fingers simultaneously on different faces of the controller, the user can independently and simultaneously control multiple sets of six degrees of freedom.

Figure 35E:
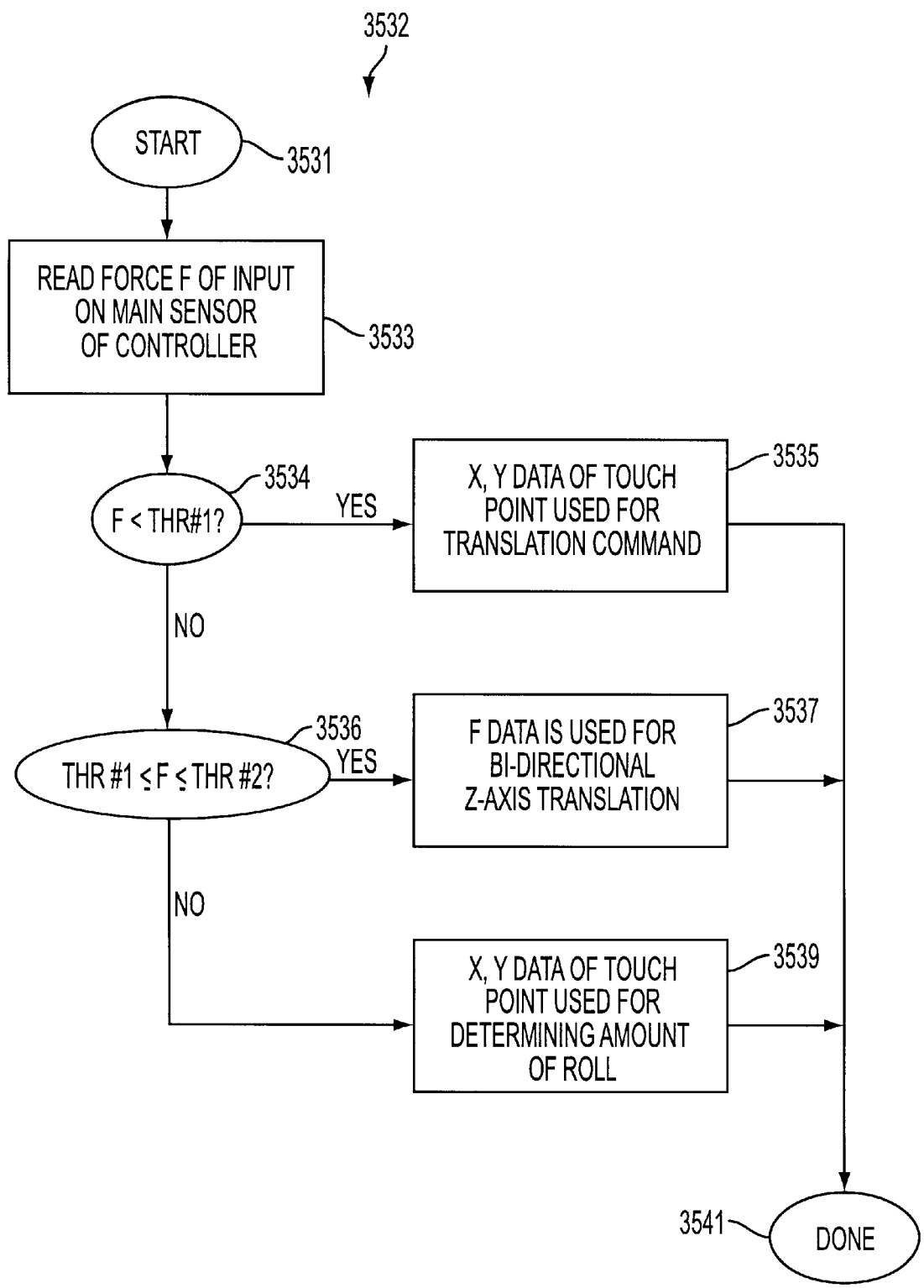
FIG. 35e is a flow diagram illustrating the distinguishing of different input commands.

FIG. 35e is a flow diagram illustrating how the different input commands of FIGS. 35a and 35d are distinguished. The process begins at 3531. In step 3533, the force F is read from the user's touch point input on the main sensor of the controller. In step 3534, the process checks whether the force F is less than a first threshold (threshold #1). If so, then in step 3535 the x and y data of the detected touch point is used for an translation command along the x- and/or y-axes, as described above with reference to FIG. 35a. After the detection of step 3534, the force F is not needed to implement the translation command. The process is then complete at 3541.

If the force F is greater than threshold #1 in step 3534, then in step 3536, the process checks whether the force F is between the first threshold and a second force threshold (threshold #2). If so, the force F is used to implement bi-directional z-axis movement, as described for FIG. 35a, and the x and y data is not needed (although in some embodiments, the z-axis movement can use x- and y-data to help determine the direction of z-axis translation). For example, a spring-return type command can be used, or a remain-in-position command with the use of a finger tap input gesture. The process is then complete at 3541.

If the force F does not fit in the range of step 3536, the force F must be greater than threshold #2 (a check for F being greater than threshold #2 can be provided in alternate embodiments). Thus, in step 3539, the x- and y-data of the touch point is used to determine the amount of roll that commanded by the user as described in FIG. 35d. The F data is typically not needed to determine the change in angle of roll of the controlled object. A preferred method of calculating the roll uses the following formula:

$$\Delta\theta = \tan^{-1}(Y_1/X_1) - \tan^{-1}(Y_2/X_2)$$

where $\Delta\theta$ is the change in angle of roll of the controlled object, $(X_1, Y_1)$ is the starting touch point of the roll gesture, and $(X_2, Y_2)$ is the ending point of the roll gesture.

Figure 36:
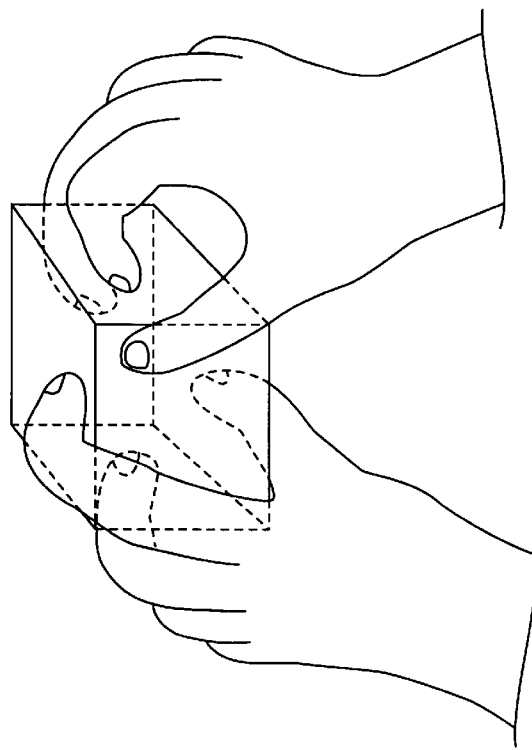
FIG. 36 illustrates the simultaneous input in thirty-six possible degrees of freedom using six faces of the controller.

FIG. 36 illustrates the user using both hands to provide input for 36 degrees of freedom. A separate finger can be applied to each face of the controller 3500. This allows much more control than in previous 3-D input devices, which typically offer a maximum of six degrees of freedom no matter if the user uses multiple fingers or hands. For example, the high number of degrees of freedom in the present invention can be used to provide simultaneous manipulation of two or more independent objects in 3-D space. In previous input devices, only a single object or point can be controlled by the user at any one time.

Figure 37A:
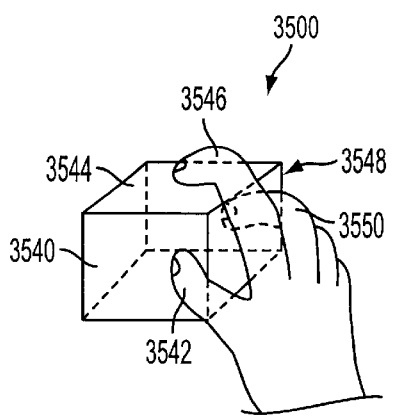
FIGS. 37a–37p illustrate an example of controlling a virtual hand using multiple faces of the controller.
Figure 37B:
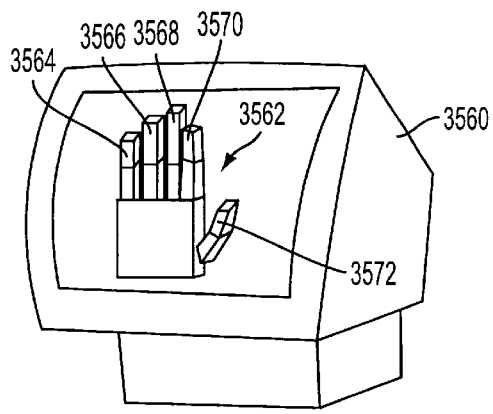
Figure 37C:
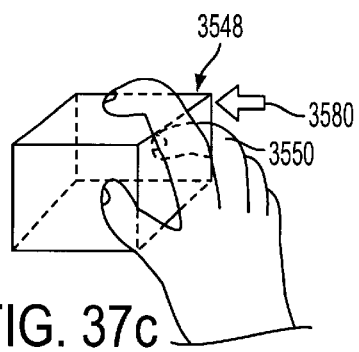
Figure 37D:
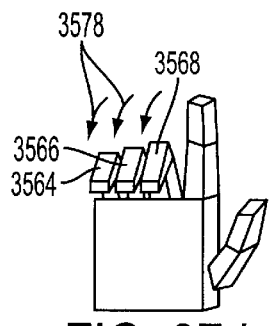
Figure 37E:
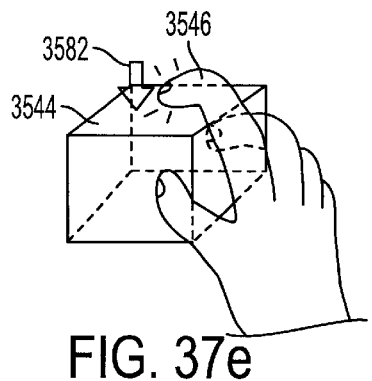
Figure 37F:
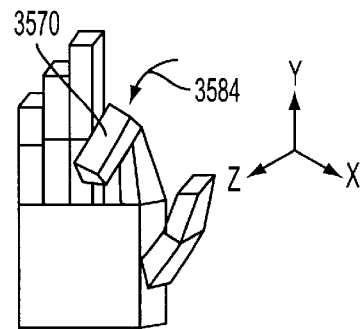
Figure 37G:
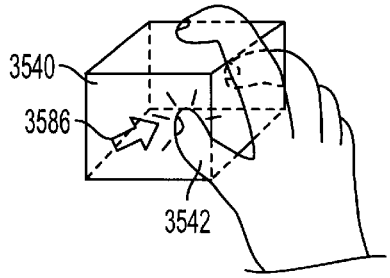
Figure 37H:
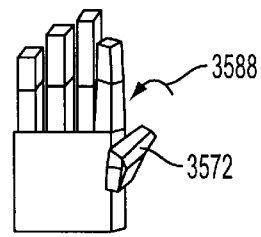
Figure 37I:
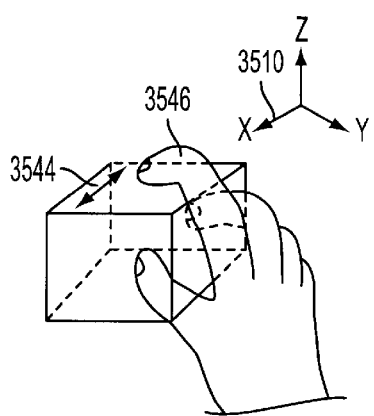
Figure 37J:
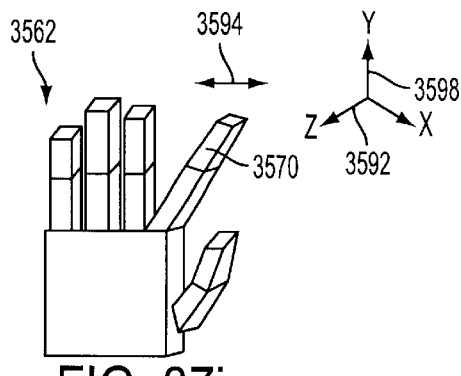
Figure 37K:
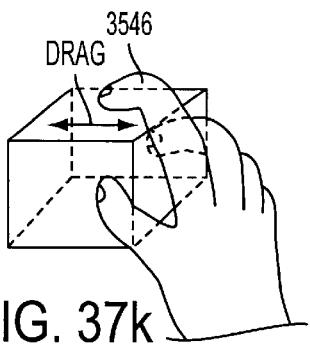
Figure 37L:
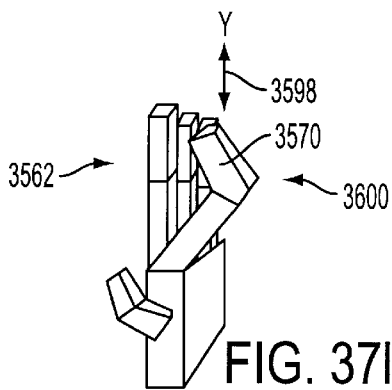
Figure 37M:
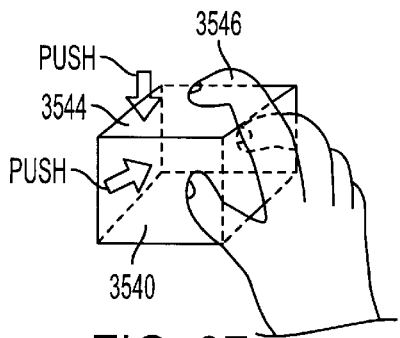
Figure 37N:
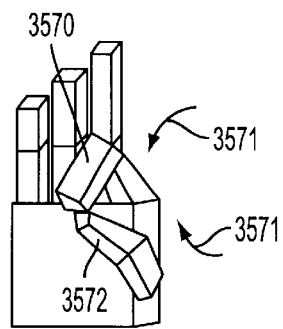
Figure 37O:
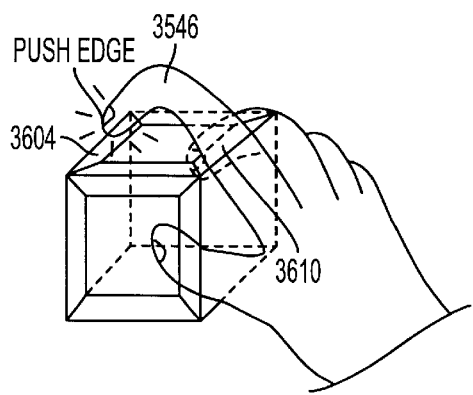
Figure 37P:
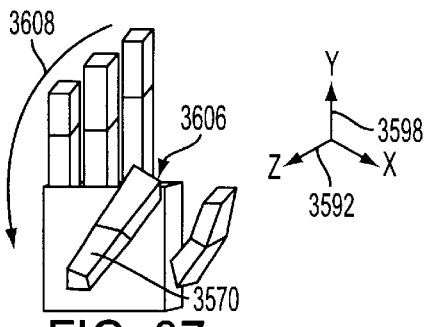

FIGS. 37a–p illustrate an example of simultaneous control of multiple objects in 3-D space using the controller 3500. In FIG. 37a, the user is touching front face 3540 with finger 3542, top face 3544 with finger 3546, and back face 3548 with finger 3550 in order to manipulate 3-D objects. FIG. 37b shows an example of a display screen 3560 which displays a virtual hand 3562 and is coupled to computer system 220 that is also coupled to controller 3500. In the present example, each finger or group of fingers can be manipulated with a separate face of the controller in simulated 3-D space. Preferably, each of the user's fingers controls a corresponding finger (or group of fingers) of the virtual hand 3562.

FIG. 37c shows the user pressing face 3548 of the controller with middle finger 3550 as shown by arrow 3580. In response, as shown in FIG. 37d, the middle finger 3568, ring finger 3566, and pinky finger 3564 of the virtual hand 3562 simultaneously curl downward as shown by arrows 3578, in a "grasping gesture." Preferably, if another virtual object were provided in the simulation between the fingers and palm of the virtual hand, the moving fingers and hand could grasp the object. The speed of the curling fingers, in some embodiments, can be related to the amount of pressure exerted by the user on the main sensor. The user can also provide translation commands and rotation commands on face 3548 as described with reference to FIGS. 35a–d to manipulate the tips of fingers 3564, 3566, and 3568 in any direction or orientation; this is described in greater detail below. Software implemented by computer system 220 can model the virtual hand so that the fingers can be moved only in ways corresponding to fingers of an actual human hand. Alternatively, other hand models might allow the fingers to move in a variety of ways not possible for real hands.

In other embodiments, each finger 3564, 3566, and 3568 can be controlled independently of the other fingers by a separate face of the controller. For example, pinky finger 3564 can be controlled by the left face of cube 3500, ring finger 3566 can be controlled by the bottom face of cube 3500, and the middle finger 3568 can be controlled by the back face 3548 of controller 3500. However, such an arrangement is somewhat awkward for the user to manipulate with one hand, so that the user finger-virtual finger correspondence would be difficult to maintain.

FIG. 37e illustrates the user pressing face 3544 of the controller with the user's index finger as shown by arrow 3582. In response, as shown in FIG. 37f, the virtual index finger 3570 curls downward as shown by arrow 3584. Thus, the movement of index finger 3570 of the virtual hand 3562 is preferably correlated with movement of the user's index finger 3546 to provide an intuitive and easily-manipulated virtual hand. As above, the index finger can be manipulated with various movements in the six degrees of freedom provided by face 3544.

FIG. 37g illustrates the user pressing face 3540 of the controller with the user's thumb 3542 as shown by arrow 3586. In response, as shown in FIG. 37h, the virtual thumb 3572 of the virtual hand 3562 curls downward as shown by arrow 3588 similarly to the index finger 3570 described above.

FIG. 37i illustrates the user dragging his or her index finger 3546 along the main sensor of face 3544 along the x-axis 3510 as shown by arrow 3590. As shown in FIG. 37i, the tip of index finger 3570 of the virtual hand 3562 moves along a corresponding x-axis 3592 in the virtual environment, as shown by arrow 3594. The distance that the index finger 3570 moves is preferably proportional to the distance that the finger 3546 is dragged. The other faces 3540 and 3548 preferably control corresponding fingers of virtual hand 3562 in a similar fashion.

FIG. 37k illustrates the user dragging his or her index finger 3546 along the main sensor of face 3544 along the y-axis 3512 as shown by arrow 3596. As shown in FIG. 37l, the tip of index finger 3570 of virtual hand 3562 moves along a corresponding y-axis 3598 so that the finger 3570 bends in a natural-looking fashion, i.e., the finger can pivot on a simulated knuckle joint 3600 when the tip of the finger is moved.

FIG. 37m illustrates the user pressing two faces of controller 3500 simultaneously to demonstrate a hand gesture. Top face 3544, which controls index finger 3570 of virtual hand 3562, and front face 3540, which controls thumb 3572, are pressed simultaneously. The result is shown in FIG. 37n, where the index finger 3570 and the thumb 3572 of the virtual hand curl together into a "pinching" gesture, shown by arrows 3571. The user can relieve the pressure on the sensors of the cube 3500 to allow the fingers 3570 and 3572 to uncurl and move apart. The user can press additional or other faces simultaneously to move different fingers of virtual hand 3562 into different gestures and signs. Thus, controller 3500 provides an intuitive interface to control virtual objects such as a hand with enough flexibility to provide, for example, signs in sign language or other complex hand manipulations. For example, pinching, pointing, or other gestures made with fingers of virtual hand 3562 can imitate a variety of signs used in sign language. The feature of complex hand manipulation can be especially useful in virtual reality settings, where the user controls objects or instruments such as virtual hand 3562 in complex ways to manipulate other virtual objects in the virtual reality setting, such as pushing or pulling objects, grasping objects, pushing buttons, turning dials, moving levers, etc.

FIG. 37o illustrates the user manipulating virtual hand 3562 using edge sensors of controller 3500. In the example of FIG. 37o, the index finger 3546 of the user is used to touch edge sensor 3604 on the top surface 3544 of the controller. Since the top surface 3544 controls the index finger of virtual hand 3562, the index finger 3570 rotates about the x-axis 3510 as shown in FIG. 3p. Since the edge sensor was pressed, the whole finger bends down from the lower joint 3606 of the index finger and remains straight as it bends, as indicated by arrow 3608. In some embodiments, if edge sensor 3610 were pressed, the finger 3570 could be bent down in the opposite direction if such non-natural movement were allowed in the simulation.

Figure 38:
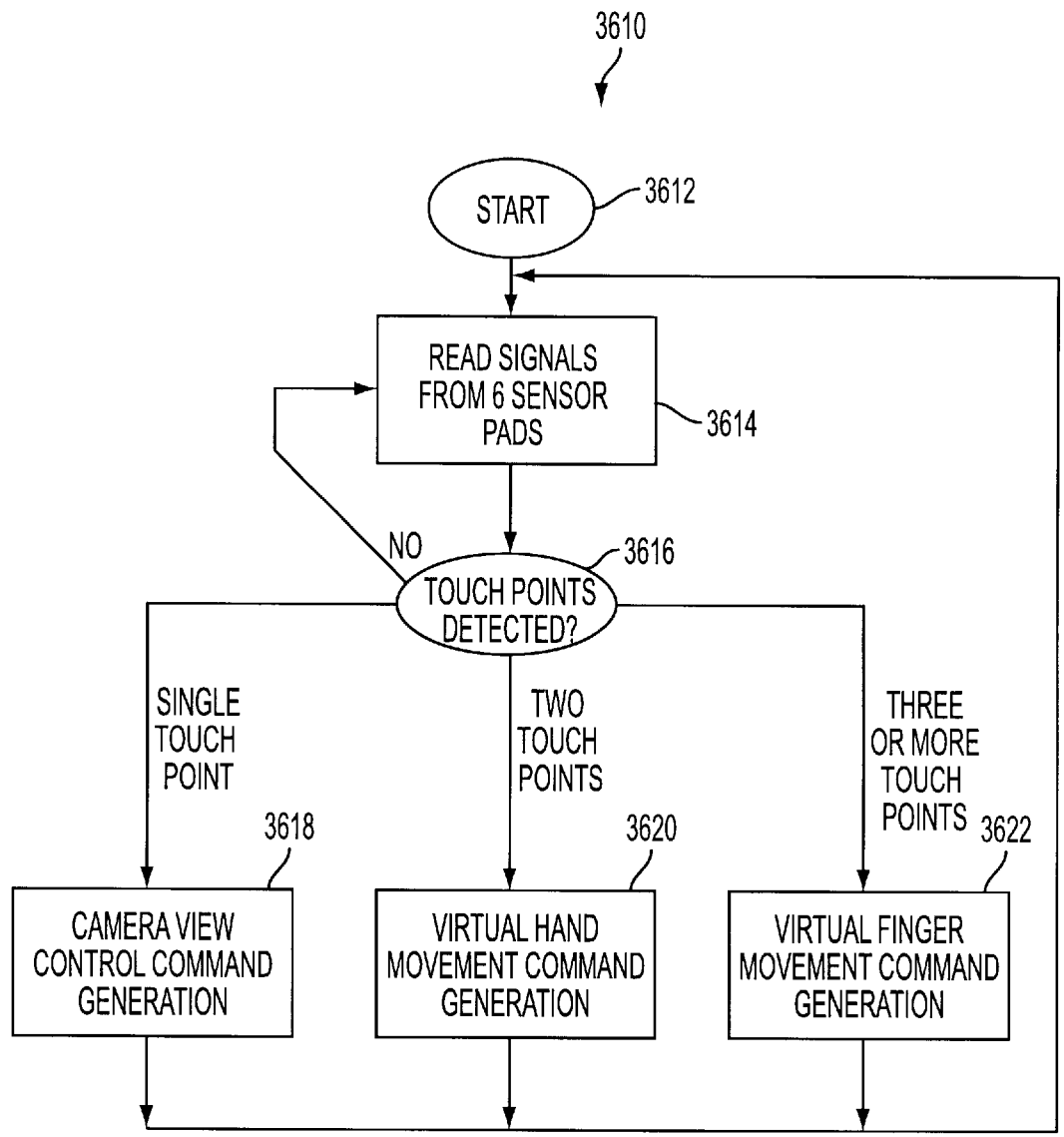
FIG. 38 is flow diagram illustrating the manipulation of a virtual hand in a simulated 3-D environment.

FIG. 38 is a flow diagram illustrating a method 3610 of providing the finger manipulation of virtual hand 3562 shown in FIGS. 37b–37p. The method begins at 3612, and, in step 3614, signals from the six sensor pads on controller 3500 are read by the controlling computer system 220. In some embodiments, sensors on some of the faces of the cube can be disabled, and the computer would not be required to check for input from the disabled sensor pads.

In step 3616, the process checks whether any touch points have been detected from the user pressing fingers (or other objects) on the sensor pads. If a single touch point has been detected, i.e., the user is pressing only one sensor pad, then the process continues to step 3618, in which a camera view control command is generated. This camera view control command rotates or translates the view as seen by the user in a display such as display screen 3560. The control command is sent to the appropriate destination to implement the command. For example, a microprocessor in the controlling computer system 220 can receive the control command and generate a proper response by rotating or translating the camera view on display screen 3560. Step 3618 is described in greater detail with respect to FIG. 38a. The process then returns to step 3614 to read the six sensor pads.

If the process determines that two touch points have been detected in step 3616, then in step 3620, a virtual hand movement command is generated. This type of command causes the entire virtual hand 3562 to move in three-dimensional space (the simulated space may have less than three dimensions if the simulation is so constrained). The virtual hand command is then implemented, e.g., the computer system moves the hand 3562 to correspond to the current position of the user's finger on a main sensor pad, or continues to move the hand if the user's finger is on an edge sensor after a translation command, as described in the embodiments above. The generation of virtual hand control commands is described in greater detail with respect to FIG. 38b. The process then returns to step 3614 to read the six sensor pads.

If the process determines that three or more touch points have been detected in step 3616, then the process continues to step 3622, where a virtual finger movement command is generated. This type of command causes one or more fingers of hand 3562 to move in three dimensional space. The command is implemented, e.g., by computer displaying the finger moving in the appropriate manner. The generation of virtual finger controls is described in greater detail with respect to FIG. 38c. The process then returns to step 3614 to read the sensor pads.

Figure 38A:
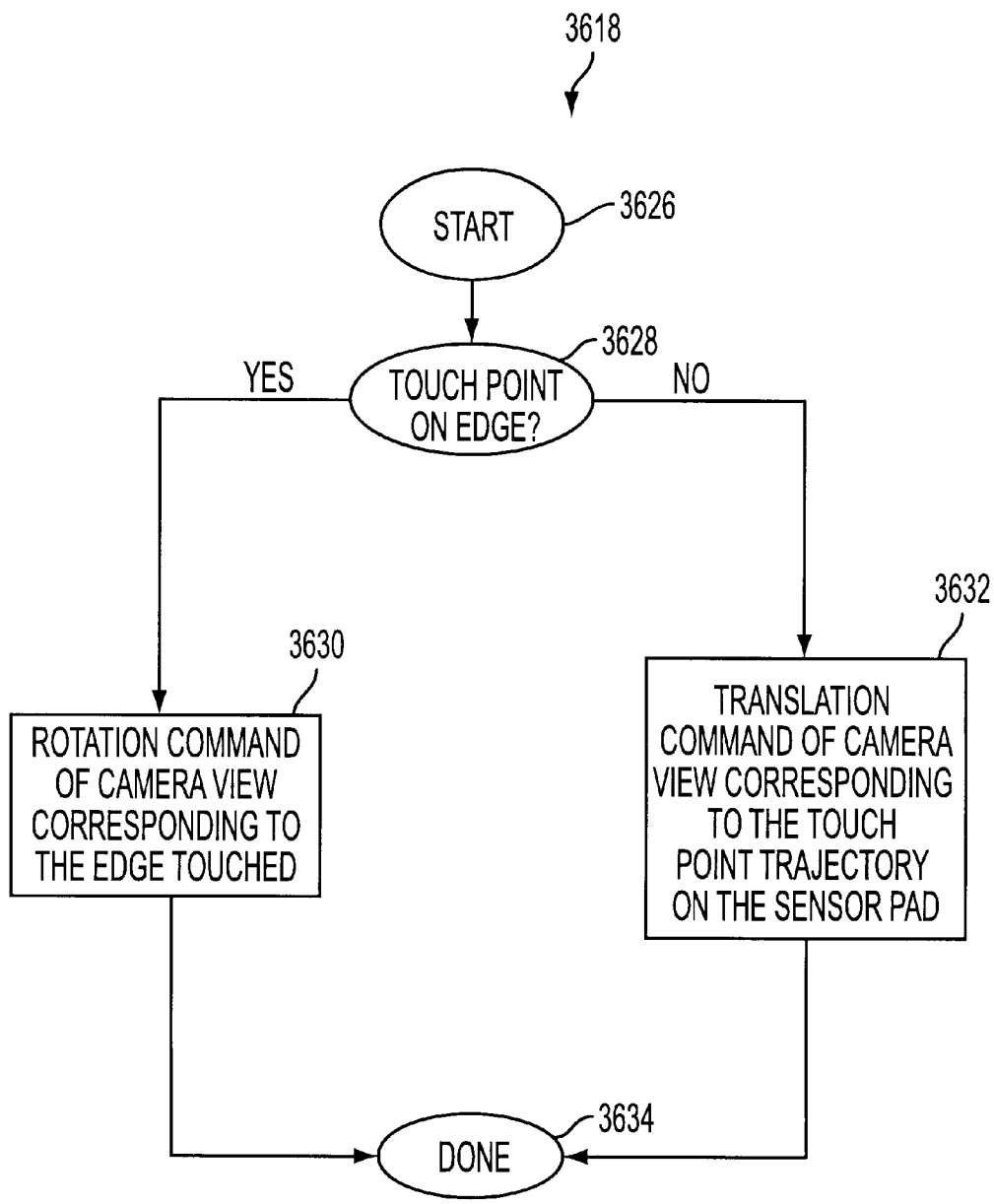
FIG. 38a is a flow diagram illustrating the step of FIG. 38 for generating camera view commands.

FIG. 38a is a flow diagram illustrating step 3618 of FIG. 38, in which a "camera view" control command is generated. The process begins at 3626, and it is checked whether the detected single touch point is located at an edge sensor of controller 3500 in step 3628. If so, then, in step 3630, the touch point is interpreted as a rotation command to rotate the camera view in the direction corresponding to the edge sensor touched. For example, if the user presses top face edge sensor 3604 as shown in FIG. 37a without touching any other sensors on controller 3500, then the camera view will rotate about the x axis. If the other edge sensor on top face 3544 is pressed, the camera view rotates in the opposite direction about the x-axis. This is similar to the example of FIG. 33a2, above. The process is then complete as indicated at 3634 and returns to the main process of FIG. 38.

If the touch point is not on an edge sensor in step 3628, then the process continues to step 3632, where a translation command for the camera view is implemented corresponding to the trajectory of the touch point on the sensor pad. For example, the last-processed touch point on the pad is examined and compared to the current touch point. From these two touch points, a vector can be determined and the view shown on the display device is translated along the vector, as if a camera were being translated by which the user was viewing the scene. The process is then complete at 3634 and returns to the process of FIG. 38.

Figure 38B:
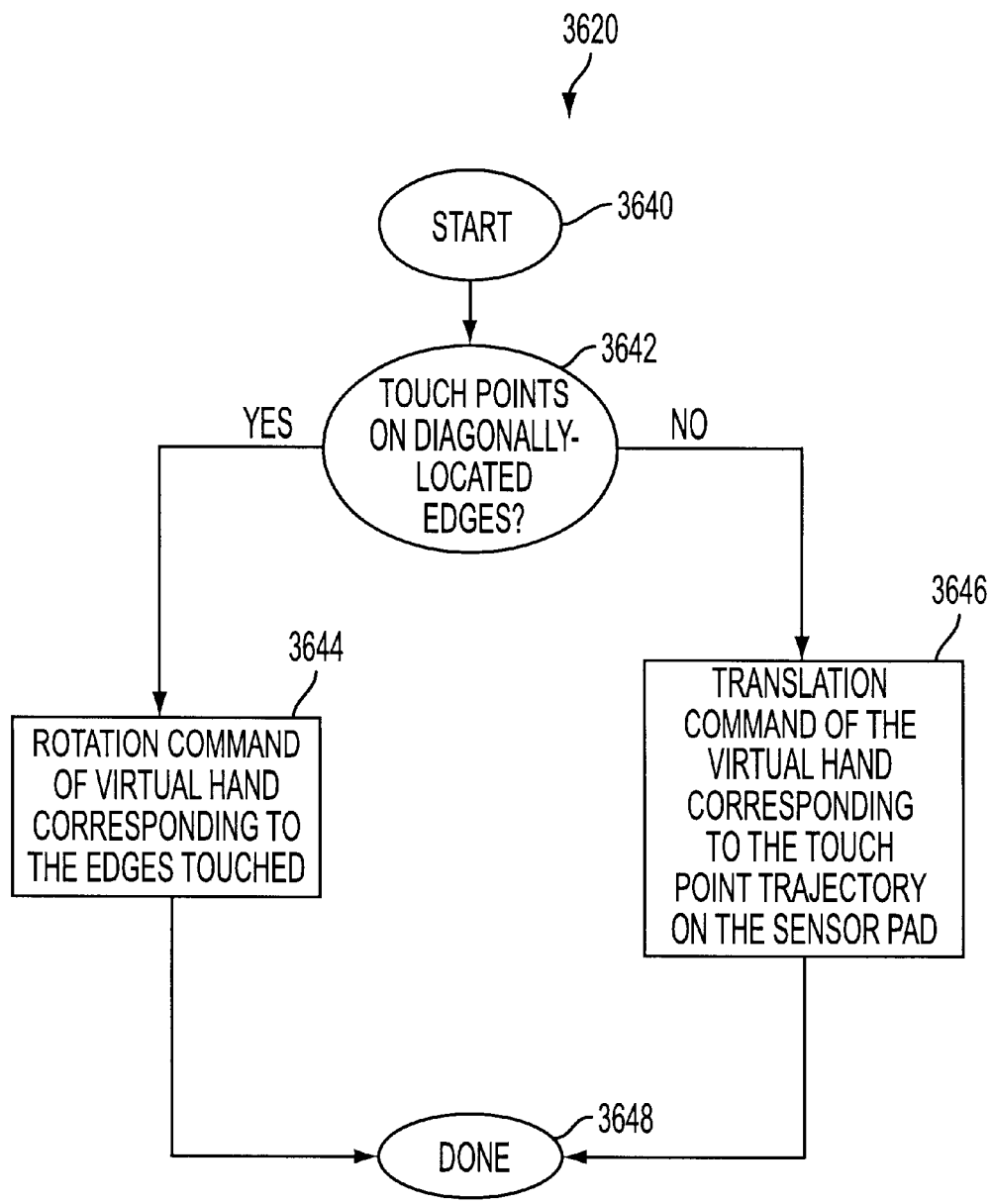
FIG. 38b is a flow diagram illustrating the step of FIG. 38 for generating virtual hand movement commands.

FIG. 38b is a flow diagram illustrating step 3620 of FIG. 38, in which a virtual hand movement command is generated. The process begins at 3640, and in step 3642, the process checks whether the two detected touch points are located on diagonally-located edge sensors. For example, the illustrations of FIGS. 26a, 26c, and 26e show the user touching such diagonally-located edge sensors. If so, the process continues to step 3644, where a rotation command for the virtual hand is provided in the direction corresponding to the edge sensors touched. Thus, the entire hand 3562 will rotate about the x-, y- or z-axis as described with reference to FIGS. 26a–f. The process is then complete at 3648 and returns to the main process of FIG. 38.

If the detected touch points are not on diagonally-located edge sensors in step 3642, then, in step 3646, a translation command for the virtual hand is implemented that corresponds to the trajectory of both touch points on the controller. The virtual hand is moved in directions corresponding to the touch points. For example, as shown above in FIGS. 33d5 and 33d6, the two fingers on opposite faces of the controller cause the hand to translate in a plane. This is typically the most common form of input method to translate the virtual hand. In another scenario, if one of a user's fingers is dragged along the y-direction on the front face 3540, and another finger is dragged in the x-direction along the top face 3544, then the virtual hand is moved along a vector resulting from corresponding component vectors along the x- and y-axes. If one finger is not moved and the other finger is dragged, then the virtual hand is translated according to the one finger that is being dragged. After step 3646, the process is complete at 3648 and returns to the main process of FIG. 38.

Figure 38C:
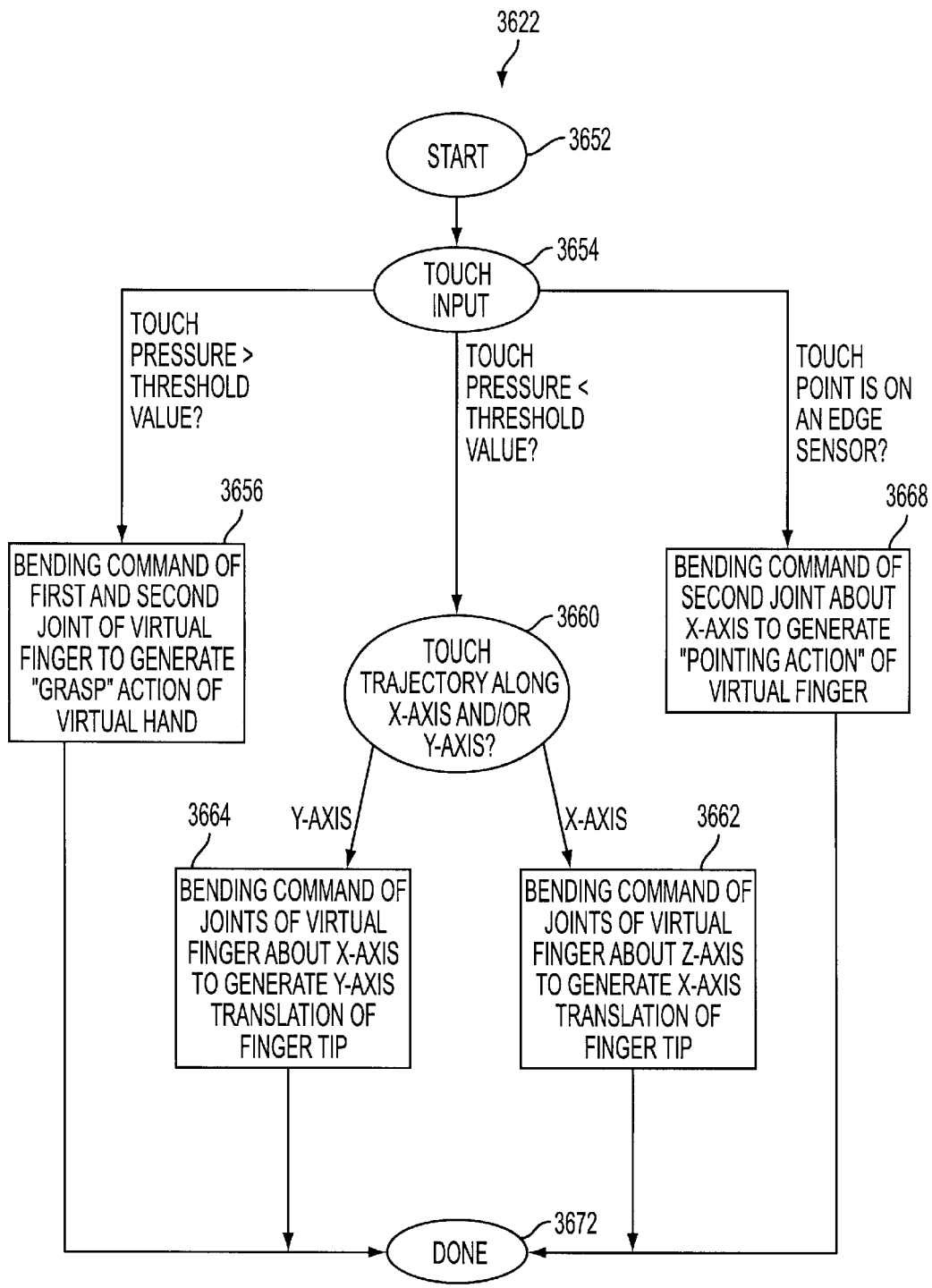
FIG. 38c is a flow diagram illustrating the step of FIG. 38 for generating virtual finger movement commands.

FIG. 38c is a flow diagram illustrating step 3622 of FIG. 38, in which a virtual finger movement command is generated. The process begins at 3652, and in step 3654, the process checks for certain conditions of the touch points. If the touch pressure of one or more of the three detected touch points on main sensors is greater than a user-defined threshold pressure value, then the process continues to step 3656, where a bending command of the first and second joints of the appropriate virtual finger(s) is generated so that a "grasp" action of the virtual hand is implemented as shown in FIGS. 37d, 37f, and 37h. For example, if only one of the three detected touch points is above the threshold pressure, then only the corresponding virtual finger is moved. If two of the three detected touch points are above the threshold pressure, then the two corresponding virtual fingers (or groups of fingers) are moved, as shown in the example of FIGS. 37m and 37n. After step 3656, the process is complete at 3672 and returns to the main process of FIG. 38.

The process also checks if the force of the user's touch points on main sensors is 5 less than the user-defined threshold value at step 3654. As explained above, multiple fingers can be simultaneously dragged on the main sensors of different faces of the controller. If the touch point is less than the threshold, then step 3660 is performed, in which the process checks if the touch trajectory is along the x-axis and/or the y-axis of the controller. If along the x-axis, step 3662 is performed, in which a bending control command is generated to bend the two (or more) joints of the appropriate virtual finger(s) about the z-axis, thus providing x-axis translation of the tip of the virtual finger. An example of this motion is shown in FIGS. 37j and 37l. After step 3662, the process is complete at 3672 returns to the process of FIG. 38. If the touch trajectory is along the y-axis in step 3660, then the process provides a bending command for the joints of the virtual finger to implement a bend of the appropriate virtual finger about the x-axis of the hand, thereby providing y-axis translation of the tip of the finger. Simultaneous implementation of steps 3664 and 3662 for x-axis and y-axis translations can also be provided. The process is then complete at 3672 and returns to the process of FIG. 38.

The process also checks in step 3654 if any of the detected touch points are on a edge sensor of the controller that is predetermined to correspond with a virtual finger. As explained above with reference to FIGS. 37o and 37p, the pressing of an edge sensor causes a virtual finger to move about the lower joint of the finger while remaining pointing straight, i.e., a "pointing gesture" is performed by the virtual hand. If a touch point is on a predetermined edge sensor, then in step 3668, a bending command is provided about the second, lower joint of the appropriate virtual finger to generate the pointing action. The process is then complete at 3672 and returns to the process of FIG. 38.

The above process provides a large and flexible range of virtual hand and virtual finger motions to the user with the intuitive use of the controller. Unlike in other limited input devices, the controller allows fingers and the hand to controlled simultaneously and independently of each other, allowing a user to realistically perform virtual actions and interact with virtual objects in a highly realistic manner.

Figure 39A:
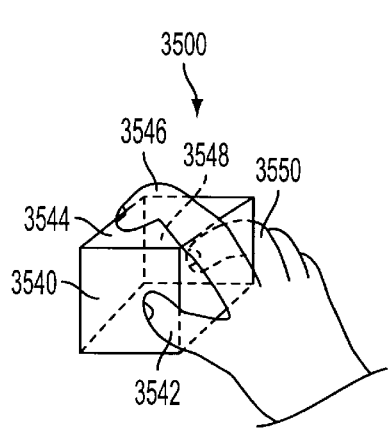
FIGS. 39a–39d illustrate the manipulation of an object in a virtual environment using a virtual hand and the controller of the present invention.
Figure 39B:
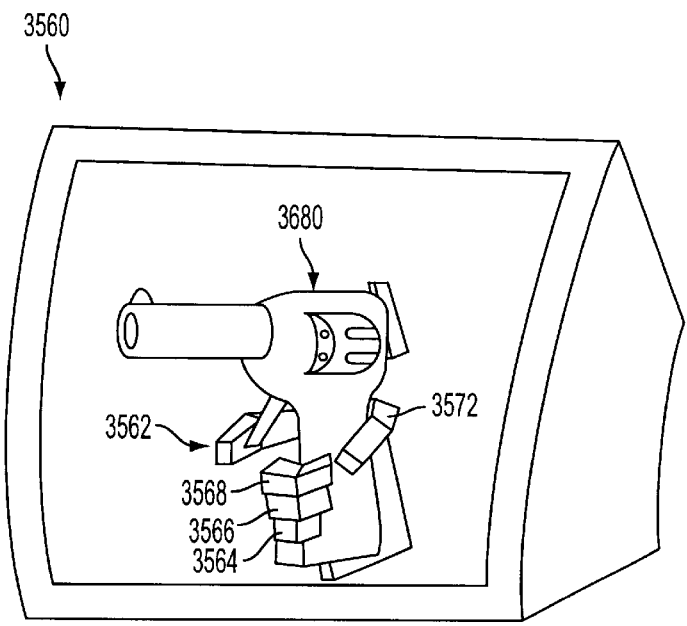

FIGS. 39a–39d illustrate an example of the use of the controller 3500 for manipulating virtual hand 3562 and a virtual object. In FIG. 39a, the user is pressing three faces of the controller 3500 similarly to the examples shown in FIGS. 37a–37e. In FIG. 39b, display device 3560 is shown displaying virtual hand 3562 which is grasping a virtual gun 3680. For example, previously in the computer generated environment shown by display screen 3560, the user may have manipulated virtual hand 3562 with controller 3500 to close around the grip of virtual gun 3680 by pressing on main sensors 3548 and 3540 to cause virtual thumb 3572 and the three virtual fingers 3564, 3566, and 3568 to close around the grip of the virtual gun. The user can also provide two points on controller 3500 to translate the virtual hand 3562 through the simulated 3-D environment displayed on the screen, as described with reference to FIG. 38. In this way, the user can "carry" the gun 3680 through the virtual environment.

Figure 39C:
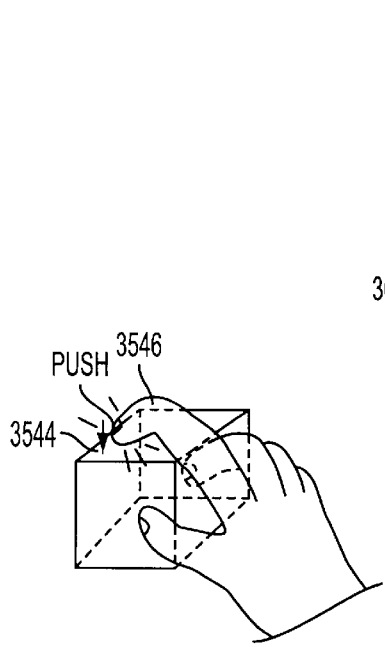
Figure 39D:
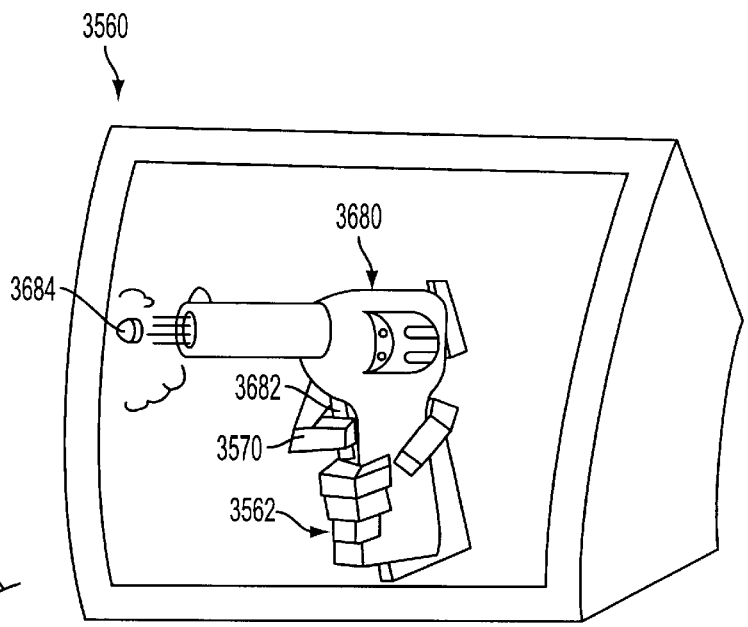

FIG. 39c illustrates the user pressing top face 3544 with finger 3546 with a pressure greater than the threshold pressure. This causes the virtual index finger 3570 of virtual hand 3562 to curl downward in a grasping gesture. This,.in turn, presses trigger 3682 of the virtual gun and causes a bullet 3684 to be fired from the gun 3680. Manipulations of objects, such as the virtual gun, are thus made straightforward and intuitive using controller 3500.

Figure 40B:
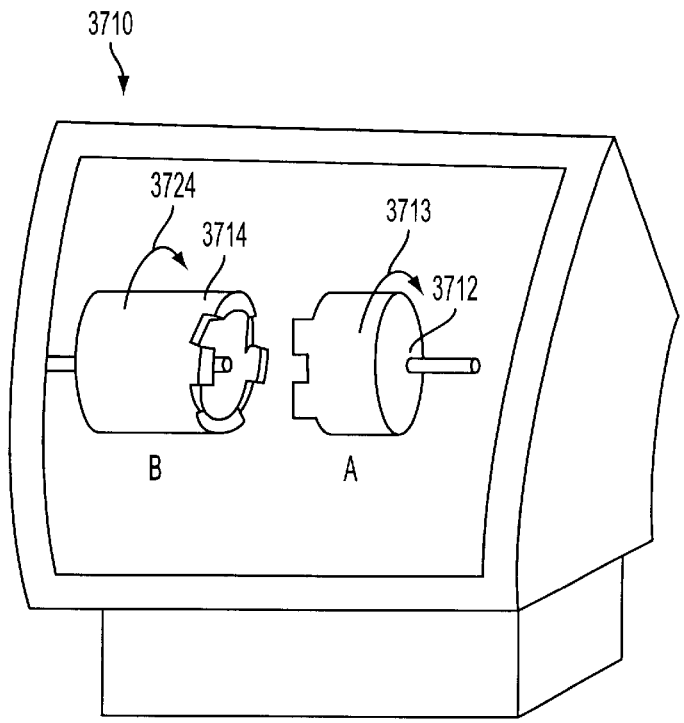
FIGS. 40a–40b illustrate the user simultaneously commanding the rotation of two computer-generated objects using the controller.
Figure 40A:
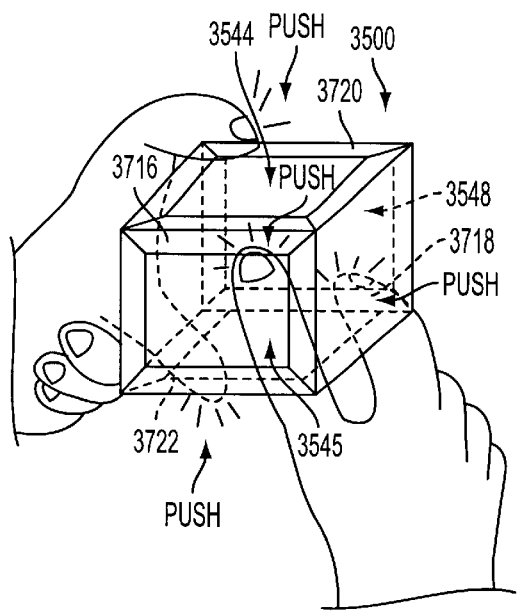

FIGS. 40a and 40b illustrate another example of controlling multiple objects simultaneously. In FIG. 40a, a user is manipulating several faces of controller 3500 and inputting control commands to a computer system such as computer 220. In FIG. 40b, a display device 3710 is coupled to the same computer system and displays two computer-generated objects 3712 and 3714. The user presses the diagonally-located edge sensors 3716 and 3718, located on the front face 3540 and back face 3548, respectively, of the controller to provide a rotation command to the computer system, which then rotates displayed object 3712 in the direction of arrow 3713. This rotation is similar to that described with reference to FIGS. 26a–f. However, simultaneously with the pressing of edge sensors 3716 and 3718, the user is pressing diagonally-located edge sensors 3720 and 3722, located on the top face 3544 and bottom face 3545, respectively, of controller 3500. The touching of edge sensors 3720 and 3722 causes object 3714 to rotate in the direction of arrow 3724.

In the example shown in FIG. 40b, the objects 3712 and 3714 are able to connect to each other only if predetermined angular velocities are achieved for the two objects. Thus, simultaneous rotation of the two objects is required. Similar simulations, games, or other activities can be performed by controlling multiple objects simultaneously with controller 3500.

Figure 41A:
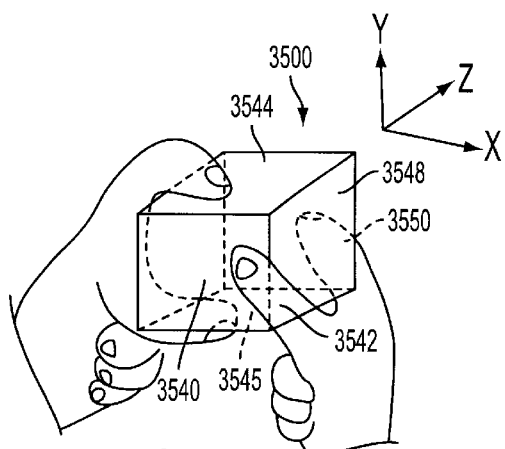
FIGS. 41a–41h illustrate deforming an object using multiple faces of the controller.
Figure 41B:
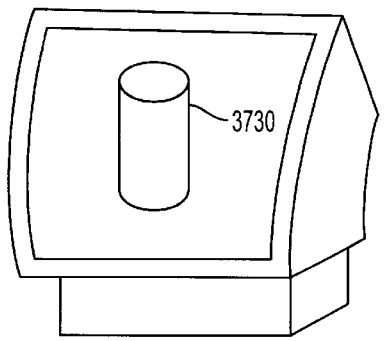
Figure 41C:
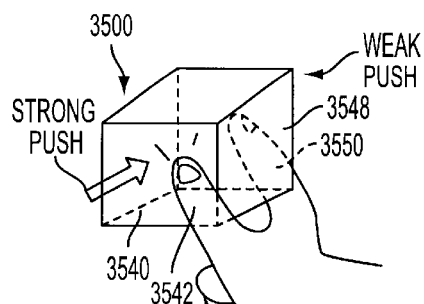
Figure 41D:
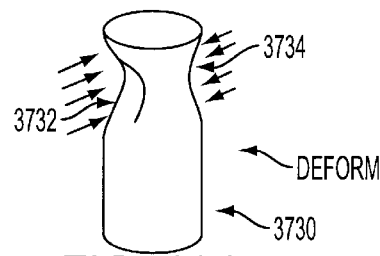

FIGS. 41a–41h illustrate the use of controller 3500 in the manipulation and deformation of the appearance or shape of objects. Since multiple faces can be simultaneously controlled by the user, multiple points of objects can be simultaneously manipulated. FIG. 41a illustrates a user manipulating four faces, top face 3544, front face 3540, back face 3548, and bottom face 3545 of controller 3500 simultaneously. FIG. 41b shows a display device 3710 displaying an object 3730 that is to be manipulated by the user. In FIG. 41c, the user presses the main sensor of front face 3540 with a stronger push of finger 3542, and presses the main sensor of back face 3548 with a weaker push of finger 3550. This finger input causes a shaping command to be input to the controlling computer 220, and distorts the shape of object 3730 as shown in FIG. 41d. The press of front panel 3540 is along the z-axis and causes an indentation 3732 in object 3730 along the z-axis of the object as if the user had pressed his or her finger against the object. Likewise, the press of back panel 3548 is in the opposite direction along the z-axis and causes an indentation 3734 in object 3730 along the corresponding z-axis of the object. Indentation 3734 is preferably smaller than indentation 3732 since the force exerted by the user on the main sensor of back face 3548 is smaller than the force exerted on the main sensor of front face 3540.

Figure 41E:
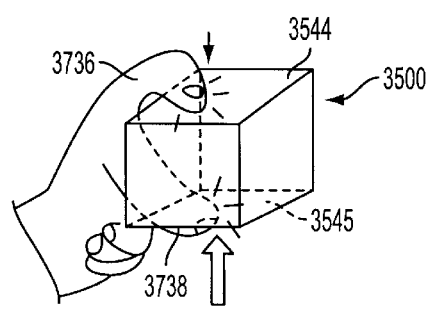
Figure 41F:
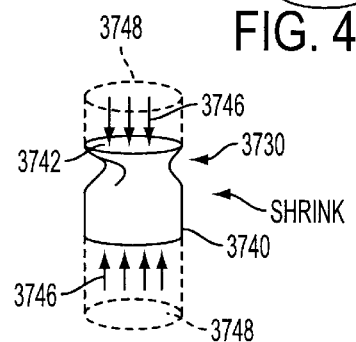

In FIG. 41e, the user presses the main sensor of bottom panel 3545 with a strong push of finger 3736, and presses the main sensor of top panel 3544 with a weaker push of finger 3550. In FIG. 41f, the object 3730 is shortened along the y-axis in the directions shown by arrows 3746 corresponding to the y-axis of the controller. The object 3730 is shortened a greater amount at end 3740 than at end 3742 since the user applied a greater pressure on bottom face 3545 than top face 3544. The previous dimensions of object 3730 are shown as dashed lines 3748. Thus, when the user presses main sensors on opposing faces of the controller, the controlled object is reduced in the corresponding dimension as if the user is "squeezing" the object. By pressing on all four faces of controller, the user can cause the shortening manipulation of FIG. 41f and the deforming manipulation of FIG. 41d to take place simultaneously.

Figure 41G:
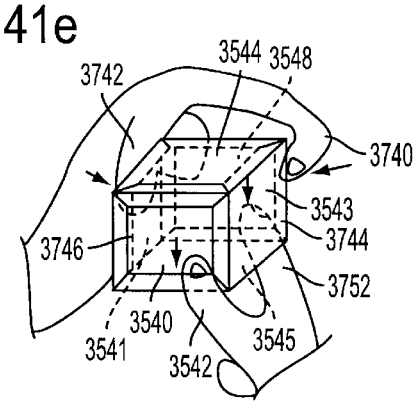
Figure 41H:
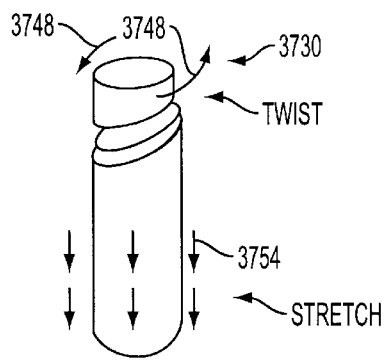

In FIG. 41g, the user is performing dragging or translation gestures on controller 3500 to manipulate the shape of a computer-generated object. The user uses two fingers of each hand to perform each gesture. Fingers 3740 and 3742 are pushing the diagonally-opposed edge sensors 3744 and 3746, respectively, which are situated on the right face and left face, respectively, of controller 3500. The pressing of these diagonal edge sensors on these opposing faces causes the object 3730 to twist about the y-axis as shown by arrows 3748 in FIG. 41h. At the same time, the user is dragging fingers 3750 and 3752 in a linear motion along the main sensors of the front face 3540 and the back face 3548. This gesture causes the lower end of object 3730 to extend, as shown by arrows 3754 in FIG. 41h. Object deformation as shown in FIGS. 41a–41g is described below with respect to FIG. 43. The simultaneous manipulation of different portions of object 41h is allowed in the present invention due to the several degrees of freedom available on each face of controller 3500.

Figure 42A:
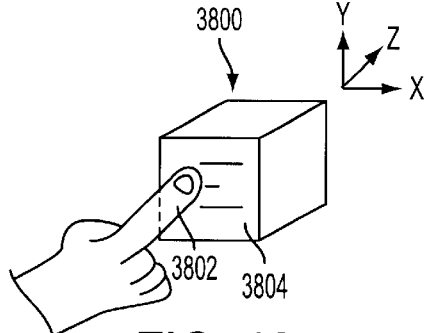
FIGS. 42a–42f illustrate the manipulation of a cursor and an object in a CAD application program using the controller.
Figure 42B:
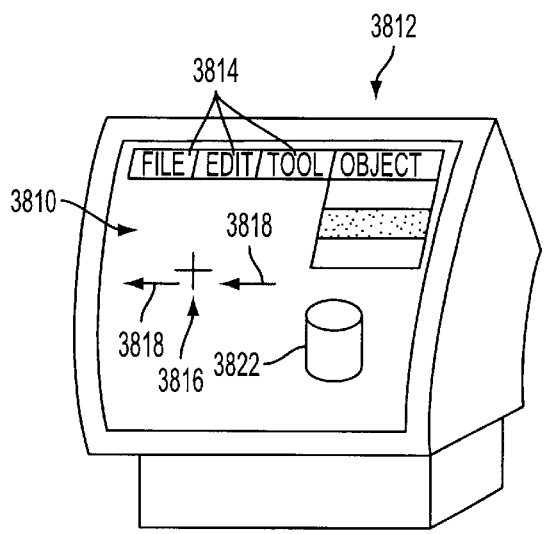

FIGS. 42a–42f illustrate the use of a controller 3800 for the control of functions of an application program running on computer system 220 coupled to the controller. For example, as shown in FIG. 42b, display device 3812 can display a graphical user interface and features for manipulating functions of an application program, as is well known in the art. In FIG. 42a, the user is translating finger 3802 across front face 3804. In FIG. 42*b,* a graphical user interface (GUI) 3810 for a computer aided design (CAD) program is displayed by display device 3812. Other similar interfaces can be displayed in other embodiments. GUI 3810 includes a number of menu items 3814 that can be selected to perform functions in the application program. Also, a cursor 3816 is provided to draw objects, select objects, and to perform other functions in the CAD program. The movement of cursor 3816 in two dimensions on the display screen is accomplished by the user tracing his or her finger along the x- and y-axes on front face 3804 to cause the movement of cursor 3816 along corresponding axes of the display screen. As indicated by arrows 3818, the cursor 3816 is moving in the corresponding direction to the direction of the user's finger 3802.

In addition, other functions can also be provided using the controller. For example, the right face 3806 and the left face 3808 can be used to select functions normally selected by the right and left mouse buttons, respectively. Thus, the left face 3808 can be pressed by the user to select an object 3822 that has been modeled or drawn using the CAD program. These functions are described in greater detail below with respect to the process of FIG. 43.

Figure 42C:
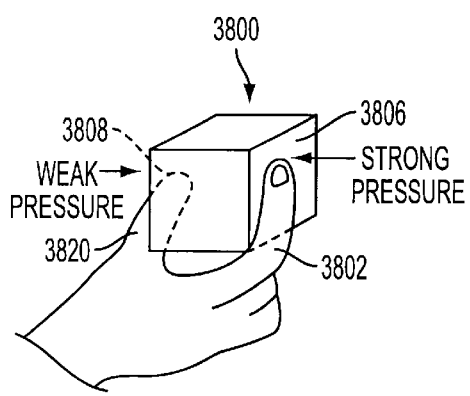
Figure 42D:
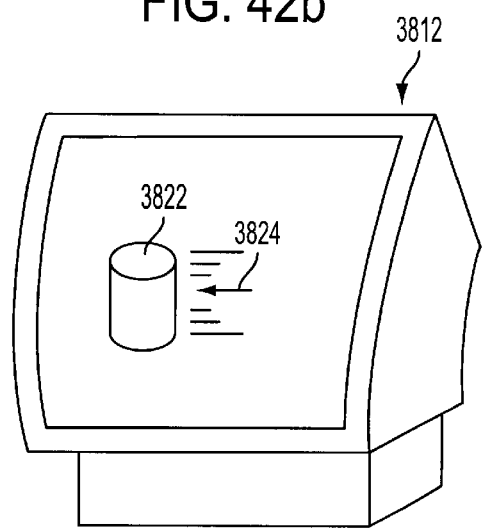

In FIG. 42*c,* the user is applying pressure to right face 3806 with finger 3802 and is applying pressure to left face 3808 with finger 3820. As shown in FIG. 42*d,* the left and right faces of the controller preferably control the movement of object 3822 displayed by the CAD program, similarly to the controlled movement previously shown in FIG. 33*d*3. The user can preferably select a drawn or modeled object (such as object 3822) using cursor 3816 and left or right faces of the cube, so that the selected object will respond to appropriate commands entered on the controller. In FIG. 42*d,* the user is applying a strong pressure to right face 3806 and a weaker pressure on left face 3820. Accordingly, object 3822 moves in a direction corresponding to the stronger force, as shown by arrow 3824, with a velocity proportional to the difference of the two pressures. Alternatively, other methods can be used to move the object 3822 using controller 3800. For example, the user can drag his or her fingers on opposing faces of the controller and move the object as shown previously in FIG. 33*d*5.

Figure 42E:
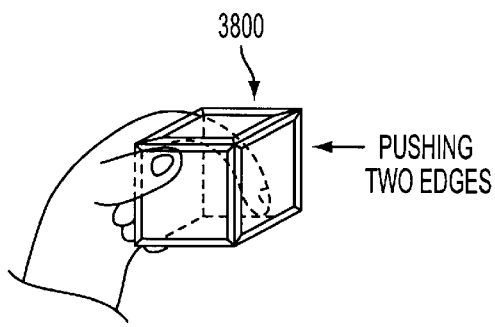
Figure 42F:
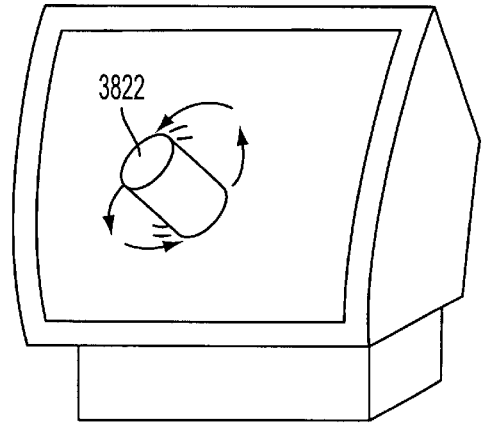

FIG. 42*e* illustrates the user pressing two diagonally-located edge sensors with two fingers to cause rotational movement of object 3822. As explained above with reference to FIGS. 26*a*–26*f,* this type of edge sensor input causes object 3822 to rotate about the appropriate axis. Rotation about all three axes can be accomplished in this way. Object deformation can also be accomplished using input to controller 3800 as described above with respect to FIGS. 41*a*–41*h*. For example, object 3822 can be stretched, shrunk or twisted using appropriate commands.

Figure 43:
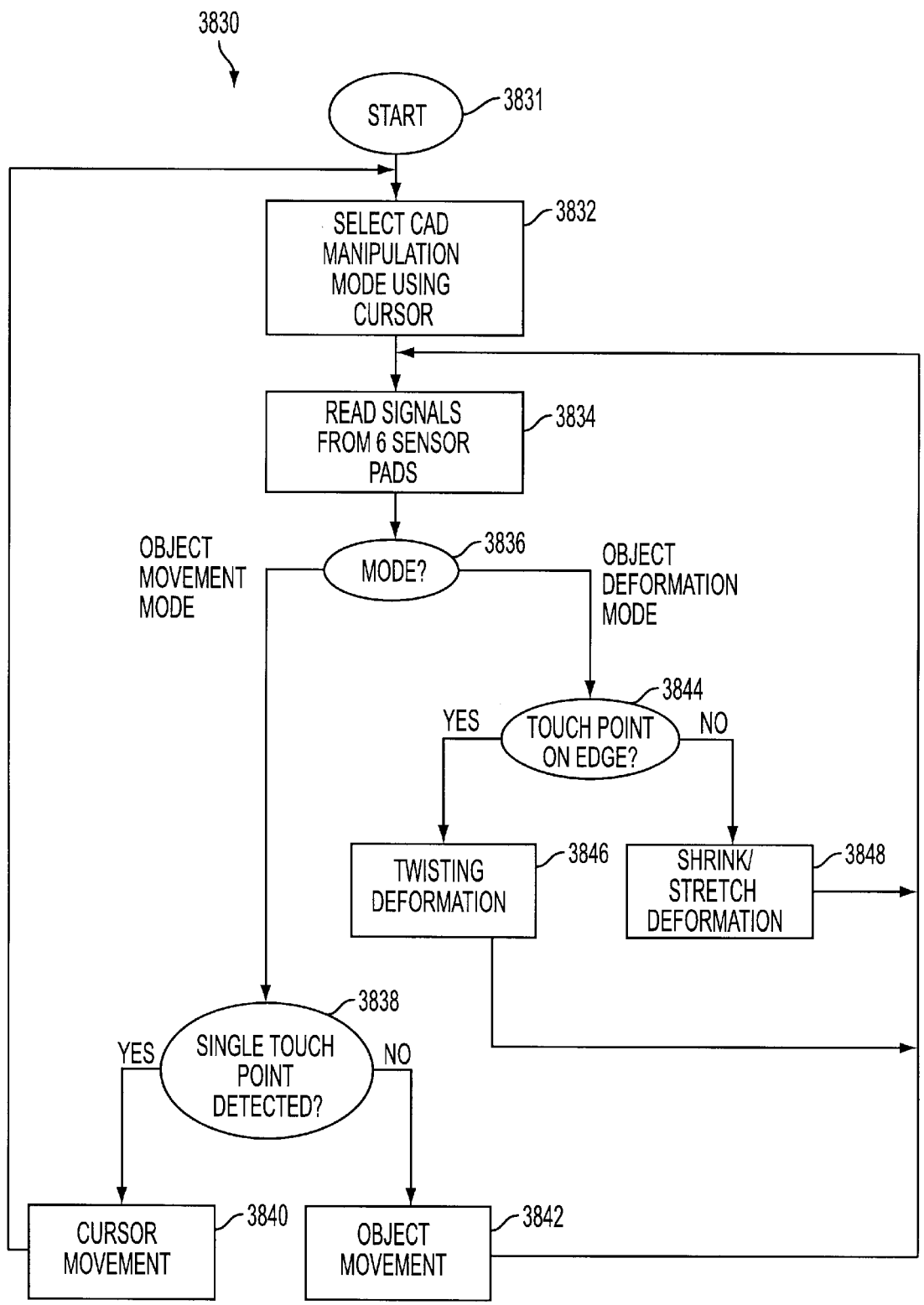
FIG. 43 is a flow diagram illustrating the manipulation of a cursor and an object in the application program of FIG. 42a–f.

FIG. 43 is a flow diagram illustrating a method 3830 of providing input using the controller 3800 to a CAD program or other application program implemented by a computer system. The process begins at 3831, and in step 3832, the CAD manipulation mode is selected by using cursor 3816. In the described embodiment, the CAD manipulation mode is selected from two available modes: object movement mode and object deformation mode. The mode can be selected by the user from a drop down menu, icon, button, or other well-known function of a GUI. In next step 3834, the computer system 220 reads signals from the six sensor pads (or a selected subset of the sensors, if some sensors are not utilized). In next step 3836, the process checks which CAD manipulation mode is currently selected. If object movement mode is selected, then step 3838 is performed, in which the process checks whether a single touch point has been detected. If so, the process continues to step 3840, where movement of the cursor 3816 is implemented. This step is described in greater detail with reference to FIG. 43*a*. The process then returns to step 3832 to check if the moving cursor is used to select another CAD manipulation mode. If a single touch point was not detected in step 3838, then, in step 3842, object movement is implemented. This step allows a selected object displayed on display screen 3812 to be moved in one or more dimensions using the controller, and is described in greater detail with reference to FIG. 43*b*. The process then returns to step 3834.

If object deformation mode is selected in step 3836, then the process checks in step 3844 if the touch point is on an edge sensor of the controller. If so, the process implements a twisting deformation of the displayed object in step 3846, as described in greater detail with respect to FIG. 43*c*. The process then returns to step 3834. If the touch point is not on the edge, it is on a main sensor of the controller, and the displayed object is shrunk or stretched in accordance with the user's input in step 3848, as described in greater detail with respect to FIG. 43*d*. The process then returns to step 3834.

Figure 43A:
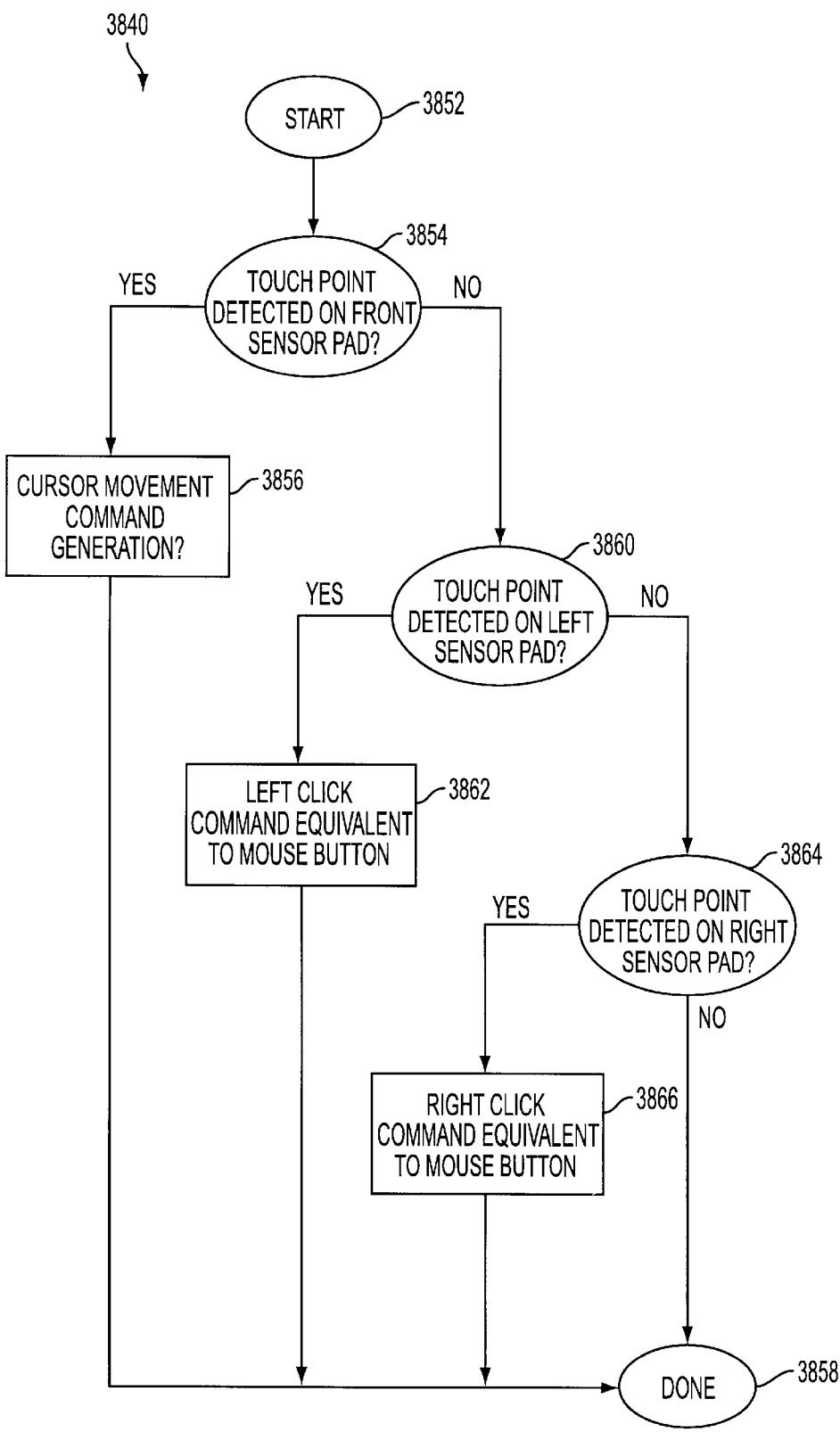
FIG. 43a is a flow diagram illustrating the step of FIG. 43 of moving the cursor using the controller.

FIG. 43*a* is a flow diagram illustrating step 3840 of FIG. 43, in which cursor movement in a CAD application program (or other application program having a moveable cursor) is implemented. The process begins at 3852. In step 3854, the process checks if the touch point has been detected on the main sensor of front face 3804 of the controller. If so, then a cursor movement command is generated in step 3856. The movement command is in accordance with the detected touch point. For example, the cursor on display screen 3812 is displayed at coordinates on display screen 3812 equivalent to the coordinates of the user's finger on the main sensor of the front face. The process is then complete at 3858.

If the detected touch point was not on the front sensor pad, then the process checks whether the detected touch point is positioned on the left sensor pad (relative to the front sensor pad) in step 3860. If so, then a left "click" command, equivalent to the click of a left button on a pointing device, is provided in step 3862. Typically, the left button on a mouse, trackball, touch tablet, or other pointing device, is the main button used to select objects or items displayed on the screen. Any functions selectable with the left mouse button can preferably be selected using the left face 3808 of the controller. For example, a "double click" of the left mouse button is often used to execute a program or perform a function that is different when only a single click is input. The left face of controller can be touched twice in succession to perform the double click. Other buttons or controls on standard input devices can be associated with the left face 3808 of the controller in other embodiments. The process is then complete at 3858.

If the touch point is not detected on the left sensor pad in step 3860, then in step 3864 the process checks if the touch point is detected on the main sensor pad of the right face 3806. If so, a right click command is implemented in step 3866. This command is equivalent to the command generated if the user selected the right mouse button (or equivalent control) on a mouse or other input pointing device. This step is thus similar to step 3862 for the left button of the mouse. Other buttons or controls on standard input devices can be associated with the right face 3806 of the controller in other embodiments. The process is then complete at 3858.

FIG. 43*b* is a flow diagram illustrating step 3842 of FIG. 43, in which movement of an object displayed in the CAD application program is implemented. Preferably, if multiple objects are displayed, the user previously selected a particular object to manipulate, e.g., using cursor 3816. The process begins at 3861, and in step 3863, the process checks whether the touch points are located on diagonally-located edge sensors. If so, then a rotation command of the object, corresponding to the detected input on the edge sensors, is implemented in step 3865. This step is performed similarly to the rotation of objects as shown above with respect to FIGS. 26a–26f. The process is then complete at 3870. If the touch points are not located on diagonally-located edge sensors, then in step 3867, the process checks for a translation mode. If push mode is indicated, step 3868 provides a translation command for the object for appropriate degrees of freedom of the object. This command is generated by the pressure difference of touch points on opposing main sensors, as described above in FIGS. 33d3 and 42c. If drag mode is indicated, step 3869 provides a translation command for the object in accordance with the touch point trajectories on opposing main sensors, as described above with reference to FIG. 33d5. In addition, the user may command translation of the object using both push mode and drag mode simultaneously. For example, while the user is causing x-y movement by dragging two fingers across front and back main sensors in drag mode, the user can also provide a pressure difference between these two fingers, thus causing simultaneous z-axis movement in push mode. After either steps 3868 or 3869, the process is then complete at 3870.

FIG. 43c is a flow diagram illustrating step 3846 of FIG. 43, in which a twisting deformation is performed for the object in the CAD application program. The process begins at 3872, and in step 3874, a deformation command corresponding to the detected input on the edge of controller 3800. This can be implemented as described with reference to FIGS. 41a–41h. For example, a portion of the object can be twisted to a desired position relative to the untwisted portion of the object, as shown with respect to FIG. 41h. The process is then complete at 3876. The object deformation of FIG. 43c can also be implemented in other types of application programs or virtual reality environments.

FIG. 43d is a flow diagram illustrating step 3848 of FIG. 43, in which a shrinking or stretching deformation is provided on the object of the CAD application program. The process begins at 3880, and in step 3882, the process checks if the pressure of the detected touch points is greater than the predetermined threshold pressure. This can be accomplished similarly to the detection of a threshold pressure as described above with reference to FIG. 38. If the touch point pressure is greater than the threshold pressure, then a shrink deformation command is provided in step 3884. This command causes the object to shrink in the specified dimension, as the example of FIG. 41f shows. Preferably, the object is shrunk in each iteration of the main loop of FIG. 43 by a predetermined length (or number of display pixels) that is small enough to provide the user with a high degree of controllability of the dimensions of the object. The process is then complete at 3888 and returns to step 3834 of FIG. 43 to read the six sensor pads. Like the deformation of FIG. 43c, the object deformation of FIG. 43d can also be implemented in application programs or virtual reality environments other than CAD programs.

Figure 44A:
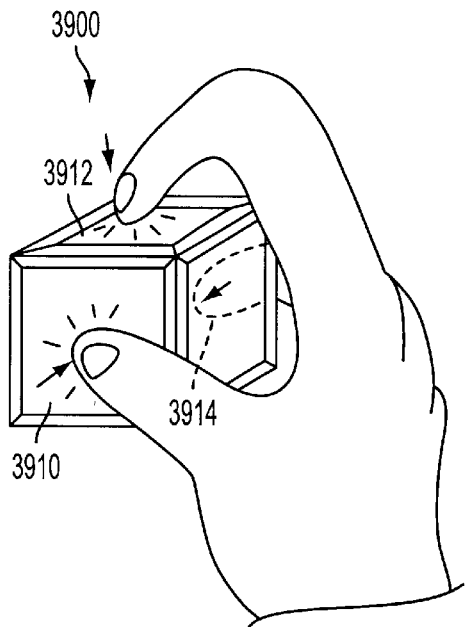
FIGS. 44a–44c illustrate the implementation of psuedo force feedback of the present invention.

FIG. 44a illustrates a user manipulating a controller 3900 in an example of "pseudo force feedback" of the present invention. The user presses on front face 3910, top face 3912, and back face 3914 simultaneously and with a pressure over a predetermined threshold pressure, as described above with reference to FIGS. 37a–h.

Figure 44B:
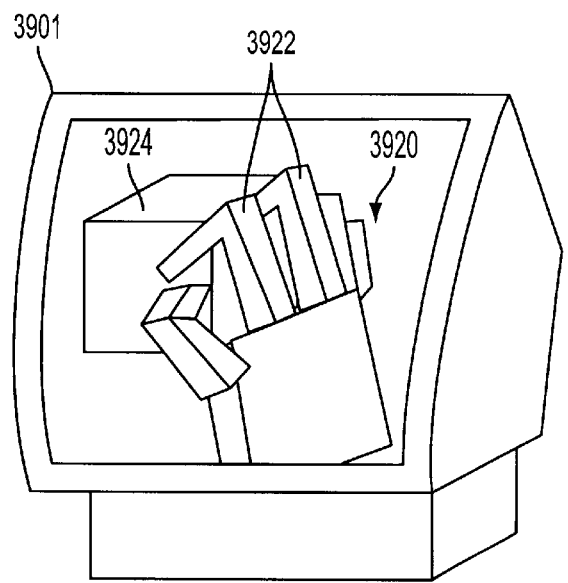

FIG. 44b shows a display monitor 3901 displaying a 3-D virtual environment in which "psuedo force feedback" is not provided in the 3-D virtual environment. Virtual hand 3920 is manipulated by controller 3900 preferably as described above with reference to FIGS. 37a–h. Thus, in response to the user pushing faces 3910, 3912, and 3914, the fingers of hand 3920 curl downward in a "grasping" gesture. When no pseudoforce feedback is provided, the fingers of the hand curl down as far as the user commands them, regardless of any other objects that may be in the path of the virtual fingers or virtual hand. As shown in FIG. 44b, virtual fingers 3922 thus move down to the extent of the grasping position as directed by the user, passing directly "through" an obstacle 3924 that is positioned in the path of the curling virtual fingers 3922 within the simulation. The user does not get any sense of the existence or solidity of obstacle 3924, and thus the simulation is less realistic.

Figure 44C:
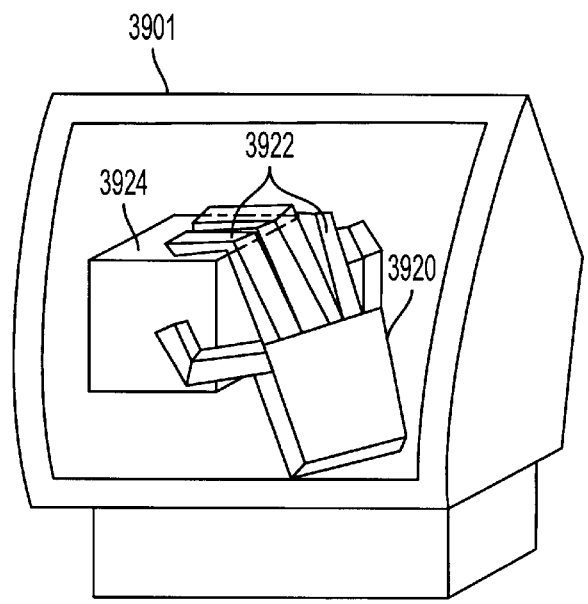

FIG. 44c shows a display monitor 3901 displaying a 3-D virtual environment in which psuedo force feedback is implemented. When the user presses the faces 3910, 3912, and 3914 as shown in FIG. 44a, the virtual fingers 3922 of the virtual hand 3920 move downward in the grasping gesture, but each finger stops moving when any portion of the finger contacts the surface of obstacle 3924. No matter how long or hard the user presses the faces 3910, 3912, and 3914, the virtual fingers will not be moved past the surface of the object. Although not actual, active force feedback, this pseudo force feedback allows the user to feel like he or she is touching the face of obstacle 3924 when he or she touches the face of controller 3900, and increases the realism of the simulation and experience of controlling virtual hand 3920. Similar pseudo force feedback can be provided when manipulating virtual hand 3920 or other controlled object in interaction with other types of objects. This type of pseudo force feedback is not possible with input gloves or other "floating" input devices, since the user does not contact any physical surface with his or her fingers when using these types of devices.

Figure 45A:
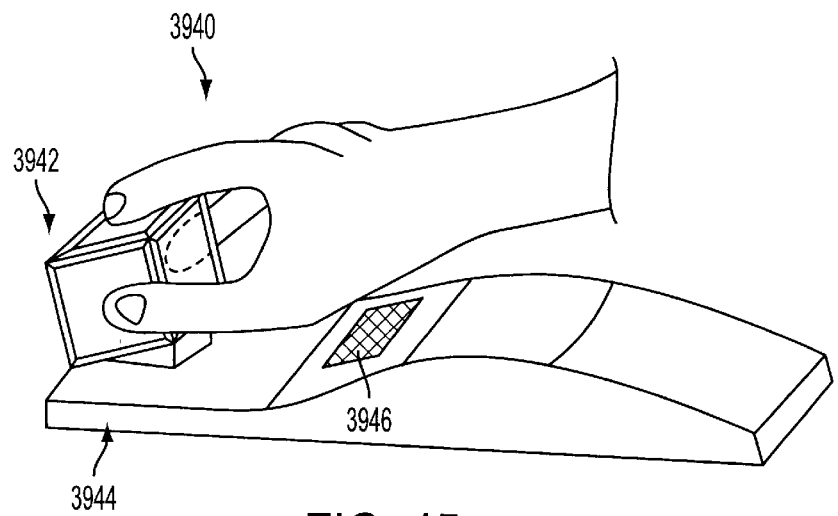
FIGS. 45a and 45b illustrate embodiments of the controller of the present invention including tactile sensation generators for active tactile feedback.

FIG. 45a is a view of an alternate embodiment 3940 of the present invention providing active tactile feedback. A controller 3942 is similar to the controllers described in the above embodiments, and is coupled to a base 3944 which preferably rests on a support surface such as a table top or other stable support, but can also be held by a user in other embodiments. The user manipulates controller 3942 normally, but also rests the palm or other area of his or her hand on a tactile sensation generator 3946 provided on base 3944. Sensation generator 3946 can be implemented as a variety of devices; for example, generator 3946 can be a vibrating diaphragm or similar device for transmitting a vibratory tactile sensation to the user. Motors, solenoids, or other types of tactile sensation generators can also be used. The forces from generator 3946 are preferably coordinated with events taking place with an object under the user's control. For example, in a computer virtual reality situation, the tactile sensation generator can be commanded to output a tactile sensation to the user by the controlling computer when a user-controlled object, such as virtual hand 3920 of FIG. 44b, impacts a different object in the simulation, such as obstacle 3924 of FIG. 44b. In addition, the tactile sensation generator 3946 can be placed at other areas of the input device 3940, such as on controller 3942.

Figure 45B:
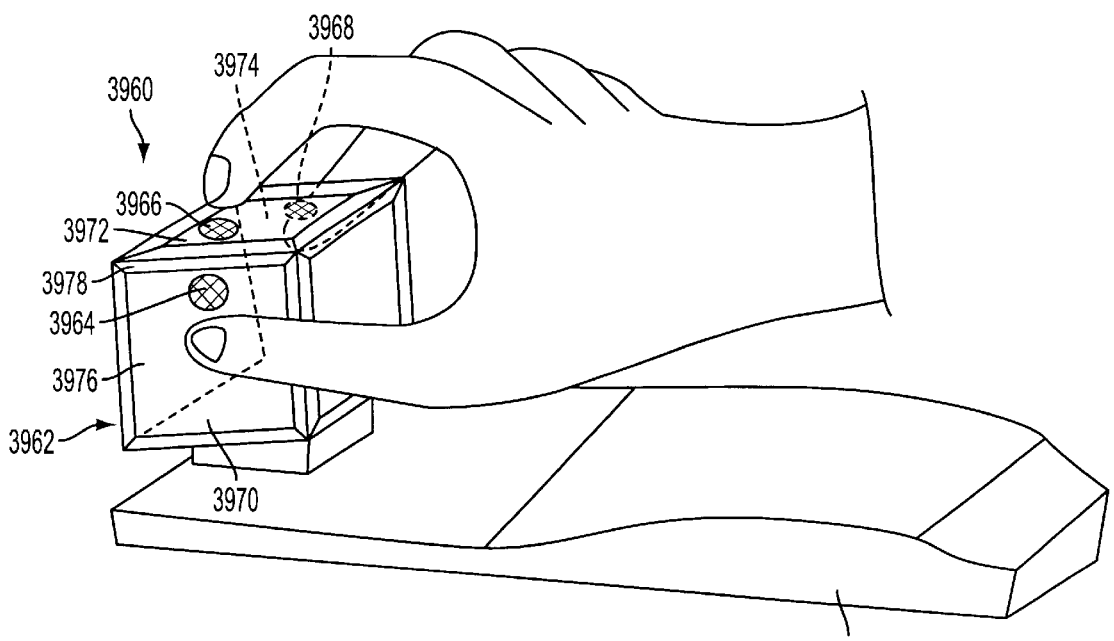

FIG. 45b is a view of an alternate embodiment 3960 of the present invention providing active tactile feedback from multiple tactile sensation generators. Like the embodiment of FIG. 45a, a base 3974 can be provided to support controller 3962 so the user may manipulate the cube using only one hand. Tactile sensation generators 3964, 3966, and 3968 are located on the controller 3962, where tactile generator 3964 is provided on face 3970, tactile generator 3966 is provided on face 3972, and tactile generator 3968 is provided on face 3974. These tactile sensation generators can be implemented as vibration diaphragms or other tactile sensation generating devices. The generators are preferably placed on main sensor portion of each face next to the edge sensor. This allows force feedback to be felt by the user's finger tips when inputting commands on either main sensor 3976 or an edge sensor 3978. Such tactile feedback can provide tactile cues to events occurring in a simulation or interactions of a controlled object.

In other embodiments, the tactile sensation generators can be placed on other portions of each face of the controller, such as in the center of each face. Also, the tactile sensation generators can be of different sizes, e.g., a tactile sensation generator can cover an entire main sensor 3976 or an entire face of the controller 3962. In other embodiments, additional tactile sensation generators can be provided, such as a generator on each edge sensor and on the main sensor of a face. Also, the tactile sensation generator 3946 as shown in FIG. 45a can be utilized on base 3974 to provide additional user feedback.

Figure 46A:
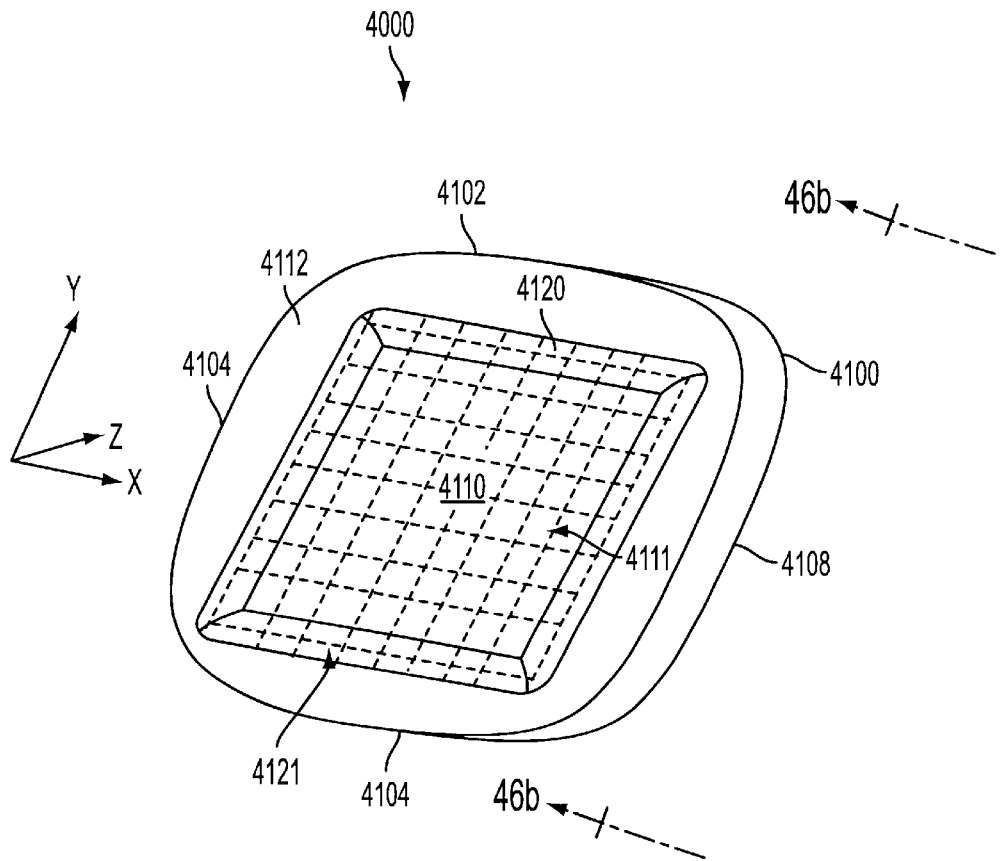
FIG. 46a is a front view of a controller in accordance with another embodiment of the present invention.

FIG. 46a is a front view of a controller 4000 in accordance with another embodiment of the present invention. Controller 4000 includes a body 4100 having a top edge 4102, a bottom edge 4104, a left edge 4106 and a right edge 4108. Controller 4000 also includes a first sensor assembly ("sensor") 4110 having a first sensing surface 4111 located on the front side 4112 of body 4100. The sensor is generally flat and responsive to pressure. The first sensor 4110 is surrounded at least in part by a first edge sensor 4120 having a first edge sensing surface 4121.

Figure 46B:
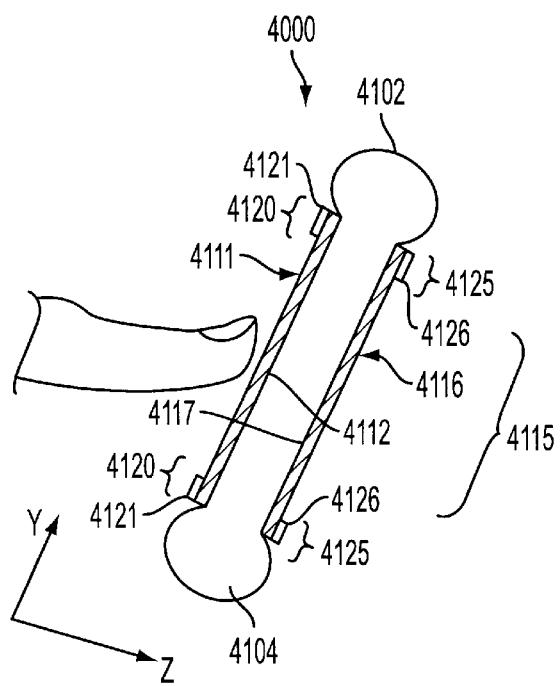

FIG. 46b is a side view of controller 4000 from right edge 4108 taken along line 46b—46b of FIG. 46a. Controller 4000 further includes a second sensor 4115 having a second sensing surface 4116 located on the rear side 4117 of body 4100. A second edge sensor 4125 having a second edge sensing surface 4126 is positioned around the periphery of second sensor 4115. As illustrated, first sensing surface 4112 and second sensing surface 4117 have dimensions that are substantially greater than the separation between first sensing surface 4112 and second sensing surface 4117.

FIG. 46c illustrates a method of operating controller 4000 to produce an x,y translation signal in the Cartesian coordinate system. The method begins when a user presses a stylus or a finger (as shown) within a first range of force against first sensing surface 4111 at a first position. The first range of force preferably encompasses a light to medium pressure against the sensing surface. Then the user moves the finger to a second position while maintaining contact with first sensing surface 4111. When the user moves her finger, a first transducer coupled to first sensing surface 4111 produces an x,y translation signal that may be used in moving an object such as a cursor or a graphic displayed on a computer screen, or a crane or a forklift.

The x,y translation signal produced by the first transducer at the first position is determined by the position of the object. When the user moves her finger, the x,y coordinates are changed by a x,y translation signal generated by the first transducer based on the direction of finger movement as follows: towards top edge 4102, the y coordinates are increased, towards bottom edge 4104, the y coordinates are decreased, towards left edge 4106, the x coordinates are decreased, and towards right edge 4108, the x coordinates are increased. That is, the object is moved in a relative, as opposed to absolute fashion in relationship to the movement of the finger on the sensing surface.

FIG. 46d illustrates a method of operating controller 4000 to produce a yaw and pitch rotation signal. The method begins when a user may presses a finger against second sensing surface 4116 at a first position within a first range of force. The user then moves the finger to a second position while maintaining contact with second sensing surface 4116.

When the user moves her finger, a second transducer coupled to second sensing surface 4116 will transmit a pitch and a yaw rotation signal. If the user moves her finger towards: the top edge 4102, a positive pitch signal will be transmitted, towards the bottom edge 4104, a negative pitch signal will be transmitted, towards the left edge 4106, a negative yaw signal will be transmitted, and towards the right edge, 4108, a positive yaw signal will be transmitted.

FIG. 46e illustrates a method of operating controller 4000 to produce a series of z coordinates in the Cartesian coordinate system. The method begins when a user presses a finger within a second range of force against first sensing surface 4111, which generates a z+ translation signal that may be used in moving an object. The second range of force is preferably greater than the first range of force used when executing a finger movement across the sensing surfaces. The second range of force preferably encompasses a medium to heavy pressure against the sensing surface. The user may also press her finger within a second range of force against a second sensing surface 4116 to generate a z− translation signal.

FIG. 46f illustrates a method of operating controller 4000 to produce a roll rotation signal. To initiate a roll rotation signal, a user presses a finger against first sensing surface 4111, and another finger against second sensing surface 4117. Controller 4000 is preferably sized so that a user can operate first sensing surface 4111 and second sensing surface 4117 with a thumb and another finger of the same hand. The user then slides the finger along first sensing surface 4111. If the user slides her finger towards left edge 4106, a negative roll signal is generated. If the user slides her finger towards right edge 4108, a positive roll signal is generated.

Figure 46G:
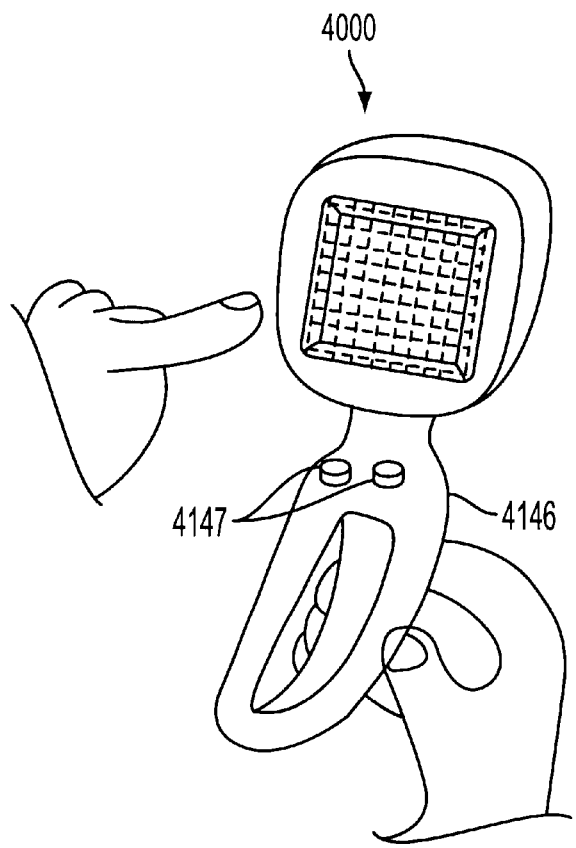
FIG. 46g illustrates an embodiment of the controller of FIG. 46a with an attached handle.

FIG. 46g illustrates an embodiment of controller 4000 with an attached handle 4146. Handle 4146 is used to allow a user more flexibility in using controller 4000 such as allowing the user to grip controller 4000 by the handle 4146 with one hand, and operate controller 4000 with the other. Handle 4146 may have a number of buttons 4147 that may be programmed to perform a variety of functions.

Figure 46H:
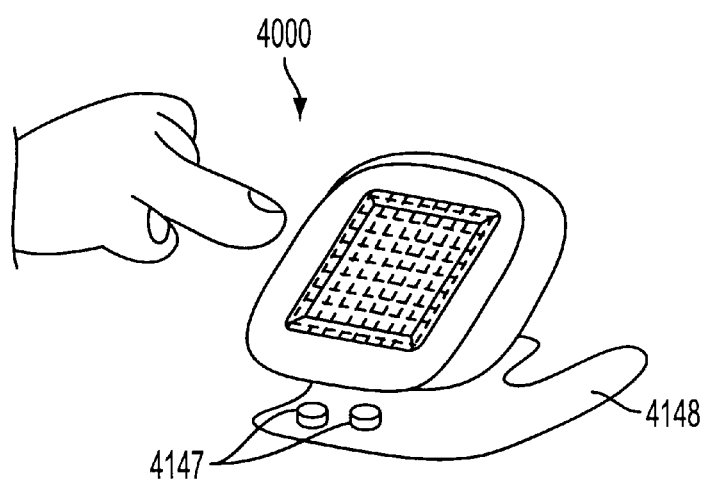
FIG. 46h illustrates an embodiment of the controller of FIG. 46a with a support.

FIG. 46h illustrates an embodiment of controller 4000 with a support 4148. Support 4148 is typically used to support controller 4000 on a desk top, allowing for easy access to a user. Support 4148 may also include buttons 4147.

As shown in each of FIGS. 46a–h, first edge sensor 4120 and second edge sensor 4125 are positioned around the periphery of first sensor 4110 and second sensor 4115 respectively. Preferably, first edge sensing surface 4121 and second sensing surface 4126 are specifically tactilely distinguished from first sensing surface 4110 and second sensing surface 4115 to let the user know that she has accessed the edge sensors without looking at the controller. Edge sensing surfaces 4121 and 4126 may also be raised or lowered with respect to sensing surfaces 4121 and 4126 to perform the same function.

After operating controller 4000 as indicated in the methods with reference to FIGS. 46c, 46d, 46e, and 46f, the user may continue the specified finger movement to contact the edge sensing surfaces 4121 and 4126. A first edge transducer and a second edge transducer coupled to edge sensing surfaces 4121 and 4126 then generate a continuation command signal. The continuation command signal continues the x,y and z translation signals as well as the pitch, yaw and roll rotation signals until the user initiates another signal by contacting the sensing surfaces thereafter. For example, if a user places her finger in the middle of the first sensing surface 4111 and moves the finger to the first edge sensing surface 4121 while maintaining contact the sensing surfaces, controller 4000 will continue to generate an x,y translation signal that increases the x coordinates after the user has lifted her finger away from the sensing surfaces.

Figure 47A:
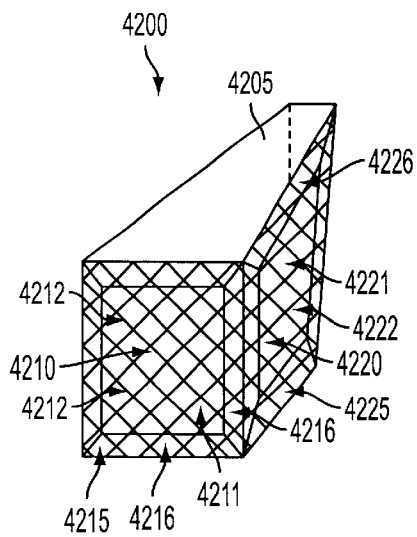
FIG. 47a illustrates a controller in accordance with yet another embodiment of the present invention.

FIG. 47*a* illustrates a controller 4200 in accordance with yet another embodiment of the present invention. Controller 4200 includes a wedge shaped body 4205 having a front surface 4212 and a right surface 4222. Wedge shaped body 4205 includes a first sensor 4210 having a first sensing surface 4211 located on front surface 4212 of wedge shaped body 4205. A first edge sensor 4215 having a first edge sensing surface 4216 is positioned around the periphery of first sensor 4210 to provide a continuation command signal as described above.

Controller 4200 further includes a second sensor 4120 having a second sensing surface 4121 that may be located on either right surface 4222 or left surface 4247 of wedge shaped body 4205 depending whether the use is right handed or left handed respectively. For purposes of illustration, second sensor 4120 is located on right surface 4122 of wedge shaped body 4205. A second edge sensor 4225 having a second edge sensing surface 4226 is positioned around the periphery of second sensor 4225 to generate a continuation command signal.

Figure 47B:
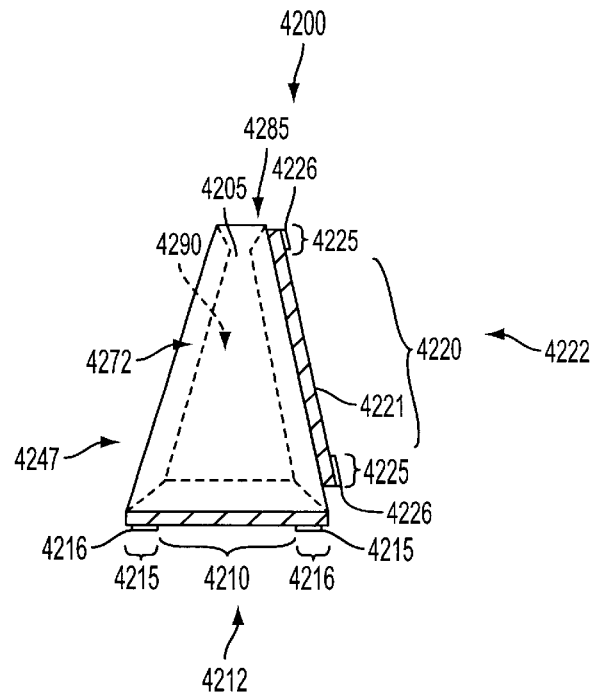

FIG. 47*b* is a top view of controller 4200. As illustrated, wedge shaped body 4205 further includes a top surface 4272, a left surface 4247, a rear surface 4285, and a bottom surface 4290.

Figure 47C:
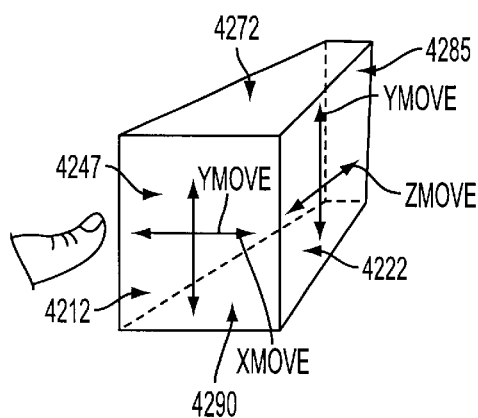
FIG. 47c illustrates a method of operating the controller of FIG. 47a to generate an x,y and z translation signal.

FIG. 47*c* illustrates a method of operating controller 4200 to generate an x,y and z translation signal. The method begins when a user presses a stylus or a finger within a first range of force against one of the sensing surfaces 4211 and 4221 at a first position. Then the user moves the finger to a second position while maintaining contact with the sensing surface. When the user moves her finger, a first transducer coupled to first sensor 4210 produces an x,y translation signal and/or a second transducer coupled to second sensor 4220 produces a y,z translation signal.

The x,y and y,z translation signals produced at the first position is determined by the position of the object being moved. When the user moves her finger on the first sensing surface, the x,y coordinates are changed by a x,y translation signal generated by the first transducer based on the direction of finger movement on the first sensing surface as follows: towards top surface 4272, the y coordinates are increased, towards bottom surface 4290, the y coordinates are decreased, towards left surface 4247, the x coordinates are decreased, and towards right surface 4222, the x coordinates are increased.

When the user moves her finger on second sensing surface 4221, the y,z coordinates are changed by a y,z translation signal generated by the second transducer based on the direction of finger movement on second sensing surface 4221 as follows: towards top surface 4272, the y coordinates are increased, towards bottom surface 4290, the y coordinates are decreased, towards front surface 4212, the z coordinates are decreased, and towards rear surface 4285, the z coordinates are increased.

Figure 47D:
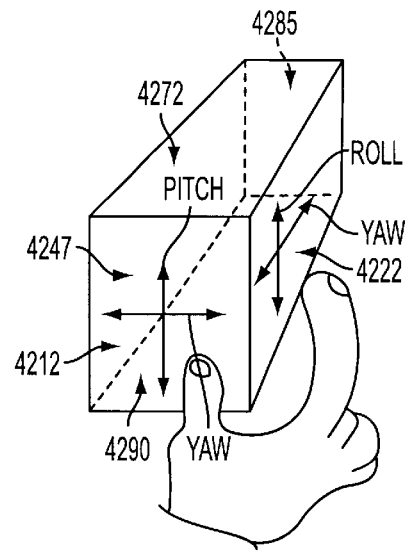
FIG. 47d illustrates a method of operating the controller of FIG. 47a to generate a pitch, yaw and roll rotation signal.

FIG. 47*d* illustrates a method of operating controller 4200 to generate a pitch, yaw and roll rotation signal. The method begins when a user presses a finger against both first sensing surface 4211 and second sensing surface 4221 at a first position. Then the user may slide either finger to a second position while maintaining contact with the sensing surface. When the user slides her finger, a combination of the two transducers generate a pitch, yaw, or roll rotation signal.

If a finger is dragged on first sensing surface 4211: towards top surface 4272, then a positive pitch signal is generated, towards bottom surface 4290, then a negative pitch signal is generated, towards right surface 4222, then a positive yaw signal is generated, towards left surface 4247, then a negative yaw signal is generated. If a finger is dragged on second sensing surface 4221: towards top surface 4272, then a positive roll signal is generated, towards bottom surface 4290, then a negative roll signal is generated, towards front surface 4212, then a negative yaw signal is generated, towards rear surface 4285, then a positive yaw signal is generated.

Figure 47E:
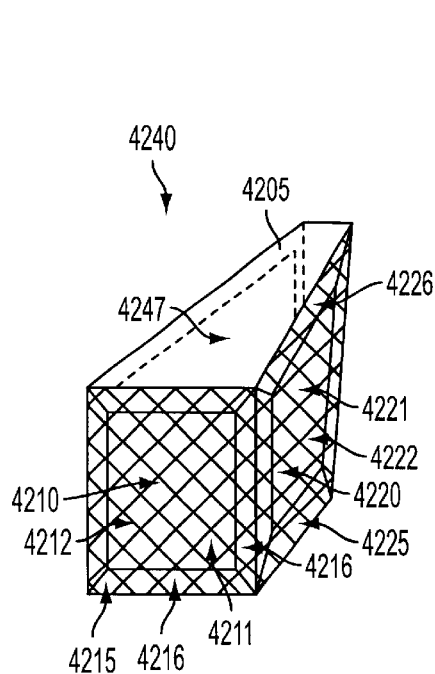
FIG. 47e and FIG. 47f illustrate a controller in accordance with yet another embodiment of the present invention.
Figure 47F:
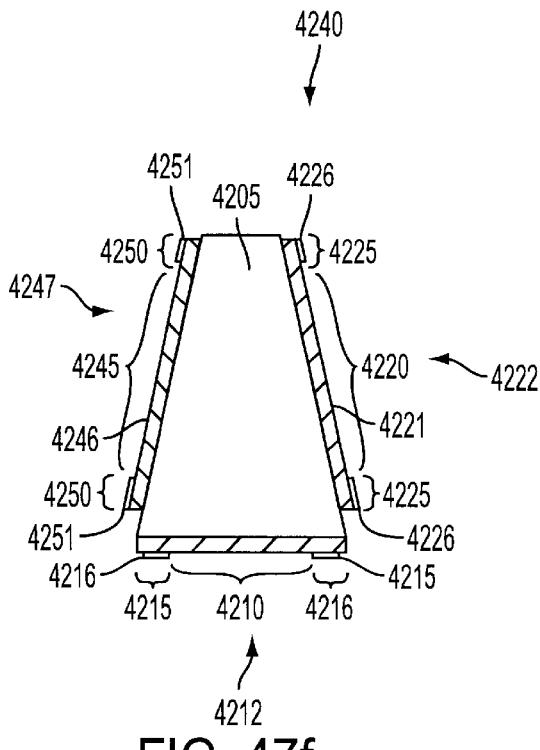

FIG. 47*e* and FIG. 47*f* illustrate a controller 4240 in accordance with yet another embodiment of the present invention. Controller 4240 is identical to controller 4000, except that it further comprises a third sensor 4245 having a third sensing surface 4246 positioned on the left surface 4247 of wedge shaped body 4205. A third edge sensor 4450 having a third edge sensing surface 4451 is positioned around the periphery of third sensor 4245.

Figure 47G:
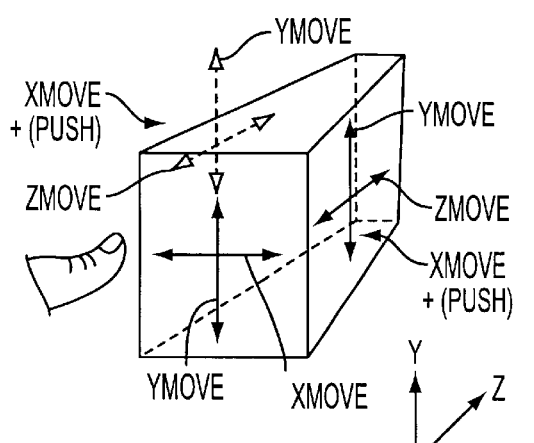
FIG. 47g illustrates a method of operating the controller of FIG. 47e to produce an x,y and z translation signal.

FIG. 47*g* illustrates a method of operating controller 4240 to produce an x,y and z translation signal. The method is similar to the method described with reference to FIG. 47*c*, but further includes the use of third sensor 4245 and third edge sensor 4250. When the user moves her finger while maintaining contact with third sensing surface 4246, the y,z coordinates are changed by a y,z translation signal generated by a third transducer coupled to third sensor 4245 based on the direction of finger movement as follows: towards top surface 4272, the y coordinates are increased, towards bottom surface 4290, the y coordinates are decreased, towards front surface 4212, the z coordinates are increased, and towards rear surface 4285, the z coordinates are decreased.

In a preferred embodiment, method further includes an operation when a user presses a finger within a second range of force against either the second sensing surface 4221 to generate an x− translation signal or third sensing surface 4246 to generate an x+ translation signal. Preferably, the second range of force is greater than the first range of force used in method. Again, the third edge sensor 4250 may be used to generate a continuation control signal as described above.

Figure 47H:
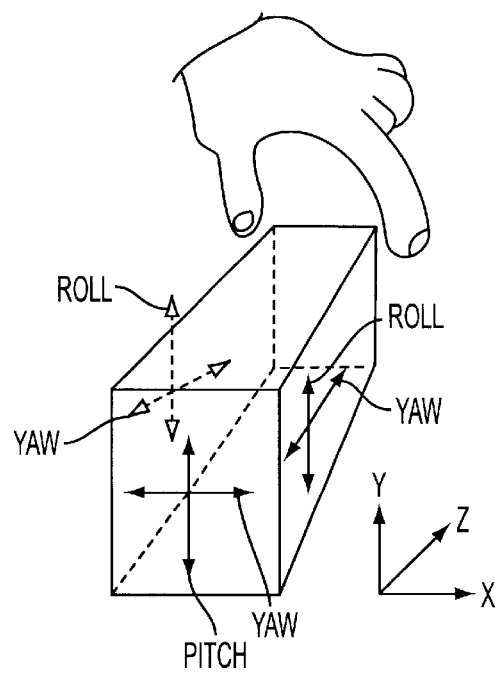
FIG. 47h illustrates a method of operating the controller of FIG. 47e to generate a pitch, yaw and roll rotation signal.

FIG. 47*h* illustrates a method of operating controller 4240 to generate a pitch, yaw and roll rotation signal. The method is similar to the method as described with reference to FIG. 47*d*, further including the use of third sensor 4245 and third edge sensor 4250. The user presses a finger against sensing surface 4246 and either sensing surface 4211 or sensing surface 4221. The user may then slide the finger contacting sensing surface 4246 to a second position while maintaining contact with the sensing surface with both fingers. When the user slides her finger, the combination of the two transducers generate a pitch, yaw or roll rotation signal. Third sensor 4245 functions identically with second sensor 4220 to generate yaw and roll rotation signals.

Figure 48A:
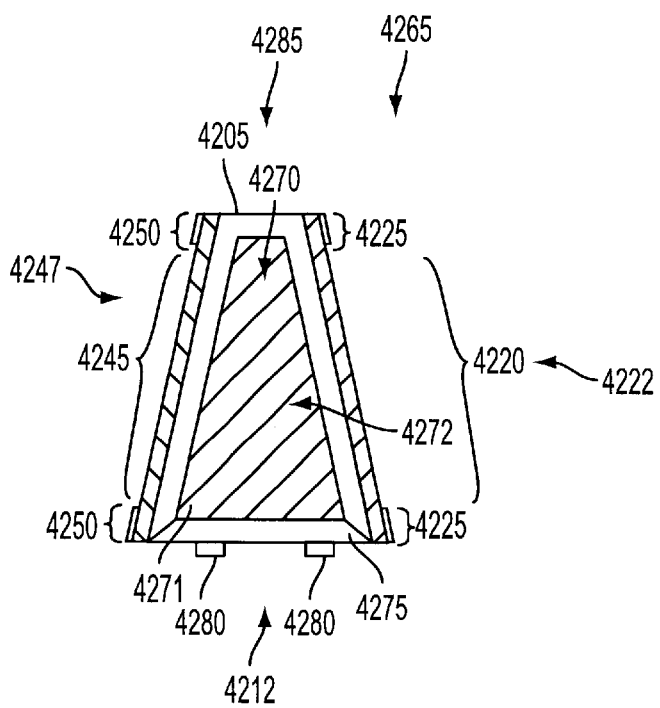
FIG. 48a is a top view of a controller in accordance with yet another embodiment of the present invention.

FIG. 48*a* is a top view of a controller 4265 in accordance with yet another embodiment of the present invention. Controller 4265 is similar to controller 4240 except that it further includes a fourth sensor 4270 having a fourth sensing surface 4271 located on a top surface 4272 of wedge shaped body 4205, and excludes the use of first sensor 4210 and first edge sensor 4215. A fourth edge sensor 4275 having a fourth edge sensing surface 4276 is positioned around the periphery of fourth sensor 4270 to provide a continuation command signal as described above. A number of control buttons 4280 located on the front surface 4212 of wedge shaped body 4205 may be added to perform additional controller functions.

Figure 48B:
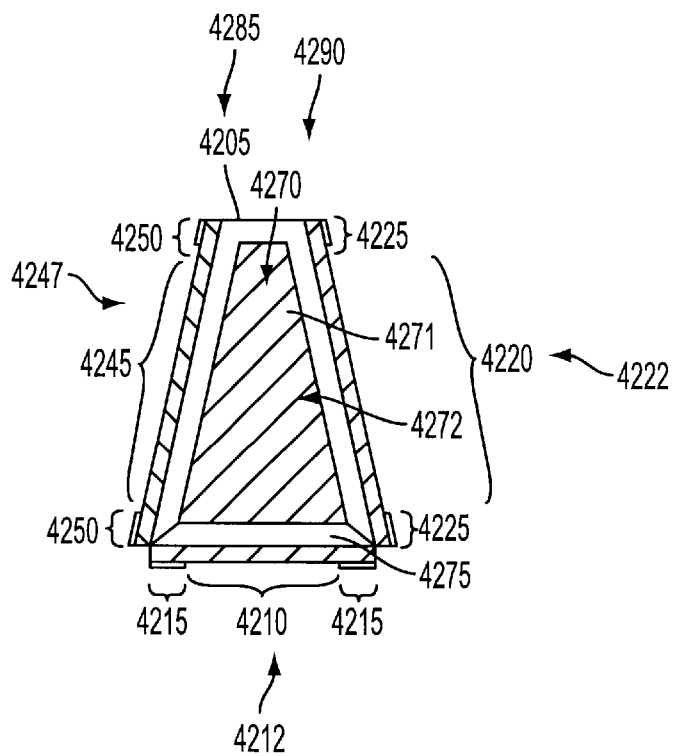
FIG. 48b illustrates a controller in accordance with yet another embodiment of the present invention.

FIG. 48b illustrates a controller 4290 in accordance with yet another embodiment of the present invention. Controller 4290 is similar to controller 4265 except it excludes control buttons 4280 and further includes first sensor 4210 and first edge sensor 4215 as described in FIG. 47b.

Figure 48C:
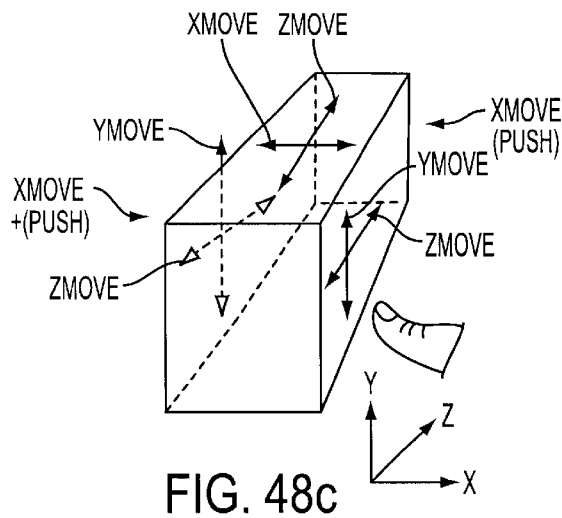
FIG. 48c illustrates a method of operating the controller of FIG. 48a to produce an x,y and z translation signal.

FIG. 48c illustrates a method of operating controller 4285 to produce an x,y and z translation signal. The method is similar to the method as described with reference to FIG. 47g, except that method excludes use of first sensor 4210 and first edge sensor 4215 and includes the use of fourth sensor 4270 and fourth edge sensor 4275. When the user moves her finger on the fourth sensing surface 4271, the x,z coordinates are changed by an x,z translation signal generated by a fourth transducer coupled to fourth sensor 4270. The x and z coordinates are changed based on the direction of finger movement as follows: towards left surface 4247, the x coordinates are increased, towards right surface 4222, the x coordinates are decreased, towards rear surface 4282, the z coordinates are increased, and towards front surface 4212, the z coordinates are decreased.

Figure 48D:
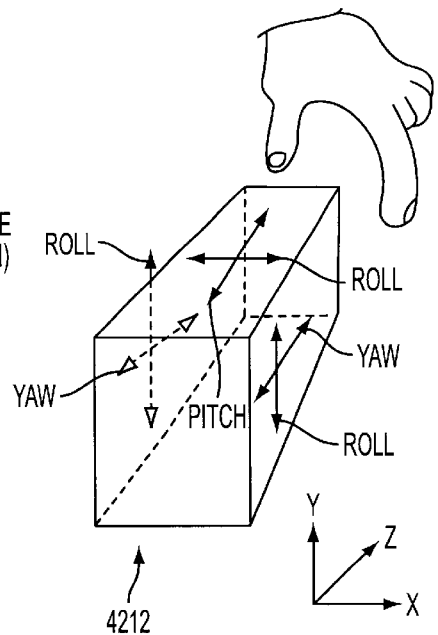
FIG. 48d illustrates a method of operating the controller of FIG. 48a to generate a pitch, yaw and roll rotation signal.

FIG. 48d illustrates a method of operating controller 4285 to generate a pitch, yaw and roll rotation signal. The method is similar to the method as described with reference to FIG. 47g. However this method excludes the use of first sensor 4210 and first edge sensor 4215, but further includes the use of fourth sensor 4270 and fourth edge sensor 4275. The user presses a finger against sensing surface 4271 and either sensing surface 4211 or sensing surface 4221. The user may then slide the finger contacting sensing surface 4271 to a second position while maintaining contact with the sensing surface with both fingers. When the user slides her finger, the combination of the two transducers generate a pitch or roll rotation signal depending on the direction of the finger movement on sensing surface 4271 as follows: towards left surface 4247, a positive roll signal is generated, towards right surface 4222, a negative roll signal is generated, towards rear surface 4285, a positive pitch signal is generated, and towards front surface 4212, a negative pitch signal is generated.

Figure 48E:
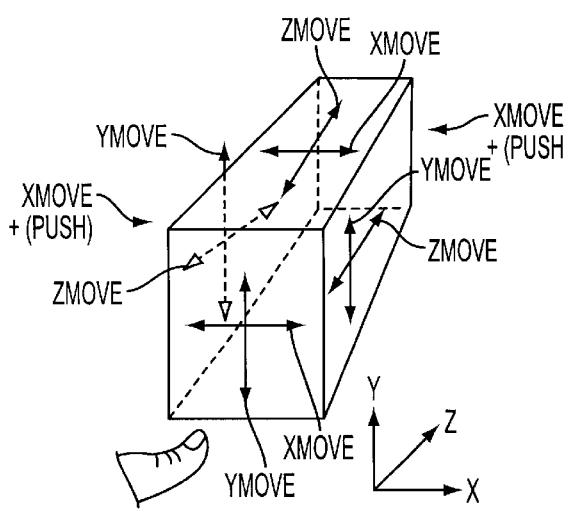
FIG. 48e illustrates a method of operating the controller of FIG. 48b to generate an x, y and z translation signal.

FIG. 48e illustrates a method of operating controller 4290 to generate an x, y and z translation signal. The method is similar to the method as described with reference to FIG. 48c, but further includes the use of first sensor 4210 and first edge sensor 4215 to the method as described with reference to FIG. 47g.

Figure 48F:
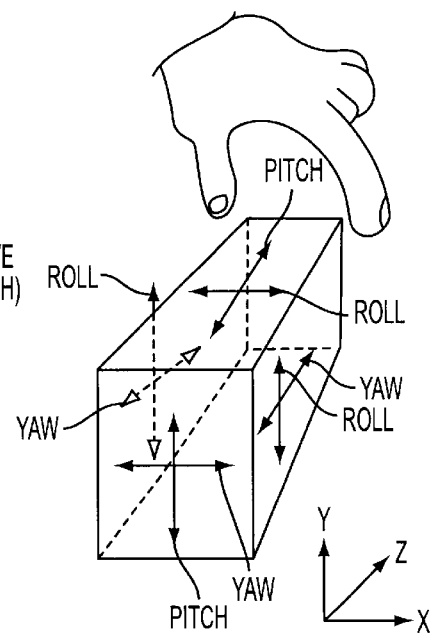
FIG. 48f illustrates a method of operating the controller of FIG. 48b to generate a pitch, yaw, and roll rotation signal.

FIG. 48f illustrates a method of operating controller 4290 to generate a pitch, yaw, and roll rotation signal. The method is similar to the method as described with reference to FIG. 48d, but further includes the use of first sensor 4210 and first edge sensor 4215 in the method as described with reference to FIG. 47h. Any two sensing surfaces 4211, 4221, 4246 and 4271 may be used to initiate the generation of a pitch, yaw or roll rotation signal.

FIGS. 49a–f illustrate several different embodiments of a number of controllers 4315a–f in accordance with the present invention. Controllers 4315a–f include a cube shaped body 4320 with a front surface 4321, a rear surface 4322, a top surface 4323, a left surface 4324, and a right surface 4326 in the same fashion as shown on wedge shaped body 4205. In the embodiments shown, cube shaped body 4320 supports two to five sensors each with corresponding edge sensors in different configurations located on the faces of cube shaped body 4320 in the same fashion shown on wedge shaped body 4205.

Figure 49G:
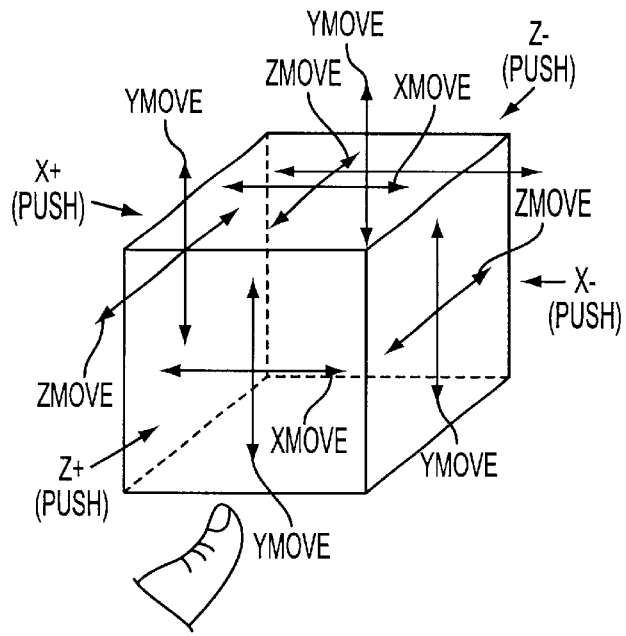
FIG. 49g illustrates a method of operating the controllers of FIGS. 49a–f to generate an x, y or z translation signal.

FIG. 49g illustrates a method of operating controllers 4315a–f to generate an x, y or z translation signal. The method follows the same logic and includes operations that are similar to the operations found in the methods for operating controller 4290 as described with reference to FIG. 48e. As with the methods of operating controllers 4200, 4240, 4265, and 4290 to generate an x, y or z translation signal, a set of Cartesian axes 4325 provides for the orientation of the controller. Cartesian axes 4325 includes an x axis 4330, a y axis 4335, and a z axis 4340.

For example, if a user wants to generate an x translation signal, she must swipe her finger along a surface of an available sensor located on a surface of cube shaped body 4320 in the direction of the x axis 4330. For example, a user may execute a finger swipe on the front surface 4321 or the rear surface 4322 of controller 4315b in the direction of x-axis 4330 to generate an x translation signal. If a user wanted to generate a y translation signal from controller 4315f, she would execute a finger swipe in the direction of y-axis 4335 on any of the faces of controller 4315 except for the top surface 4323.

Figure 49H:
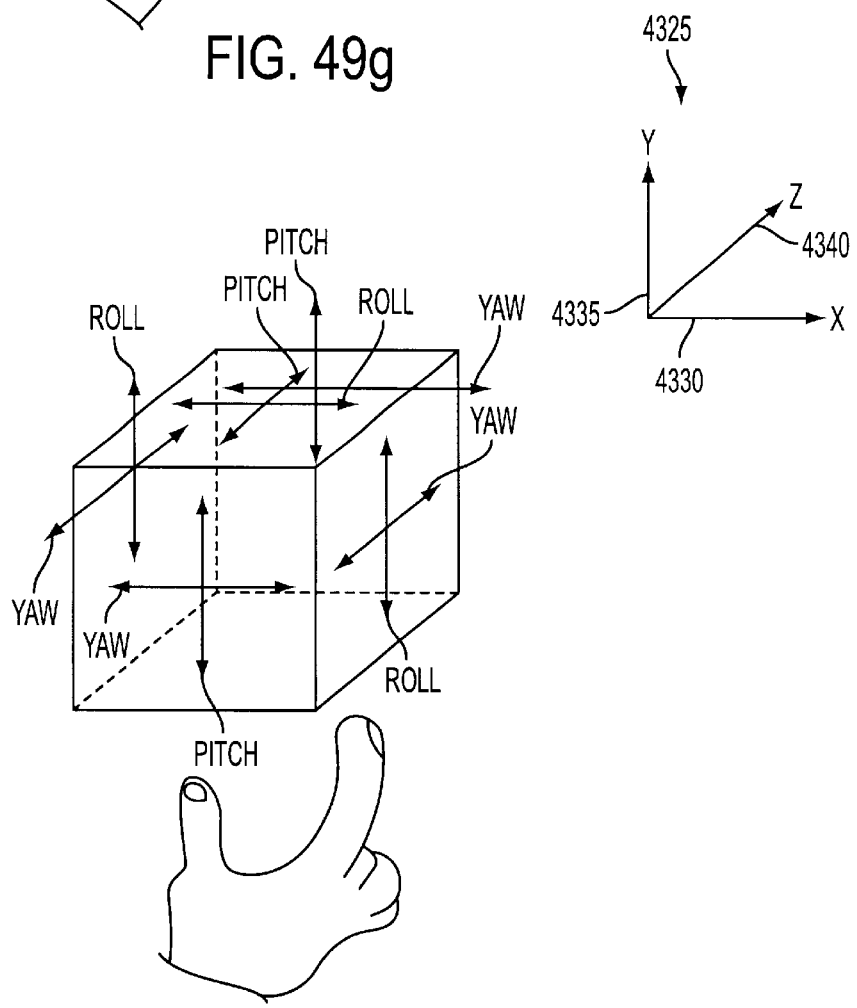
FIG. 49h illustrates a method of operating the controllers of FIGS. 49a–f to generate a pitch, yaw or roll rotation signal.

FIG. 49h illustrates a method of operating controllers 4315a–f to generate a pitch, yaw or roll rotation signal. The method follows the same logic and includes operations that are similar to the operations found in methods for operating controller 4290 with reference to FIG. 48f. As with the methods of operating controllers 4200, 4240, 4265, and 4290 to generate a pitch, yaw or roll rotation signal, set of Cartesian axes 4325 provides for the orientation of the controller.

For example, if a user wants to generate an pitch rotation signal, she must swipe her finger along a surface of an available sensor located on a surface of cube shaped body 4320 in the direction of the pitch rotation around x axis 4330. For example, a user may execute a finger swipe on the front surface 4321 or the rear surface 4322 of controller 4315b in the direction of pitch rotation around x axis 4330 while holding another finger against any other available sensor to generate a pitch rotation signal.

Figure 50A:
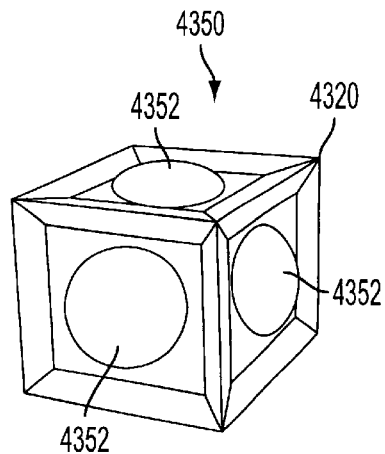
FIG. 50a illustrates a controller in accordance with yet another embodiment of the present invention.

FIG. 50a illustrates a controller 4350 in accordance with yet another embodiment of the present invention. Controller 4350 includes cube shaped body 4320 having trackballs 4352 mounted on the different faces of cube shaped body 4320. The trackballs 4352 have the same function as the sensors used in controllers 4315a–f.

Figure 50B:
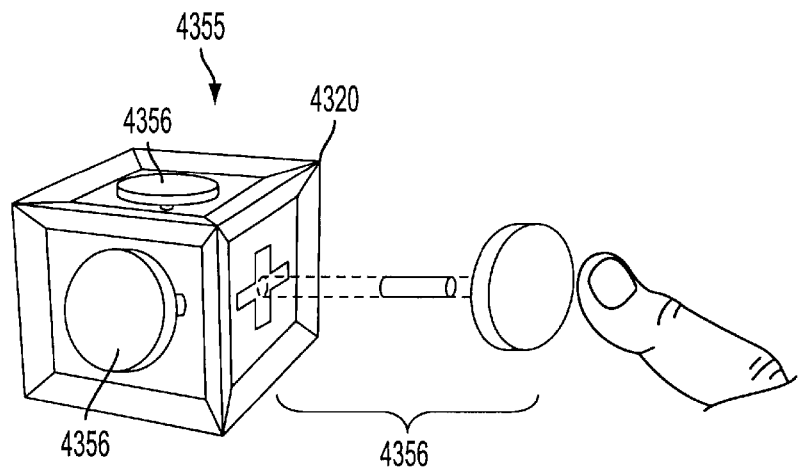
FIG. 50b illustrates a controller in accordance with yet another embodiment of the present invention.

FIG. 50b illustrates a controller 4355 in accordance with yet another embodiment of the present invention. Controller 4355 includes a cube shaped body 4320 having finger stick sensors 4356 mounted on the different faces of cube shaped body 4320. Finger stick sensors 4356 serve the same function as the sensors used in controllers 4315a–f. One example of a finger stick sensor is the Aurora Multi-Axis Force Sensor manufactured by Bourns, Incorporated of Riverside, Calif.

Figure 50C:
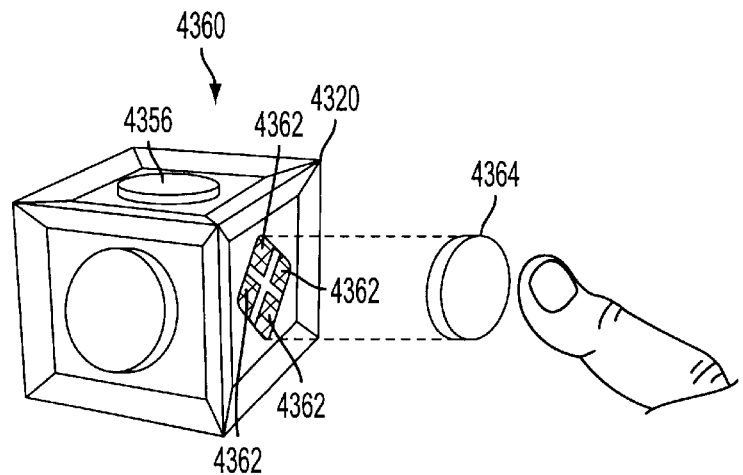
FIG. 50c illustrates a controller in accordance with yet another embodiment of the present invention.

FIG. 50c illustrates a controller 4360 in accordance with yet another embodiment of the present invention. Controller 4360 includes a cube shaped body 4320 having zone force sensitive resistor thin film sensors ("zone sensors") 4362 covered by a zone sensor cover 4364 and mounted on the different faces of cube shaped body 4320.

Figure 51A:
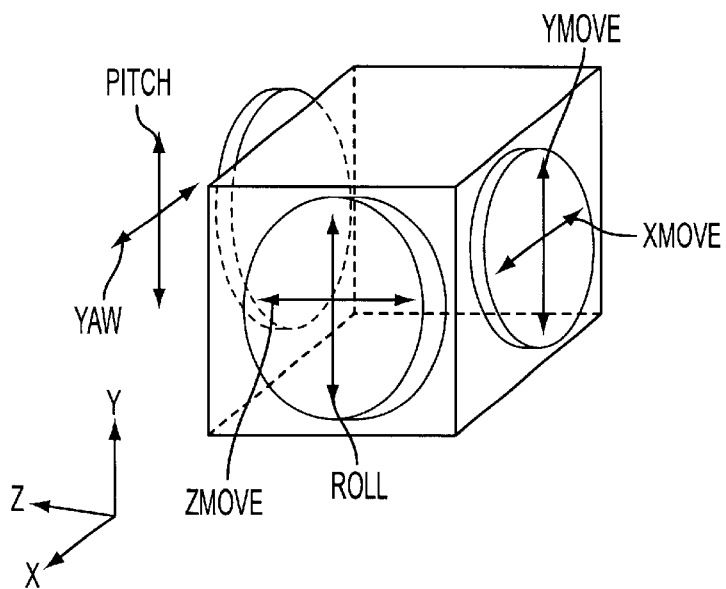
FIG. 51a illustrates a method of operating the controller of FIG. 50c.

FIG. 51a illustrates a method of operating controller 4360. Based on a change in pressure, a combination of three thin film sensors are able to generate x, y, and z translation commands as well as pitch, yaw, and roll rotation commands based on the direction of a finger swipe as indicated in FIG. 51a.

Figure 51B:
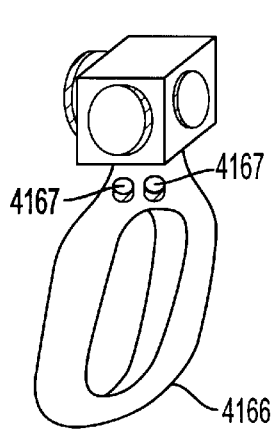
FIG. 51b illustrates an embodiment of the controller of FIG. 50c with an attached handle 4166.

FIG. 51b illustrates an embodiment of controller 4360 with an attached handle 4166. Handle 4166 is used to allow a user more flexibility in using controller 4360 such as allowing the user to grip controller 4360 by the handle 4166 with one hand, and operate controller 4360 with the other. Handle 4166 may have a number of buttons 4167 that may be programmed to perform a variety of functions.

Figure 51C:
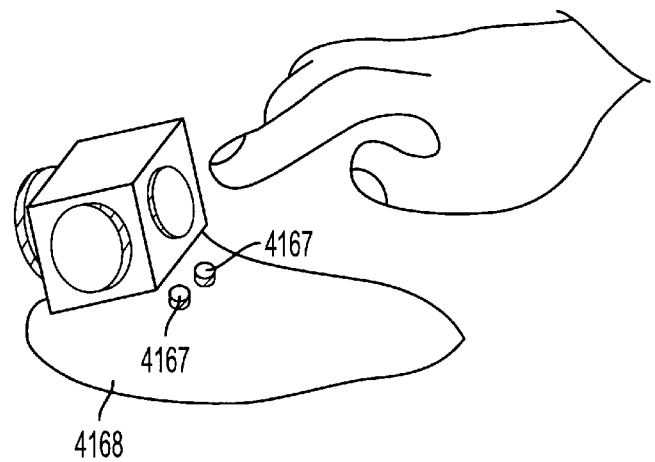
FIG. 51c illustrates an embodiment of the controller of FIG. 50c with a support 4148.

FIG. 51c illustrates an embodiment of controller 4360 with a support 4148. Support 4168 is typically used to support controller 4360 on a desk top, allowing for easy access to a user. Support 4168 may also include buttons 4167.

Figure 52A:
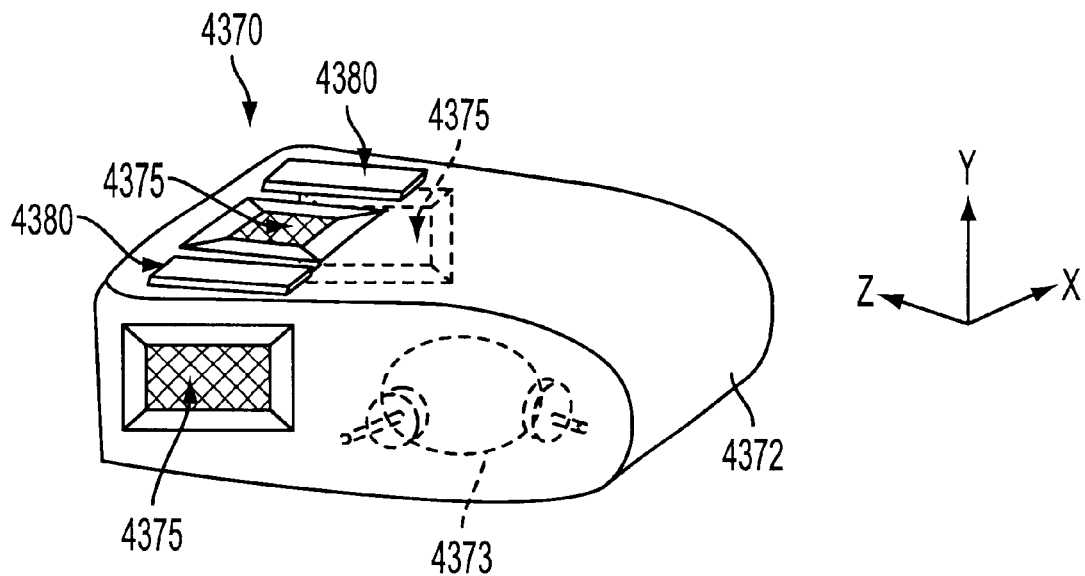
FIG. 52a illustrates a mouse controller in accordance with yet another embodiment of the present invention.

FIG. 52a illustrates a mouse controller 4370 in accordance with yet another embodiment of the present invention. Mouse controller 4370 includes a body 4372 having buttons 4374. Mouse controller 4370 includes a standard mouse mechanism 4373 and buttons 4374 used to control and position a cursor in a typical computer system by generating x and y translation signals as will be appreciated by those skilled in the art. Mouse controller 4370 also has a number of sensors 4375 in accordance with the present invention, which may be operated in the same manner as the methods described with references to FIGS. 49g and 49h to produce a z translation signal, as well as pitch, yaw, and roll rotation signals.

Figure 52B:
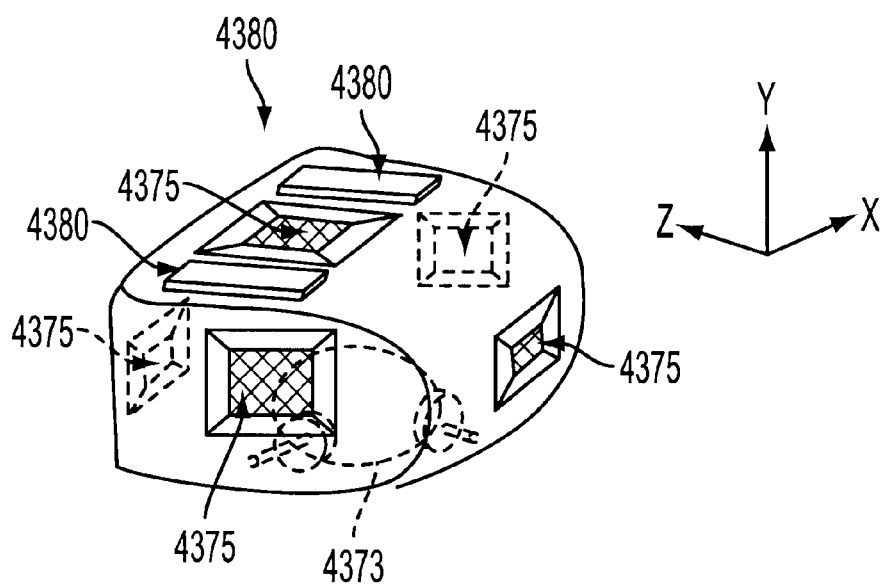
FIG. 52b illustrates a mouse controller in accordance with yet another embodiment of the present invention.

FIG. 52b illustrates a mouse controller 4380 in accordance with yet another embodiment of the present invention. Mouse controller 4380 is similar to mouse controller 4370, but further includes two additional sensors 4375 to further diversify the ways in which x, y, z translation signals, and pitch, yaw and roll rotation signals may be generated. For example, unlike in mouse controller 4370, in mouse controller 4380, the user may use one of the two additional sensors 4375 to generate an x and y translation signal instead of using mouse mechanism 4373.

Figure 52C:
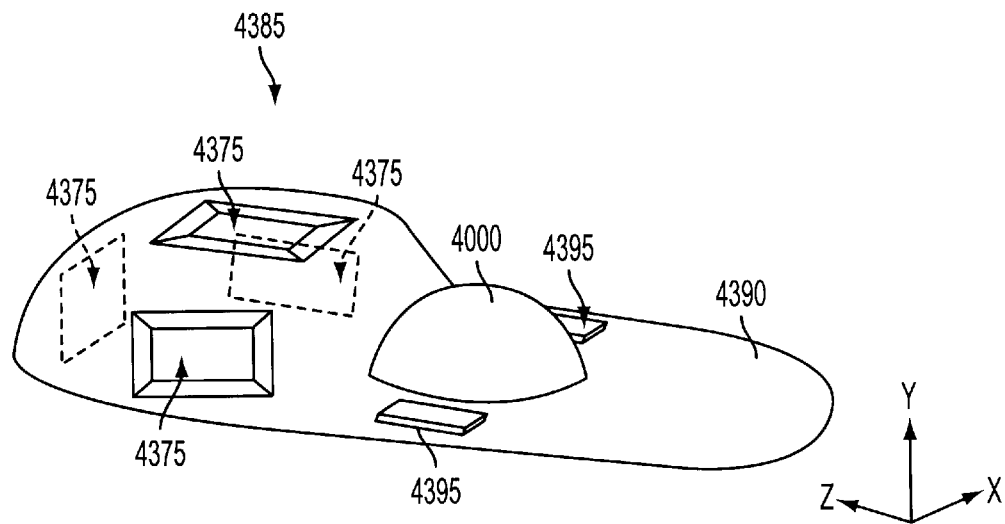
FIG. 52c illustrates a trackball controller in accordance with yet another embodiment of the present invention.

FIG. 52c illustrates a trackball controller 4385 in accordance with yet another embodiment of the present invention. Trackball controller 4385 includes a body 4390 having buttons 4395. Trackball controller 4385 also includes a trackball 4000 used to control and position a cursor in a typical computer system by generating x and y translation signals. Trackball controller 4385 is modified to utilize sensors 4375 to produce z pitch, yaw, and roll rotation signals.

Figure 52D:
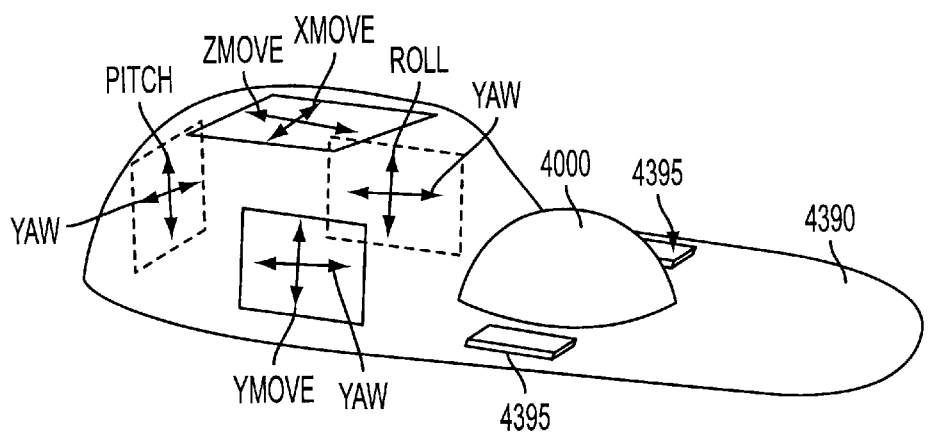
FIG. 52d illustrates a method for operating the trackball controller.

FIG. 52d illustrates a method for operating trackball controller 4385. In method, the trackball is used to generate x and y translation signals. Each of the sensors may then be operated with a finger swipe in the directions indicated in FIG. 53b to generate x, y, and z translation signals, as well as pitch, yaw, and roll rotation signals.

Figure 53A:
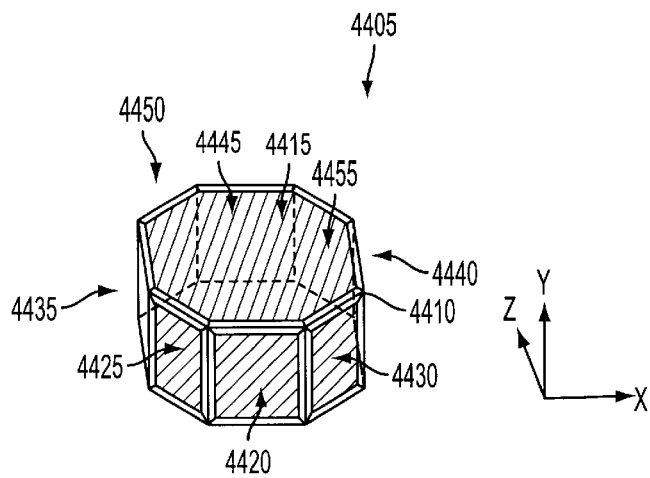
FIG. 53a illustrates a controller in accordance with yet another embodiment of the present invention.

FIG. 53a illustrates a controller 4405 in accordance with yet another embodiment of the present invention. Controller 4405 includes a body 4410 having a top surface 4415, a front surface 4420, a left front surface 4425, a right front surface 4430, a left surface 4435, a right surface 4440, a rear surface 4445, a left rear surface 4450, and a right rear surface 4455, all of which support a sensor and an edge sensor as described previously. The additional sensors allow two additional degrees of freedom for generating rotation signals as will be shown below.

Figure 53B:
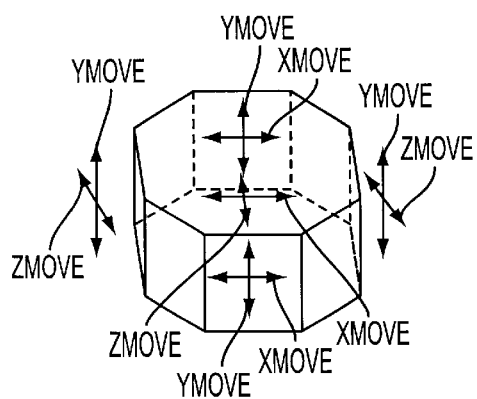
FIG. 53b and FIG. 53c illustrate a method of operating the controller of FIG. 53a to produce x, y, z, pitch, yaw, and roll rotation signals.
Figure 53C:
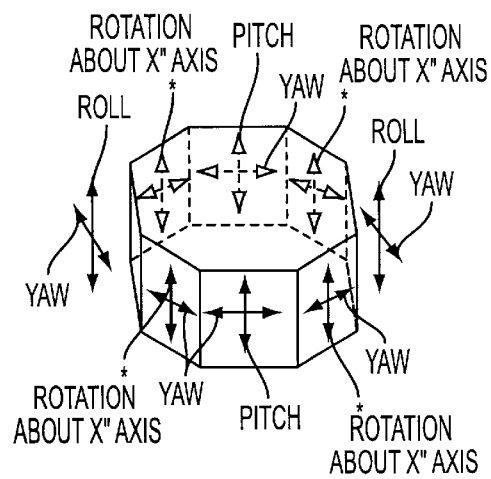
Figure 53D:
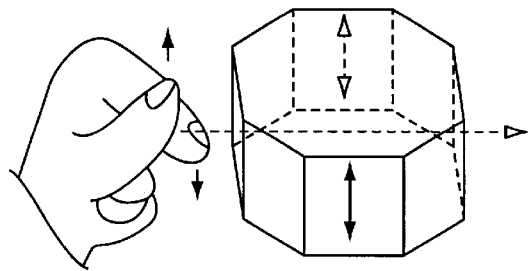
FIGS. 53d–k illustrate a method of operating the controller of FIG. 53a to generate rotation signals.
Figure 53E:
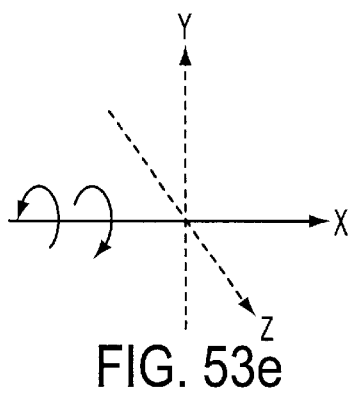
Figure 53F:
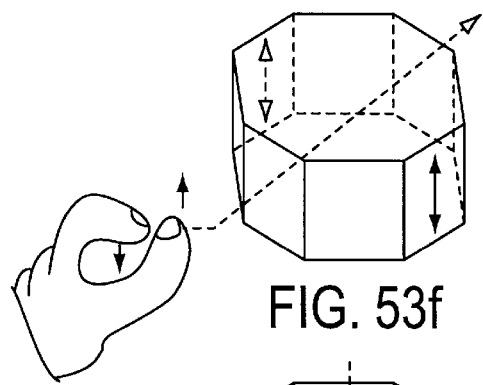
Figure 53G:
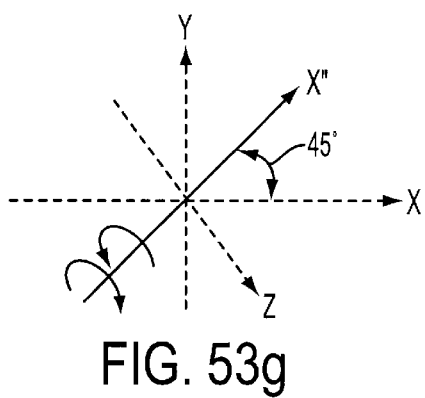
Figure 53H:
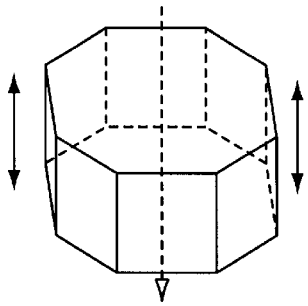
Figure 53I:
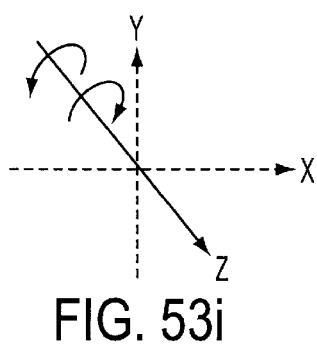
Figure 53J:
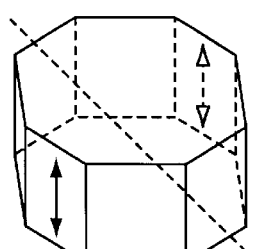
Figure 53K:
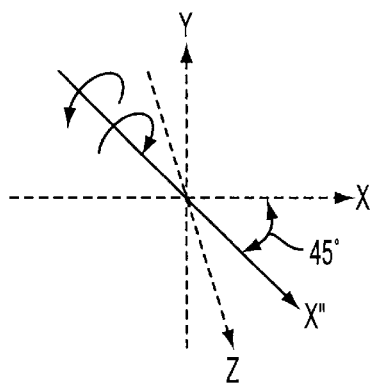

FIG. 53b and FIG. 53c illustrate a method of operating controller 4405 to produce x, y, z, pitch, yaw, and roll rotation signals. The sensors and edge sensors located on top surface 4415, front surface 4420, left surface 4435, right surface 4440, and rear surface 4445, function identically with the sensors located on corresponding faces of controller 4315f of FIG. 49f.

FIGS. 53d–k illustrate a method of operating controller 4405 to generate rotation signals. In particular, FIGS. 53e–f and FIGS. i–j illustrate a method of generating x' and x" rotation signals. The sensors and edge sensors located on right front surface 4430 and left rear surface 4450 may be used to generate an x' rotation signal, which commands the rotation of an object around an x' axis. The x' axis is defined at positive 45 degrees from the x-axis and located on the x,z plane.

The sensors and edge sensors located on left front surface 4425 and right rear surface 4455 may be used to generate an x" rotation signal, which commands the rotation of an object around an x" axis. The x" axis is defined at negative 45 degrees from the x-axis and located on the x,z plane. Each sensor of controller 4405 may be operated to generate a rotation signal by sliding an on the sensor in the desired direction while touching a second sensor with another object.

Figure 54:
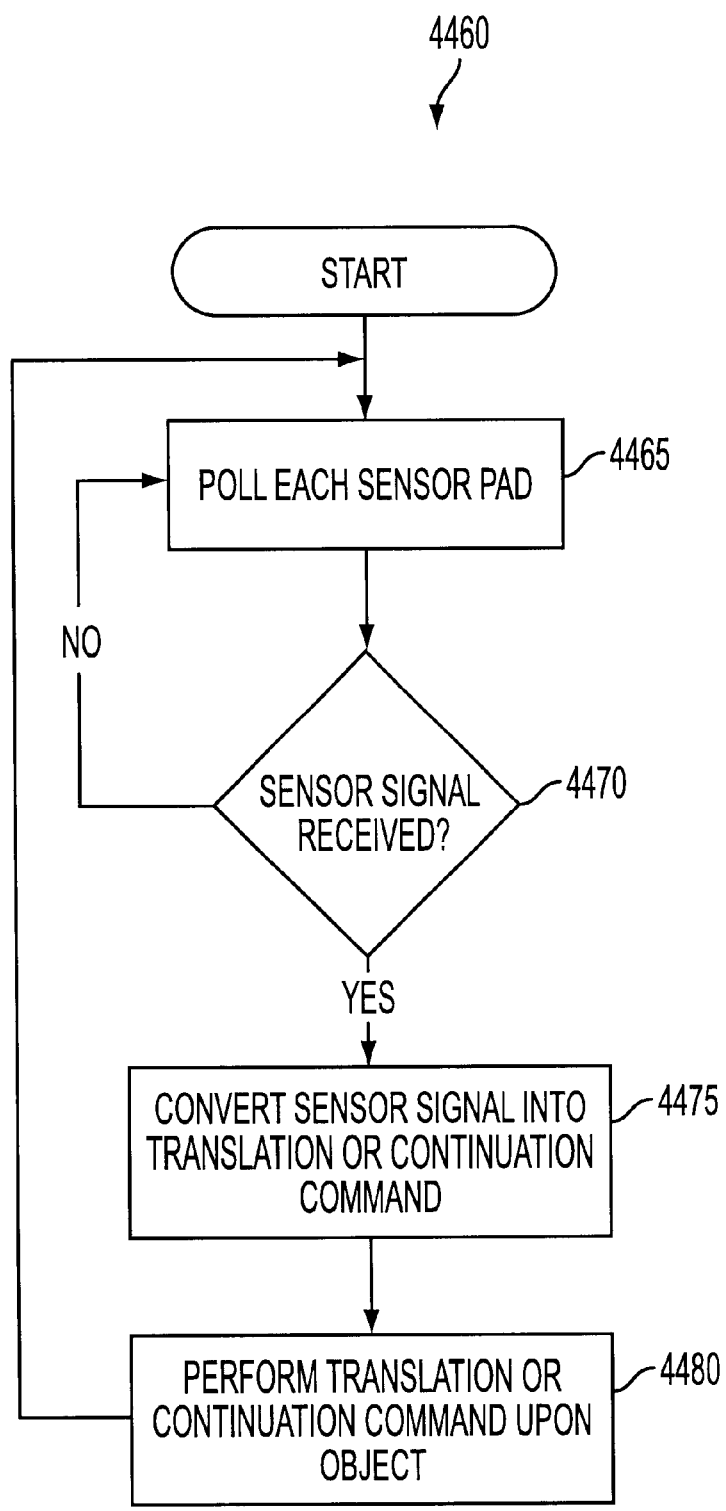
FIG. 54 is a flow chart of a method 4460 of generating translation, rotation and continuation signals from the controllers of the present invention.

FIG. 54 is a flow chart of a method 4460 of generating translation, rotation and continuation signals from the controllers of the present invention. Method 4460 may utilize the control electronics described in FIGS. 3 and 5. Method 4460 begins at an operation 4465 which polls each of the sensors for sensor signals (such as an x translation dsignal) from the user. During polling, the sensor signals may be generated by pressing an object against one or more of the sensors, and then moving the object while maintaining contact with the sensor surface in an operation 4470. The sensor signals are then converted into 3D/6D manipulation commands or continuation commands by an operation 4475. The signals are interpreted by a driver in an operation 4480, which then carries out the 3D/6D manipulation commands or continuation of the 3D/6D manipulation commands of an object on a computer display.

The invention has been described herein in terms of several preferred embodiments. Other embodiments of the invention will be apparent to those skilled in the art from consideration of the specification and practice of the invention. For example, a variety of types of pressure-sensitive sensors can be utilized with the present invention. Various configurations and combinations of input gestures and commands can be detected by the controller in various embodiments as necessary for a particular application. Also, various types of computer-generated objects and real objects can be controlled with the present invention and be commanded to interact with other objects in an environment. Furthermore, certain terminology has been used for the purposes of descriptive clarity, and not to limit the present invention. The embodiments and preferred features described above should be considered exemplary, with the invention being defined by the appended claims.

What is claimed is:

1. A multiple coordinate controller device comprising:
    a three-dimensional body having a first surface portion and a second surface portion which is not coplanar with said first surface;
    a first transducer having a first sensing surface, said first transducer being coupled to said first portion of said body and being capable of detecting both positions and a range of pressure forces at said positions on said first sensing surface, wherein said first transducer is further capable of providing a first range of z coordinates at a detected x,y coordinate in response to said range of pressure forces on said first sensing surface, said first range of z coordinates provided only if said range of pressure forces are greater than a first threshold pressure;

a second transducer having a second sensing surface, said second transducer being coupled to said second surface portion of said body and being capable of detecting both positions and a range of pressure forces at said positions on said second sensing surface, wherein second transducer is further capable of providing a second range of z coordinates of opposite polarity to said first range of z coordinates in response to said range of forces on second sensing surface, said second range of z coordinates provided only if said range of pressure forces are greater than a second threshold pressure.

2. The multiple coordinate controller device as recited in claim 1 wherein said first transducer detects a first position on said first sensing surface producing a first x,y coordinate and a second position on said first sensing surfaces producing a second x,y coordinate.

3. The multiple coordinate controller device as recited in claim 2 further comprising a first edge transducer having a first edge sensing surface positioned at least partially around a periphery of said first sensing surface, said first edge transducer being coupled to said first surface portion of said body and being capable of detecting a force on said first edge sensing surface.

4. The multiple coordinate controller device as recited in claim 3 further comprising a second edge transducer having a second edge sensing surface positioned at least partially around a periphery of said second sensing surface, said second edge transducer being coupled to said second surface portion of said body and being capable of detecting a force on said second edge sensing surface.

5. The multiple coordinate controller device as recited in claim 4, wherein said first edge transducer provides a continuation control signal in response to said force applied to said first edge sensing surface, wherein said continuation control signal commands a continuation of movement in a direction determined by said first detected x,y coordinate and said second detected x,y coordinate.

6. The multiple coordinate controller device as recited in claim 5 wherein said first and second sensing surfaces and said first and second edge sensing surfaces are approximately a rectangular shape.

7. The multiple coordinate controller device as recited in claim 6, wherein said first edge sensing surface is tactilely distinguished from said first sensing surface and said second edge sensing surface is tactilely from said second sensing surface.

8. The multiple coordinate controller device as recited in claim 6, wherein said first edge sensing surface is raised from said first sensing surface and said second edge sensing surface is raised from said second sensing surface.

9. The multiple coordinate controller device as recited in claim 6 wherein said second transducer detects a third and fourth position on said second sensing surface.

10. A multiple coordinate controller device comprising;
a three-dimensional body having a first surface portion and a second surface portion which is not coplanar with said first surface; and
a sensor consisting essentially of;
a first transducer having a first sensing surface, said first transducer being coupled to said first surface portion of said body and being capable of detecting both positions and a range of pressure forces at said positions on said first sensing surface, wherein said first transducer is further capable of providing a first range of z coordinates at a detected x,y coordinate in response to said first range of forces, said first range of z coordinates provided only if said range of pressure forces are greater than a first threshold pressure;
a second transducer having a second sensing surface, said second transducer being coupled to said second surface portion of said body and being capable of detecting both positions and a range of pressure forces at said positions on said second sensing surface, wherein said second transducer is further capable of providing a second range of z coordinates of opposite polarity for said first range of z coordinates in response to said second range of forces, said second range of z coordinates provided only if said range of pressure forces are greater than a second threshold pressure;
whereby said sensor is capable of providing x,y and z coordinates from said first transducer and said second transducer, and
whereby, said first sensing surface and said second sensing surface do not substantially deform under pressure.

11. A two sided controller comprising:
a body having a first surface and an opposing second surface, said first surface and said second surface having dimensions that are substantially greater than a separation between said first surface and said second surface;
a first sensor assembly supported by said first surface and including a first generally flat pressure sensor surrounded, at least in part, by a first generally flat edge pressure sensor;
a second sensor assembly supported by said second surface and including a second generally flat pressure sensor surrounded, at least in part, by a second generally flat edge pressure sensor;
wherein said body is sized to be contacted on said first sensor assembly with the thumb of a hand and simultaneously on said second sensor assembly with a finger of said hand.

12. A wedge shaped controller comprising:
a body having a front edge surface having a first area, a back edge surface having a second area less than said first area, and a pair of side edge surfaces coupling said front edge surface to said back edge surface, whereby said body has a wedge shaped with angled side edges;
a first sensor assembly supported by said front edge surface and including a first generally flat pressure sensor surrounded, at least in part, by a first generally flat edge pressure sensor; and
a second sensor assembly supported by one of said pair of side edge surfaces and including a second generally flat pressure sensor surrounded, at least in part, by a second generally flat edge pressure sensor.

13. A wedge shaped controller as recited in claim 12 further comprising:
a third sensor assembly supported by the other of said pair of side edge surfaces and including a third generally flat pressure sensor surrounded, at least in part, by a third generally flat edge pressure sensor.

14. A wedge shaped controller as recited in claim 12 wherein said body further has a top surface and a bottom surface, and is provided with a pressure sensor on at least one of said top surface and said bottom surface.

15. A touch-sensitive manually operable controller for providing position control information relative to three axes, the controller comprising:

- a top surface, a bottom surface, and a peripheral side surface;
- a first sensor positioned on the side surface of the controller and generally aligned on and orthogonal relative to an X-axis of a Cartesian coordinate system, the first sensor adapted for providing a first Y-signal in response to the position of a force applied to the sensor along the Y-axis and a first Z-signal in response to the position of a force applied to the sensor along the Z-axis;
- a second sensor positioned on the top surface of the controller and generally aligned on and orthogonal relative to an Y-axis of a Cartesian coordinate system, the second sensor adapted for providing a first X-signal in response to the position of a force applied to the sensor along the X-axis and a second Z-signal in response to the position of a force applied to the sensor along the Z-axis;
- a third sensor positioned on the side surface of the controller and generally aligned on and orthogonal relative to an Z-axis of a Cartesian coordinate system, the third sensor adapted for providing a second X-signal in response to the position of a force applied to the sensor along the X-axis and a second Y-signal in response to the position of a force applied to the sensor along the Y-axis; and
- a fourth sensor positioned on the side surface of the controller opposite the first sensor and generally aligned on and orthogonal relative to an X-axis of a Cartesian coordinate system, the fourth sensor adapted for providing a third Y-signal in response to the position of a force applied to the sensor along the Y-axis and a third Z-signal in response to the position of a force applied to the sensor along the Z-axis.

16. A touch-sensitive manually operable controller for providing position control information relative to three axes, the controller comprising:

- a top surface, a bottom surface, and a peripheral side surface;
- a first sensor positioned on the side surface of the controller and generally aligned on and orthogonal relative to an X-axis of a Cartesian coordinate system, the first sensor adapted for providing a first roll-signal in response to the position of a force applied to the sensor along the Y-axis and a first yaw-signal in response to the position of a force applied to the sensor along the Z-axis;
- a second sensor positioned on the top surface of the controller and generally aligned on and orthogonal relative to an Y-axis of a Cartesian coordinate system, the second sensor adapted for providing a second roll-signal in response to the position of a force applied to the sensor along the X-axis and a first pitch-signal in response to the position of a force applied to the sensor along the Z-axis;
- a third sensor positioned on the side surface of the controller and generally aligned on and orthogonal relative to an Z-axis of a Cartesian coordinate system, the third sensor adapted for providing second pitch-signal in response to the position of a force applied to the sensor along the Y-axis; and
- a fourth sensor positioned on the side surface of the controller opposite the first sensor and generally aligned on and orthogonal relative to an X-axis of a Cartesian coordinate system, the fourth sensor adapted for providing a third roll-signal in response to the position of a force applied to the sensor along the Y-axis and a second yaw-signal in response to the position of a force applied to the sensor along the Z-axis.

* * * * *